Oct. 3, 1950

F. M. CARROLL ET AL
PNEUMATIC SENSING DEVICE FOR READING PERFORATED RECORDS REPETITIVELY 2,524,029

Filed July 27, 1946

INVENTORS
F. M. Carroll
O. L. Hibbard
BY J.W. *[signature]*
ATTORNEY

Oct. 3, 1950 — F. M. CARROLL ET AL — 2,524,029
PNEUMATIC SENSING DEVICE FOR READING
PERFORATED RECORDS REPETITIVELY
Filed July 27, 1946 — 32 Sheets-Sheet 3

INVENTORS
F. M. Carroll
O. L. Hibbard
BY
ATTORNEY

Oct. 3, 1950     F. M. CARROLL ET AL     2,524,029
PNEUMATIC SENSING DEVICE FOR READING
PERFORATED RECORDS REPETITIVELY

Filed July 27, 1946     32 Sheets-Sheet 4

INVENTORS
F. M. Carroll
O. L. Hibbard
BY
ATTORNEY

INVENTORS
F. M. Carroll
O. L. Hibbard
BY
ATTORNEY

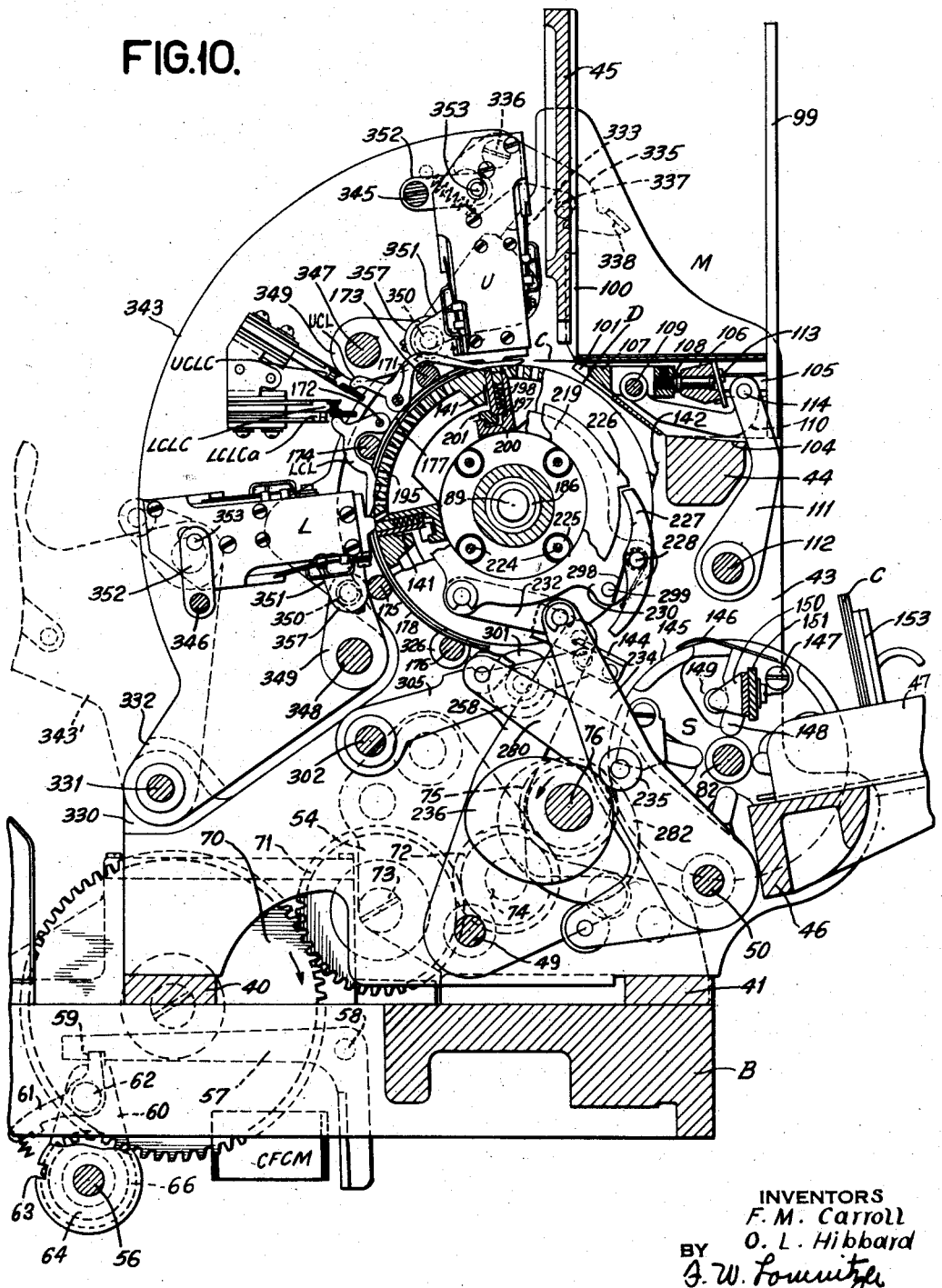

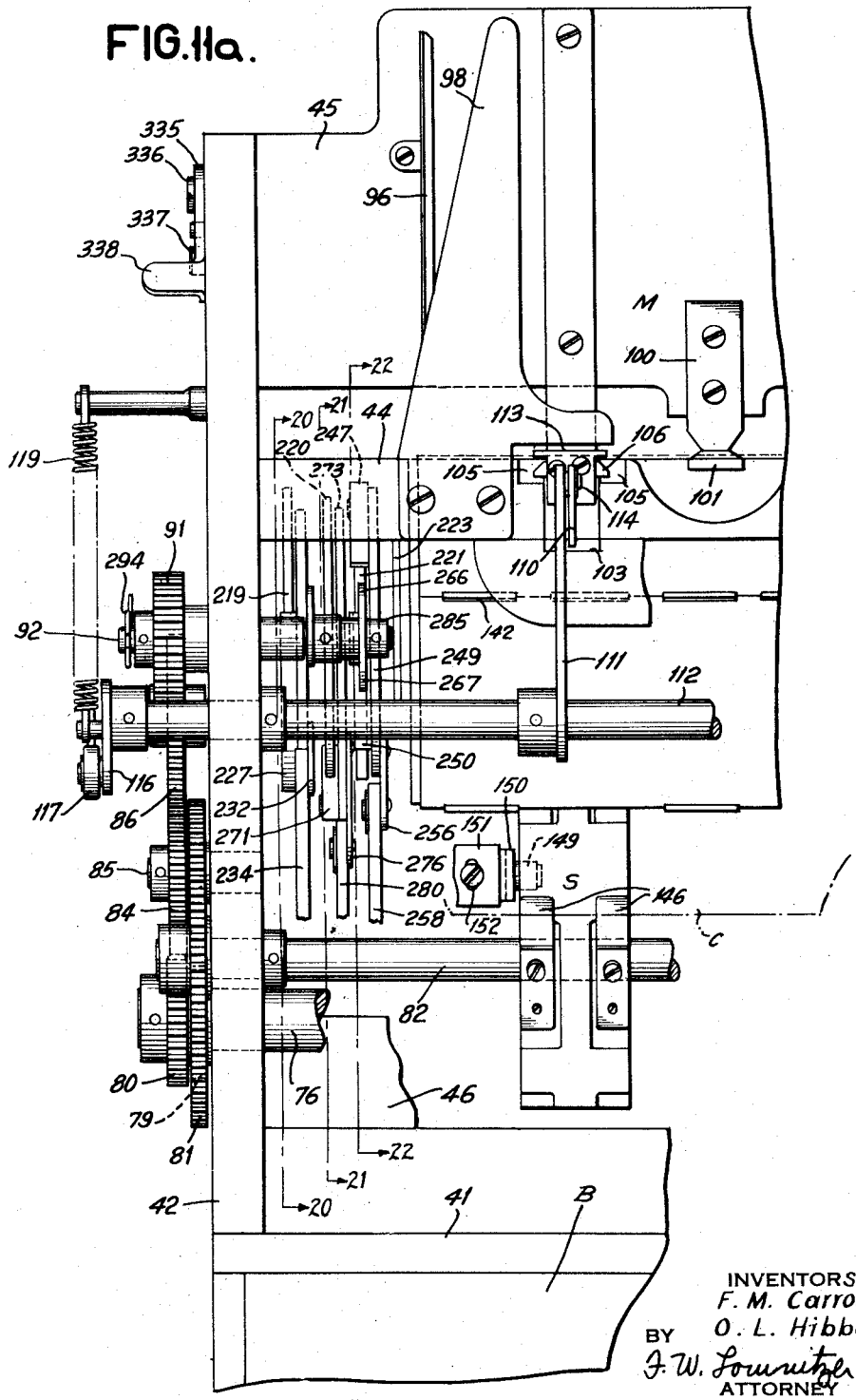

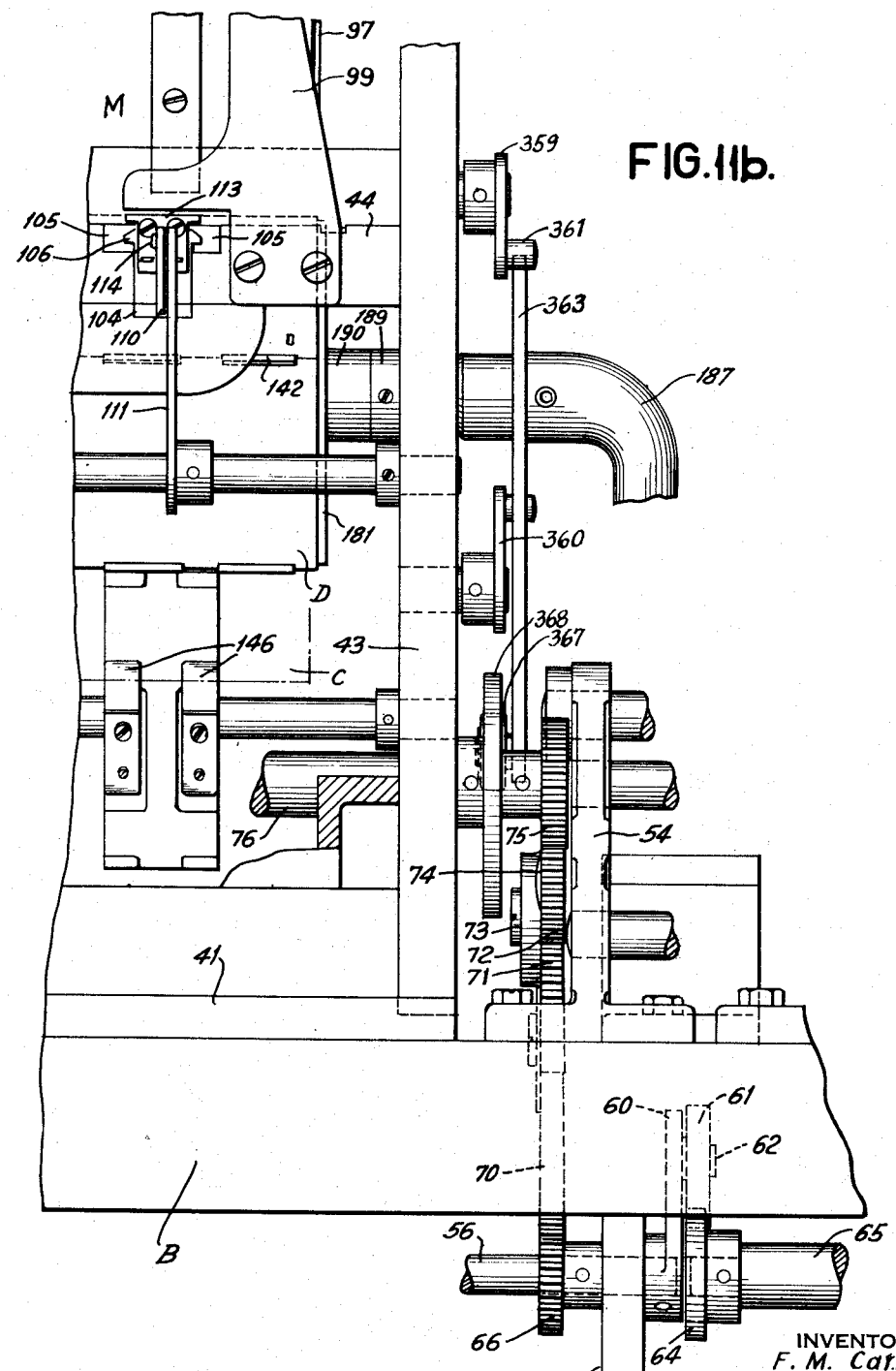

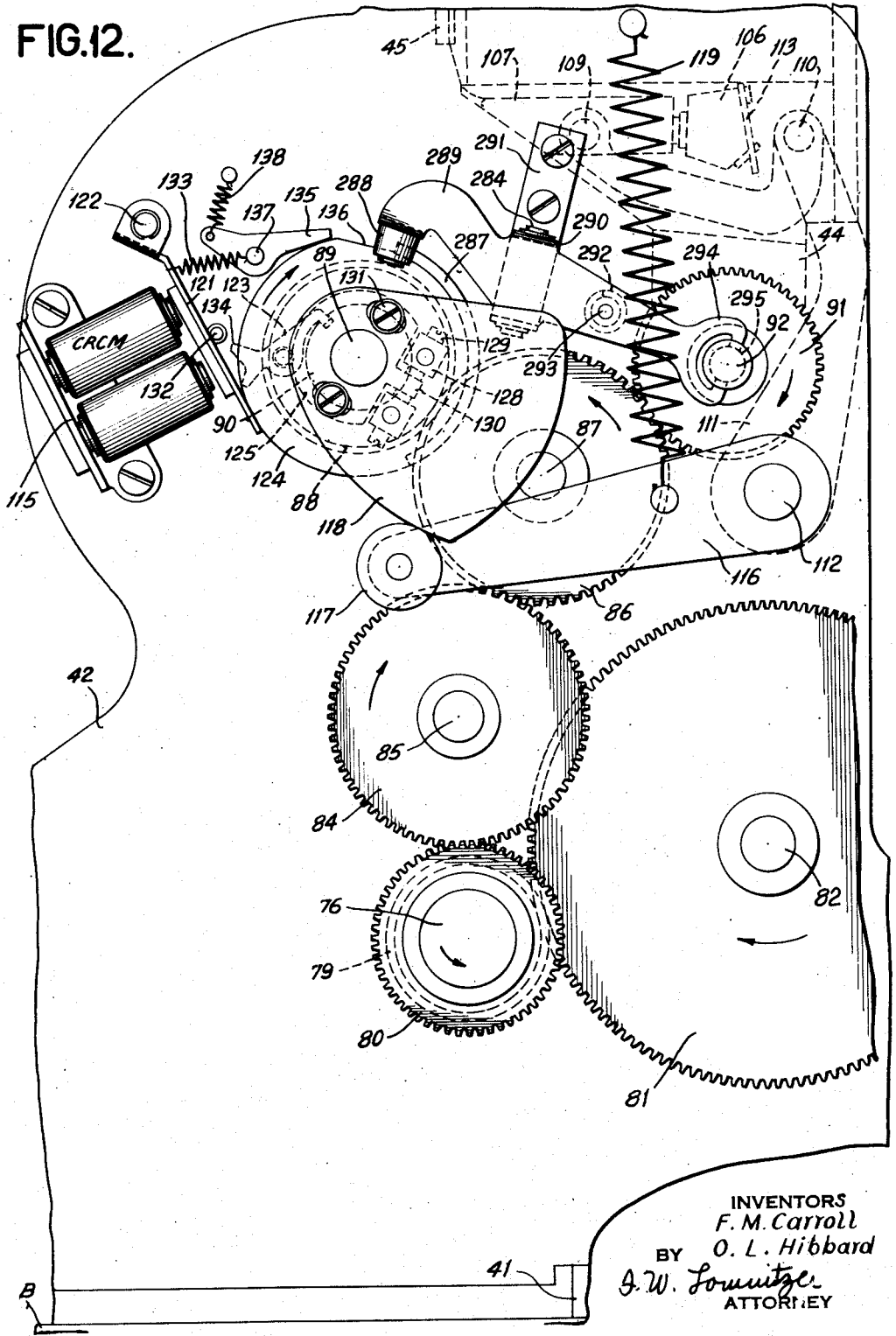

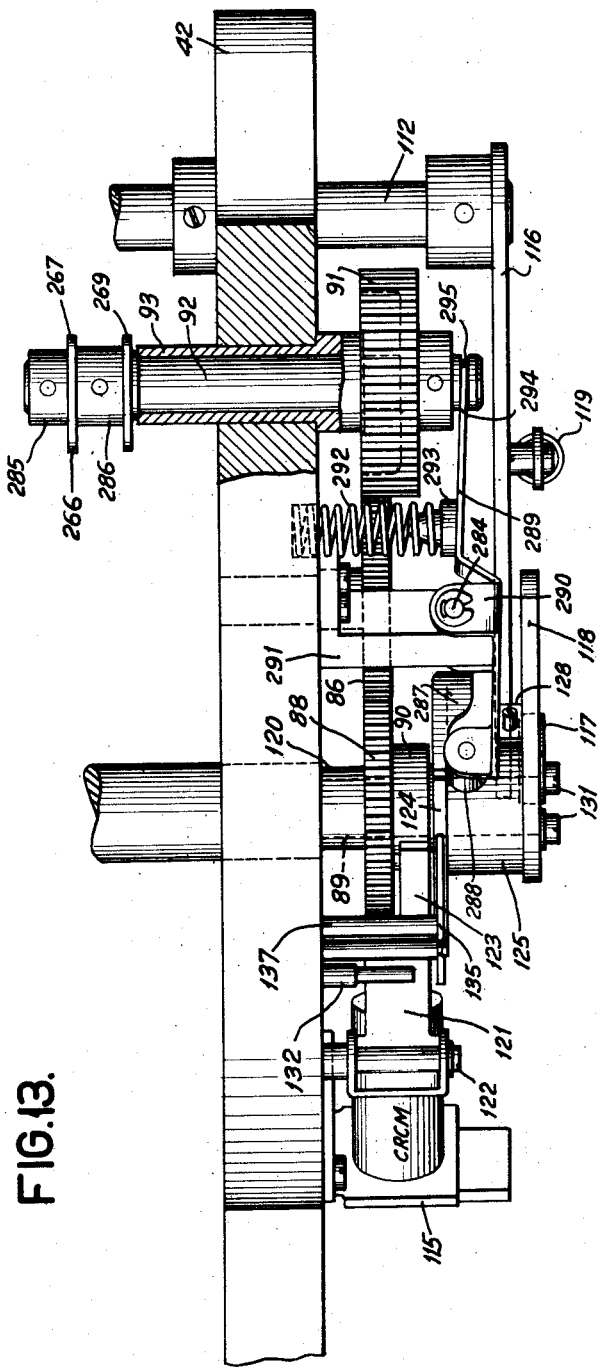

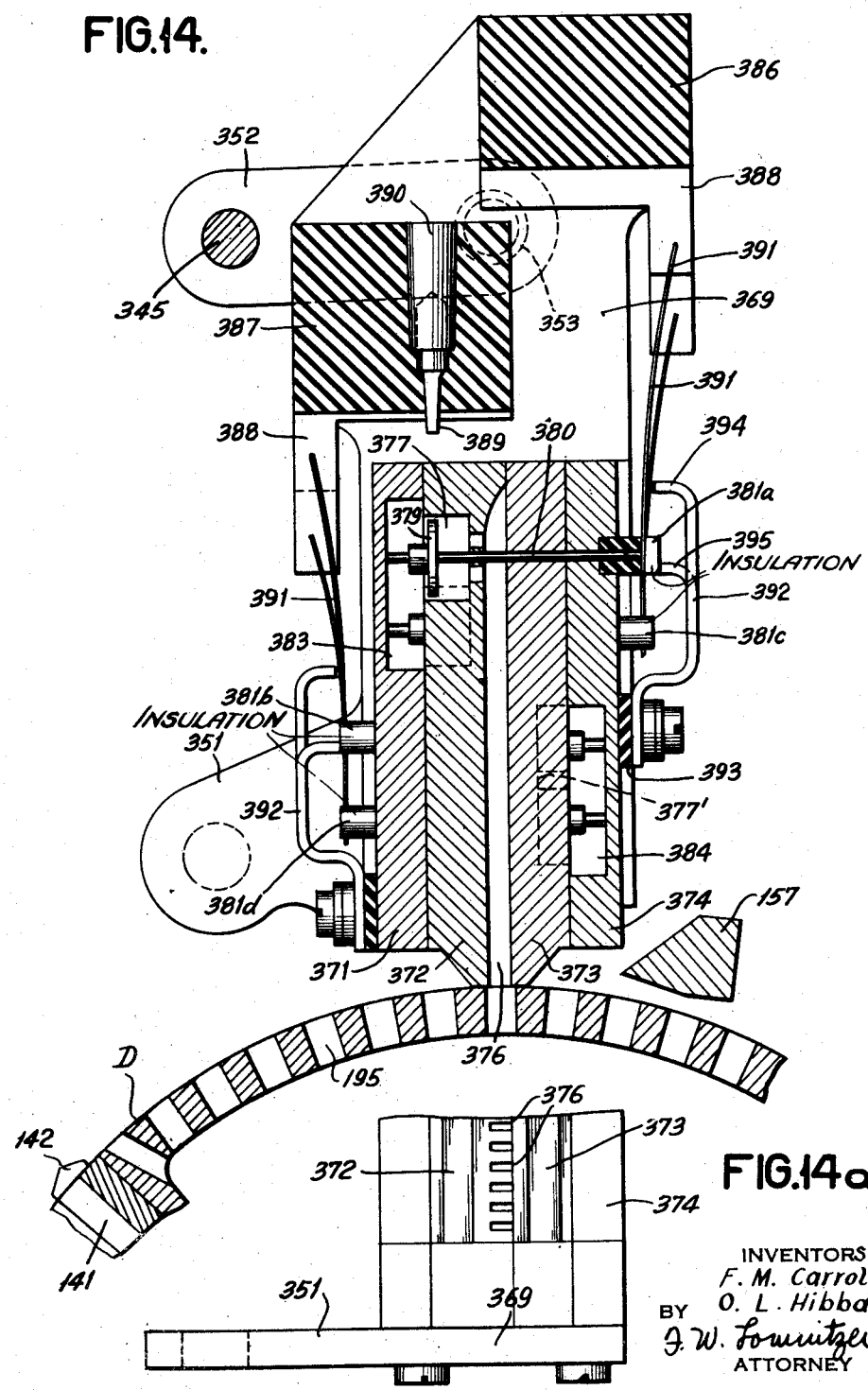

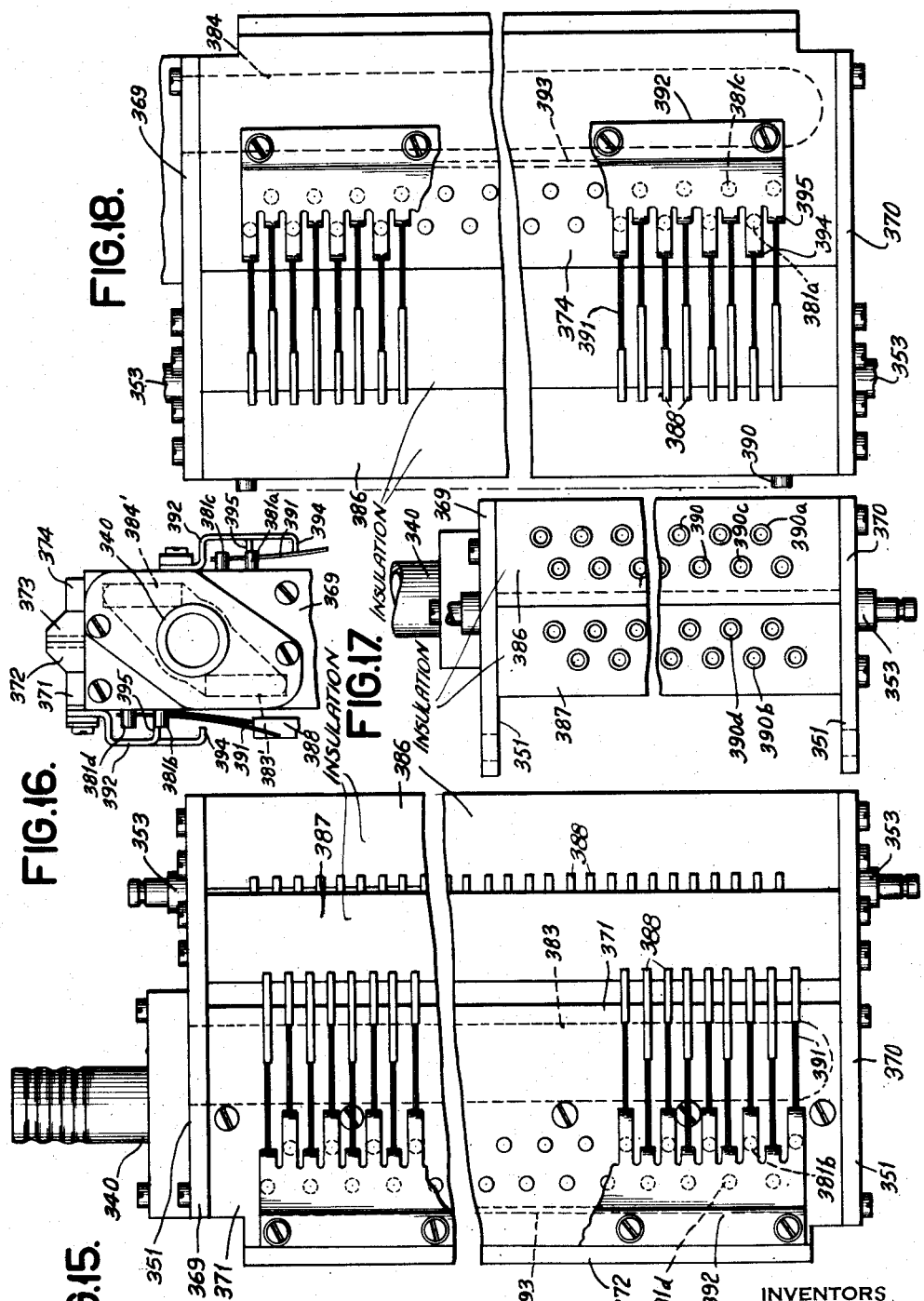

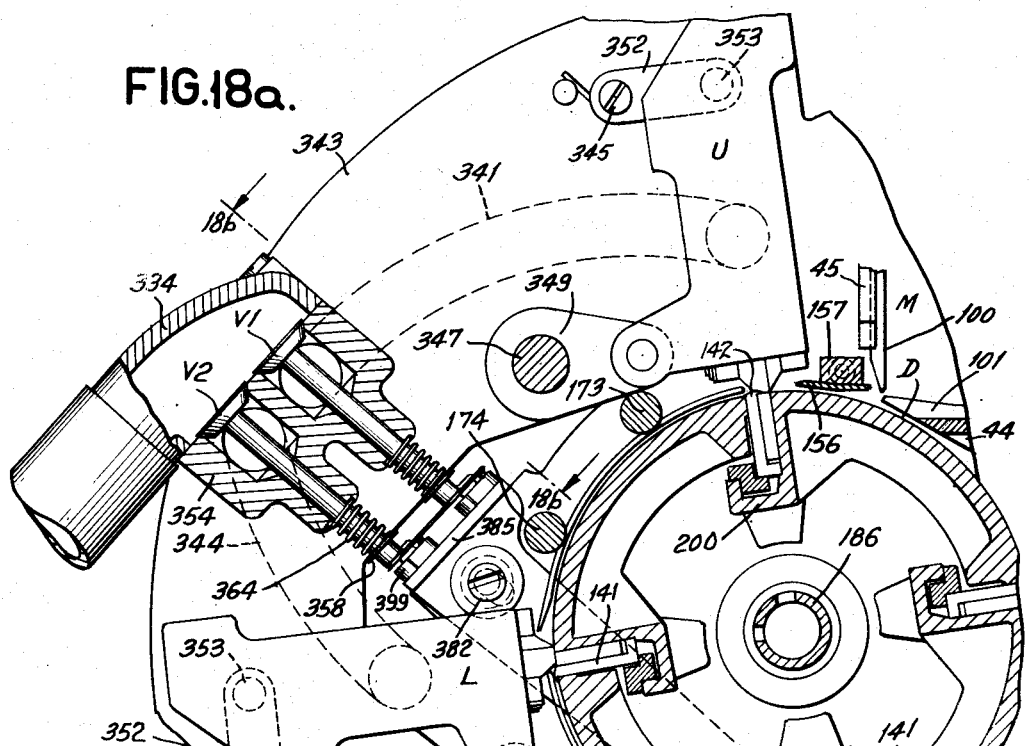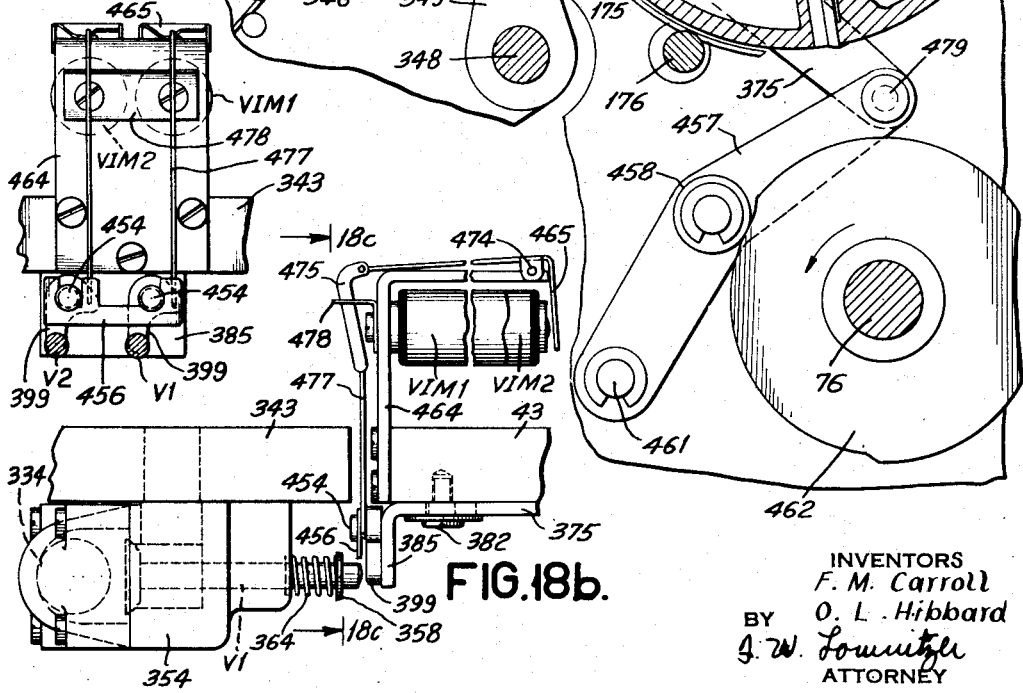

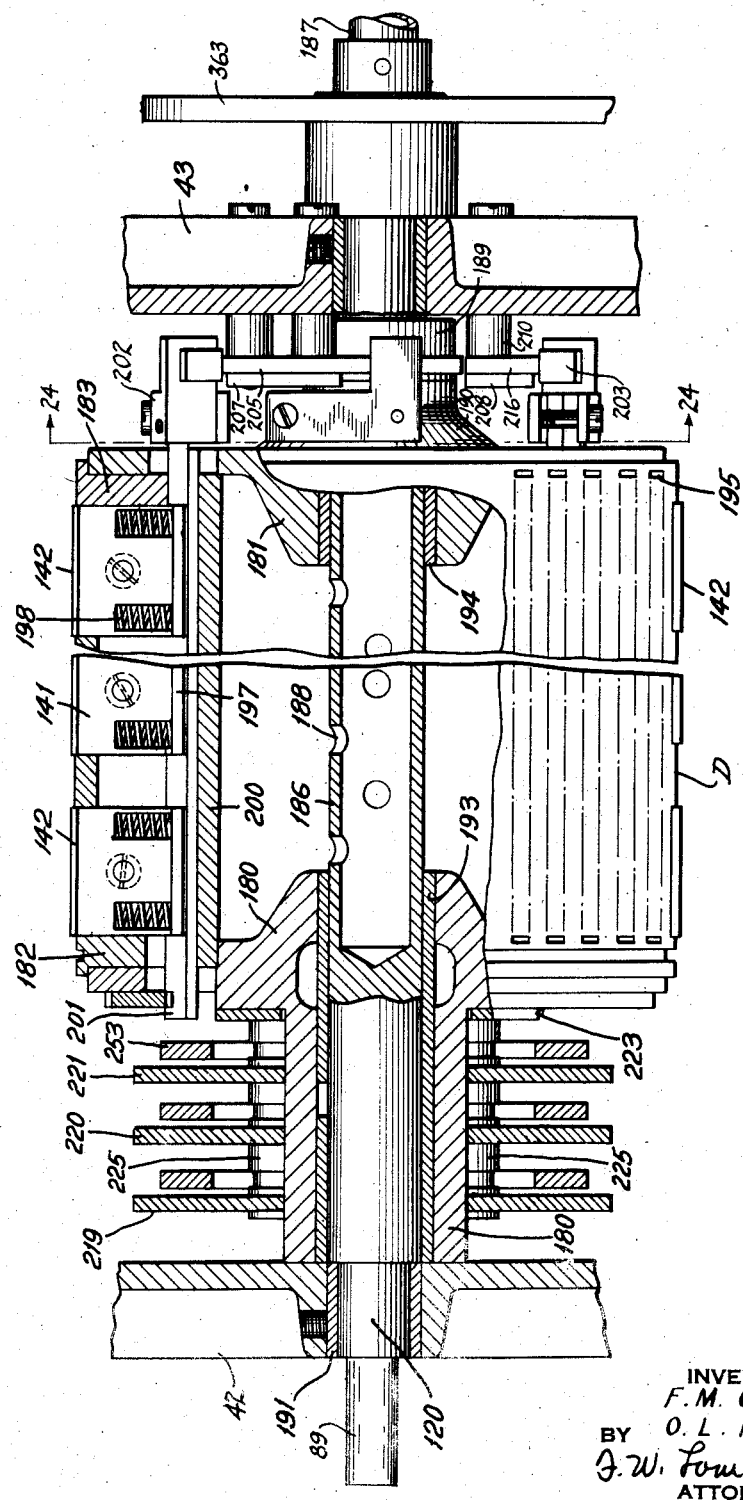

Oct. 3, 1950 F. M. CARROLL ET AL 2,524,029
PNEUMATIC SENSING DEVICE FOR READING
PERFORATED RECORDS REPETITIVELY
Filed July 27, 1946 32 Sheets-Sheet 16

INVENTORS
F. M. Carroll
BY O. L. Hibbard
ATTORNEY

Oct. 3, 1950   F. M. CARROLL ET AL   2,524,029
PNEUMATIC SENSING DEVICE FOR READING
PERFORATED RECORDS REPETITIVELY
Filed July 27, 1946   32 Sheets-Sheet 18

INVENTORS
F. M. Carroll
O. L. Hibbard
BY J. W. Lomnitzer
ATTORNEY

Oct. 3, 1950　　　　　F. M. CARROLL ET AL　　　　　2,524,029
PNEUMATIC SENSING DEVICE FOR READING
PERFORATED RECORDS REPETITIVELY
Filed July 27, 1946　　　　　　　　　　　　　32 Sheets-Sheet 19

INVENTORS
F. M. Carroll
BY O. L. Hibbard

ATTORNEY

Oct. 3, 1950  F. M. CARROLL ET AL  2,524,029
PNEUMATIC SENSING DEVICE FOR READING
PERFORATED RECORDS REPETITIVELY
Filed July 27, 1946  32 Sheets-Sheet 23

INVENTORS
F. M. Carroll
O. L. Hibbard
BY
ATTORNEY

INVENTORS
F. M. Carroll
O. L. Hibbard
BY F. W. [signature]
ATTORNEY

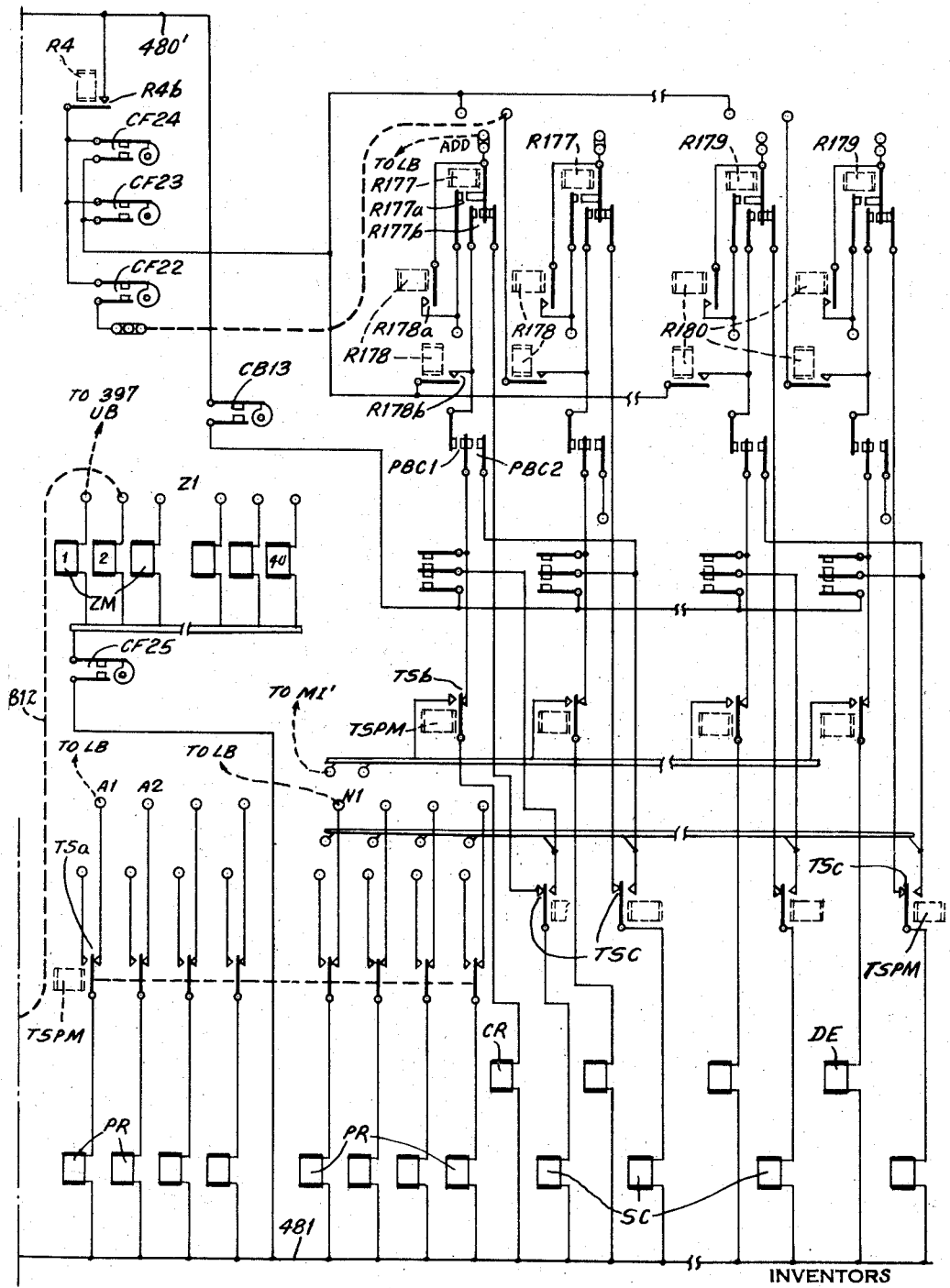

Patented Oct. 3, 1950

2,524,029

UNITED STATES PATENT OFFICE 2,524,029

PNEUMATIC SENSING DEVICE FOR READING PERFORATED RECORDS REPETITIVELY

Fred M. Carroll, Binghamton, and Oscar L. Hibbard, Johnson City, N. Y., assignors to International Business Machines Corporation, New York, N. Y., a corporation of New York Application July 27, 1946, Serial No. 686,636

49 Claims. (Cl. 235—61.9)

This invention relates to record feeding and analyzing devices and more particularly to an advanced form of pneumatic sensing device for cooperation with perforated tabulating cards to repeatedly sense the same or different fields of perforated data in one of such cards.

An object of the invention is to provide improved pneumatic sensing devices for cooperation with perforated records, thereby making it possible to sense such records without the usual contact therewith incidental to the use of feeler pins or electrical sensing brushes. The object is to construct the pneumatic controls with pressure and a forwardly directed vacuum action rather than a suction action, and thereby cause the lint, dirt, and other loose matter to be blown away from the sensing unit and card and directed into an exhaust opening away from all the sensing mechanism. Thus, the action produced is dual in a combined cleaning and reading operation.

The pneumatic action of the disclosed devices with air pressure in a direction toward an exhaust port and away from the pneumatic unit exercises a useful scavenging action to clean the card at the same time that it is sensed.

Another object of the invention is the provision of card feeding and sensing devices making possible repeated analyzing of a single record. Repeated analyzing is carried on by moving the record material back and forth under the pneumatic sensing unit. This is possible because the detecting air streams cause no wear and offer no opposition to the movement of the record material. It may be noted that, when electrical brushes are used to analyze record material, they are pressed into contact therewith at an angle which prevents reverse movement of the record. Other forms of sensing devices are also found objectionable in connection with repeated sensing of a single record because of the wear induced by friction between such devices and record paper, especially if the paper is moved in more than one direction and repeatedly over the same area.

Another object of the invention is to provide a compact pneumatic sensing device for cooperation with perforated record material. The sensing unit is designed to be fitted in a limited space by having a double tiered arrangement of pressure chambers with a staggered array of cylinders and pistons. This design makes it possible to have a large number of closely spaced air ports arranged side by side in a single line, and yet extending from such ports are a series of cylinder openings and pistons of substantial size leading to the air chambers and tubes for supplying the pistons with the activating air pressure and enabling a substantial electrical reading device to make contact under control of the pistons. The piston or plunger is arranged to have comparatively large clearance in the surrounding cylinder walls leading to the port openly directing above the perforated record material. The air pressure behind and in front of the piston is equalized as long as the advancing record material appears imperforate under the air opening. However, as soon as a data representing perforation appears under the opening, the air on the record side of the piston escapes, creating a low pressure area or vacuum under the piston head, thus causing the air on the intake side of the piston head to exert enough pressure to cause it to move toward the sensing port. This motion is communicated to a flexed contact wire or blade which is then brought into electrical contact with a common conducting bar.

Another object of the invention is the provision of record feeding devices for moving a data representing sheet or card in two directions. These devices make it possible to read the same card over and over again under the same sensing device. Accompanying the action of such feeding controls is automatic switching of the electrical controls from field to field on the card, thereby controlling successive recording of data such as name, address, city and state, line by line from the same record. Cross footing operations are also possible to accumulate and record a plurality of items from a single record.

An object of the invention is the provision of mechanism for effecting smooth but rapid movement of a record back and forth under sensing devices. In the present embodiment, the record is held on a perforated drum which is rotated and oscillated under a pair of pneumatic sensing units. Operation of the drum is carried on by a series of three sets of operating pawls. The first forward feed pawl operates the drum in that part of the cycle wherein the digital and alphabetic code perforations are analyzed early in the operation. Near the end of such perforation analysis and concomitant with the analysis of the last perforation, a choice is made between the employment of one or the other of the other two sets of pawls. If the second forward feed set of pawls is selected, then the motion of the drum is made continuous in the forward direction and the record is analyzed only once under the sensing devices.

However, if a reversal action is desired (which action is selected when a special indicium perforation is detected in a heading or cross footing card), then the set of reversal pawls is thrust in for engagement of the drum at the same time that the forward driving sets of pawls are disengaged. Then the drum is rocked back and forth a number of times determined by the cyclical controls also set by detection of the digit value of the special indicium on the heading or cross footing record.

Another object of the invention is the provision of sensing cycle control devices for determining the number of times that a record is to be repeatedly analyzed by oscillation of it under control of the special record indicium. In the present embodiment, each heading or cross footing record has one column of indicia devoted to a digital perforation representation of the number of repeated sensing operations which are to be employed in connection with that record. The value or magnitude of the digit is directly related to the number of fields of information punched in the record. This special perforation is sensed early in the operation and used to set up a cycling control device for determining the number of oscillations that are to be given the sensing drum and the record, so that several different fields thereon are to be analyzed seriatim. As an alternative, the special perforation can control the number of times that the same field of a record is to be analyzed as in multiplying.

Another object of the invention is the provision of positive gripping means for holding a record card on a drum and carrying it through one or more sensing stations. Instead of being advanced by friction rollers with attendant chance of getting out of alignment, the disclosed gripper construction affords a fixed, positive mode of transportation for a card.

Another object of the invention is to provide sensing devices which are equally effective in co-operation with thin or thick perforated records. Electrical brushes tend to score and tear the record sheets and, if thick records are used, the brushes induce excessive wear in jumping off the ledges of indicia openings and card edges. These disadvantages are overcome by the use of the present pneumatic unit and air pressure which has no ill effect on thin or thick cards and has the good effect of dusting and cleaning them. Sensing by air is also independent of electrical leaks through carbon specks or other conductive dirt sometimes found even in carefully prepared record material. Another advantage residing in the use of pneumatic sensing devices is that of securing a lengthened time of electrical response from a card perforation. By merely lengthening the air port opening, the vacuum is sustained to hold a contact closed for the required period.

Another feature of the invention is the provision of means to elevate the pneumatic sensing units in synchronism with the rotation of the card carrying drum in order to allow passage of extending card grippers on the drum.

Another object of the invention is to provide pneumatic sensing devices wherein the moving parts for establishing electrical contact are so small and light that they have a rapid operating cycle and fast restoration movement in order that they will sense code perforations in adjacent index positions appearing in rapid succession under the air ports.

Another object of the invention is to provide a double acting card deflector. The same deflector is used to guide a card edge into grippers on the feed drum and also fend off the loose end of the same card when the feed direction is reversed and the card is pushed backward toward the magazine. The deflector is cam operated to assume alternate positions, one position to direct a card out of the magazine and a second position to fend off or redirect a retracted card away from the mouth of the magazine.

Another object of the invention is the provision of means for distinguishing between records having a single field of information from those having a plurality of fields of information. Devices are provided to detect a multiple field card and to prevent the advance of following cards while repetitive reading of such a multiple field card is completed. The same detecting devices are employed to call in the reversal drum moving devices to oscillate the record back and forth. Other controls are associated therewith for determining the number of reversal operations as selected by the magnitude or value of the control perforation detected on the heading or cross footing record.

Another object of the invention is the provision of record feeding, sensing and printing devices coordinated to effect complete heading or address printing control from a single perforated record.

Another object of the invention is the provision of means for taking both alphabet zoning and digital code readings from a single sensing station, while reverse feeding is taking place. Successive alphabet code readings are taken from but one row of sensing ports by selective use of port fields alternately and successively; while one field is being zoned the previously zoned field is being read for final alphabet printing control.

Another object of the invention is the provision of successive record sensing devices of such flexibility that the size and location of the various fields of data thereon are selected under control of relays individual to each denomination or letter position, so that any position in the card may be read off cyclically in any one of a plurality of successive sensing operations and thereby impressed in any one of a plurality of printing positions on the record material or directed into any one or more of accumulators in a selected order.

Another object of the invention is the provision of improved cross footing devices for sensing a plurality of different item fields on a record, said fields being of any size or disposition, and directing said item data into an accumulator and printer in any predetermined order.

Another object of the invention is to provide controls for two sensing stations under which a record with data indicia is to pass successively. The first station senses the number of fields of data on the record and controls devices for determining the number of times that the record is to be sensed by the second sensing station. Distinction is made between records with single and plural fields of data. Picking of successive records from a magazine is maintained as long as single field records are detected, but it is suspended upon appearance of a plural field record. Reversal mechanism is called into operation after a delay which allows a plural field record to pass under the second sensing station after being detected under the first sensing station. Repeated reversal of the plural field record movement carries it back and forth under the second sensing station the required number of times to read all fields thereon. Upon sensing for the final field reading, controls are initiated to restore the machine operation to ordinary forward feed with single successive sensings under the two stations.

Another object of the invention is the provision of improved record stacking devices. The record is held on the feeding drum by grippers and, once it is past the analyzing station, it is released from the grippers by means of a friction roller, which is brought against the record and prevented from turning at the proper time. The friction retarding effect of the roller causes the record material to be pulled out of the grippers on the drum and directed into the engaging means of a stacker.

Another object of the invention is the provision of a hollow record holder to carry the record under analyzing devices. As shown, the holder is a hollow drum wherein the lint, dirt, paper threads, etc. from the record may be blown off and exhausted to leave the record and the sensing area free from such matter as is likely to impair the proper actuation of the sensing devices.

Another object of the invention is the provision of means for delaying the operation of the group control devices upon coincidence of a group change with detection of a plural field card calling for repetitive sensing operations. This control is dependent on the number of cycles selected by the special digit perforation in a heading or cross footing card.

Another object of the invention is the provision of means for delaying the initiation of record skipping from heading to first item under control of the special perforations in the heading cards.

Fig. 10 is a sectional elevation view taken through the center of the feeding drum and card stacker, showing the driving connections to the improved card feeding and sensing devices.

Fig. 11a is a front elevation view showing the left half of the drive connections to the card feed control cams, the picker and the stacker.

Fig. 11b is a front elevation showing the right half of the drive connections and other parts complementary to the showing in Fig. 11a.

Fig. 12 is a side elevation view of the operating mechanism outside the left side frame shown partly operated for controlling the picker and the reversing controls for the card feed pawls.

Fig. 13 is a plan view of the mechanism shown in Fig. 12.

Fig. 14 is an enlarged sectional elevation view through one pneumatic sensing unit.

Fig. 14a is an enlarged bottom view showing the air openings.

Fig. 15 is a side view of a pneumatic sensing unit.

Fig. 16 is an end view of a pneumatic sensing unit showing the air intake port.

Fig. 17 is a plan view of pneumatic sensing unit.

Fig. 18 is a side view of a sensing unit showing the side opposite that shown in Fig. 15.

Fig. 18a is a sectional elevation view taken through the air valves which admit the compressed air to the two sensing units.

Fig. 18b is a projected plan view of the two air valves and the magnet controlled interposer operator therefor.

Fig. 18c is a projected plan view of the two valve operating interposers shown with the valves removed.

Fig. 19 is a sectional elevation view taken through the middle of the card feed drum.

Figs. 28A to 28I together form a wiring diagram of an alphabet printing tabulator machine and automatic carriage thereon, with the controls for the pneumatic sensing units and the repetitious card sensing cycles.

The invention is disclosed as embodied in an alphabet printing tabulator of the kind shown generally in United States Patents 2,079,418 and 2,199,547. An automatic carriage or record sheet spacing and ejecting mechanism of the kind shown in United States Patent 2,189,025 is associated with the platen of the tabulator. These machines are controlled by perforated record cards of the kind shown in Figs. 2, 3 and 5, and the purpose is to accumulate separately the amounts represented by groups of the records and also print bill forms or other accounting records, such as shown in Fig. 4. Heretofore, a plurality of perforated cards, one for each address line and one for each item, were needed to print a record of the kind shown in Fig. 4. Now, instead of using several separate cards for the related data, all may be represented on one card and in different fields of said card and detected successively by passing the card repeatedly under pneumatic sensing means.

A diagrammatic assembly

Figure 1:
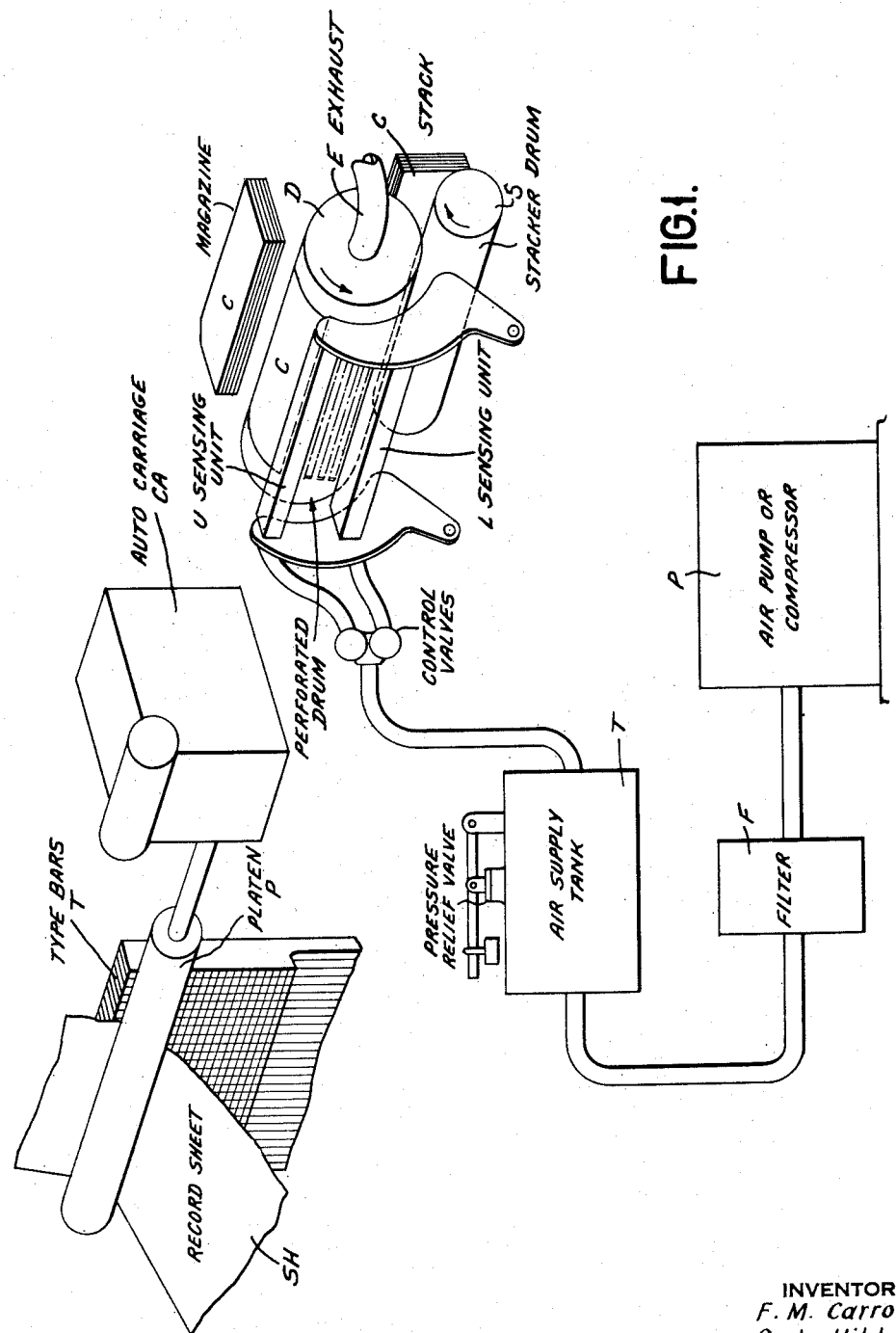
Fig. 1 is a diagrammatic assembly view showing the relationship of the main components of the pneumatic tabulating machine.

Looking at the rear of the tabulator, the card feeding and card sensing devices appear at the right side of the machine as shown diagrammatically in Fig. 1. There it is seen that air is driven through a filter F by a pump P and directed into an air pressure supply tank T, and from there it passes two control valves and along two hose branches into two pneumatic sensing units U and L. These units correspond generally in position and purpose with the usual double line of electrical sensing brushes UB and LB found in most tabulators and here replaced by the pneumatic units. Each unit has a row of air openings or ports which are aligned with the columns of data perforation positions of the record cards. The two sensing units are supported on an arcuate rockable frame which can be moved back for inspection, but is normally held with the two lines of ports over the periphery of a hollow perforated drum D. A pile of cards C are in the magazine from which they are picked off one at a time and transferred to the drum D. The drum has clips for holding the card thereon for about 180° of the drum movement, during which time the card is passed under the upper unit U and then under the lower unit L before being transferred to the stacker drum S.

Upon the appearance of a card perforation under an air port (at a time determined by the location which is indicative of a particular letter or number value), air is allowed to escape into the drum D and, in so doing, a piston in unit U or L closes related contacts. Unit U is used as a control station for special heading card detection and group number control, while unit L has its contacts in series with add and print control devices. The air blown into drum D with lint and dirt is expelled through an exhaust pipe or hose E.

Cards with more than one field of data indicia have a special digit perforation which is sensed as the card passes under the ports of the upper sensing unit U. Later, as the same card passes under the lower sensing unit L, devices under control of the special perforation reverse the motion of the drum D and rock it back and forth a number of times determined by the magnitude of the digit.

At the upper left of Fig. 1 is shown the type bars T carrying numeral and letter type. These bars are lifted differentially to spell names and words and represent amounts as controlled by the data perforations in the cards C. The selected type are pressed against a record sheet SH supported around a cylindrical feed platen P. Connected to the platen shaft is an automatic carriage mechanism CA which is electrically controlled to line space between heading and item impressions, skip a selected space between the last heading line and the first item line, and eject the sheet SH from form to form after all related items are recorded on a form.

The record cards

Figure 2:
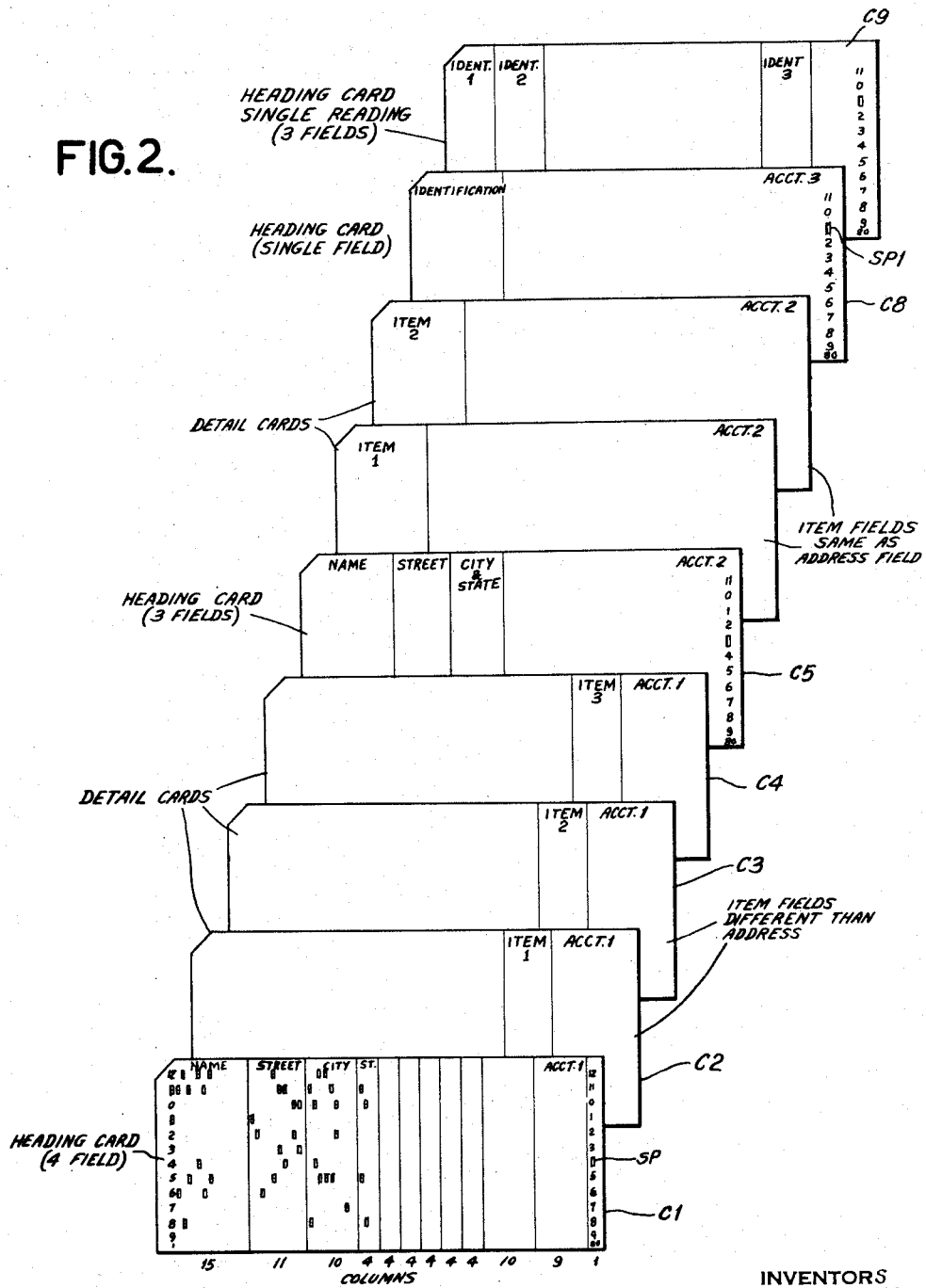
Fig. 2 shows a series of record cards having different arrangements of heading fields and identifying data and corresponding cycle control perforations as assembled with other ordinary item cards.
Figure 3:
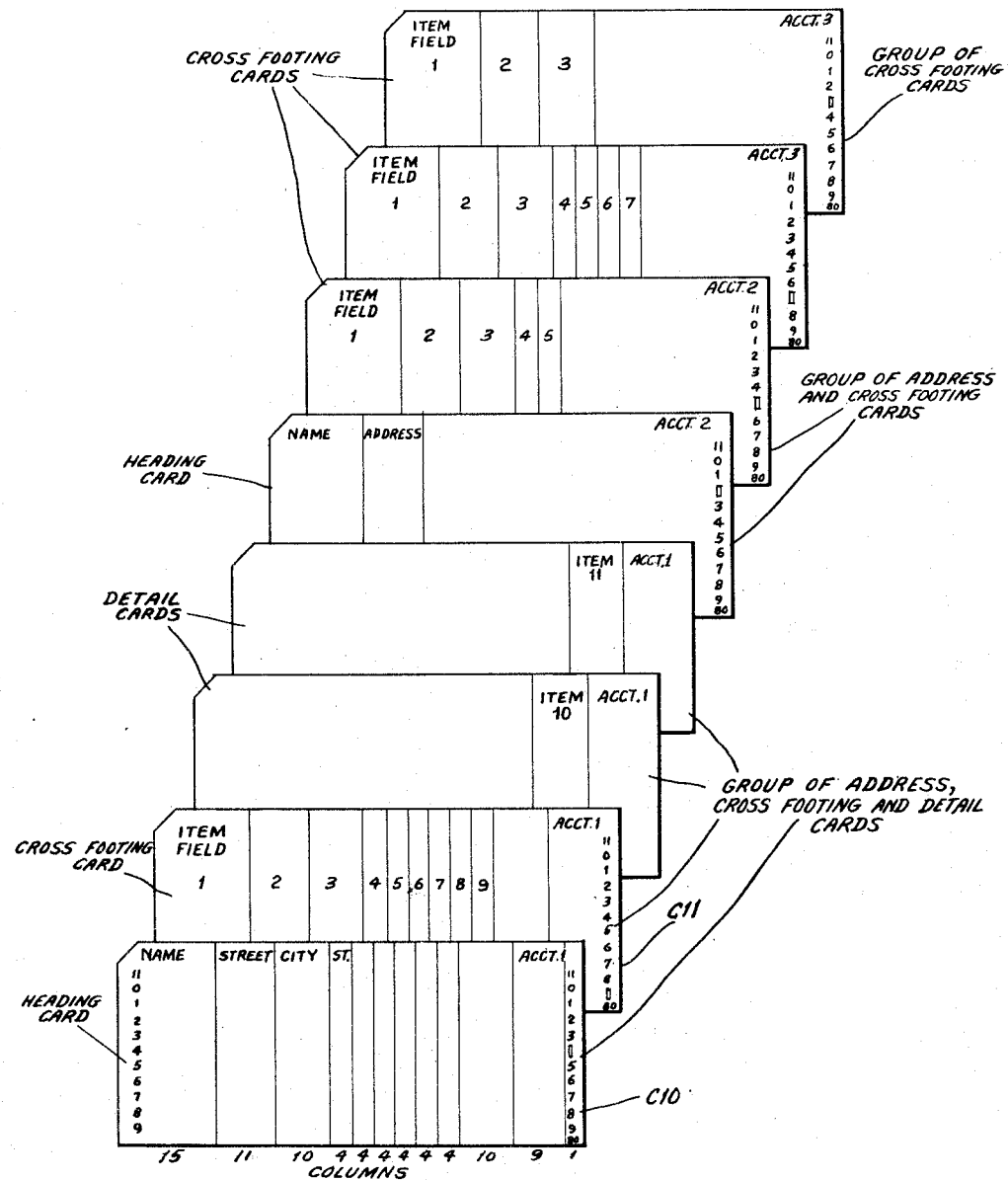
Fig. 3 shows a series of heading, cross footing and item cards with varied numbers of fields and different field arrangements for selection of repetitious sensing.
Figure 4:
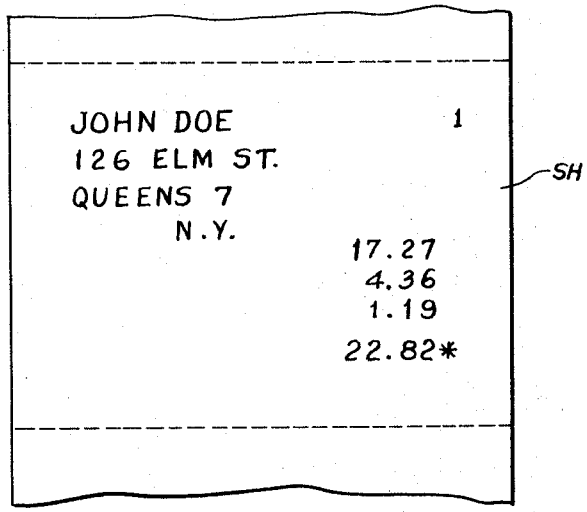
Fig. 4 is a detail view of a sample length of record strip.

Figs. 2 and 3 show sample arrays of different kinds of cards. In these showings the cards are spread out to identify the data thereon. To carry out the illustration further, it is to be imagined that the lowest card C1 is fed first to the drum and followed by cards C2, C3, etc. For example, the first four cards C1—C4 relate to data of one account of group (account #1) and are sensed successively to control printing of a bill form such as that in Fig. 4. Card C5 (Fig. 2) is the first card or heading card of the second group comprising accounts #2.

In the first group it will be noted that card C1 is a heading card bearing the data related to the four lines of address or heading shown in Fig. 4. This card also has at the extreme right column a special digit perforation SP in the position "4" to denote the numbers of fields of printer control data on the card. The account number or group control data field at the right of the card is not counted as a separate field for it is provided merely to record a number on the first recording cycle and thereafter serve as a comparing means to detect changes in card groups. When perforation SP is sensed under the first sensing unit U, preparations are made for reversal of the sensing drum D as the card passes under unit L. The value of the digit perforation SP determines the number of times that the heading card is to be analyzed. In the case of card C1, there are to be three reversals and four sensing operations under the air ports of sensing unit L, and the result is the impression of the four printed address lines shown in Fig. 4. Although card C1 (Fig. 2) is shown to be followed by three separate item cards C2—C4, it is possible to put such data on the first card C1 and use a "7" perforation SP instead of a "4" hole.

The invention is illustrated with examples of cards having nine possible heading or cross footing data fields, one independent field, a group number field, and a single column at the right for the special perforation SP. In the 80 column card of the example, these fields are proportioned to take care of the name and address heading sizes. Reading from left to right along card C1 (Fig. 2), it is seen that the successive fields are of different column widths as follows: 15, 11, 10, 4, 4, 4, 4, 4, 4, 10, 9 and 1. It will be appreciated when the flexible plugging of the controls are explained hereinafter, that although this illustrative showing is given with the fields of certain sizes and sensing of them carried on in a left to right order, that it is possible for the fields to be of any size or number and the order of reading to be right to left or skipped around in any preselected sequence.

In Fig. 2, heading card C5 of the second group is seen to have a three-field address and a corresponding "3" digit for repetitious reading control.

The last two cards C8 and C9 illustrate that the heading card need not be an address card, nor is a single reading card limited to data in one field. Card C8 is a card with identification data (which could be any name, number or date information) in a field and is distinguished from plural field heading cards by a special "1" perforation SPI. Card C9 is also a single reading heading card but it has plural information readable all at one time as is the case with the ordinary item cards.

Perforation SPI of the single field heading cards does not cause repetitious sensing as do the other special digit positions of the repeat selection column, but it does identify the heading card to effect zoning, distribution, record sheet feeding control and other controls incidental to name, number or date recordings of a special nature.

The cards of Fig. 3 show how cross footing and detail cards can be assembled with related heading cards or be considered independently to call for repeated sensing operations as the conditions warrant. It is noted that a four field heading card C10, a nine field cross footing card C11 and two detail cards are related by being in the same account number group. Account Number 2 has only two cards, the first being a two field heading card and the second a five field cross footing card. The third group is composed of a pair of cross footing cards to be read independently of heading data and sensed repeatedly for detection of all cross footing fields. Independent item cards can also be read in the ordinary way, since the absence of special perforations in such cards automatically disables head sensing and cross footing control. Switches are also provided to disable heading control and make the 80th card column available for ordinary plugging.

The framework

The tabulator base B (Fig. 10) is elevated on legs and extends to support the printing, accumulating, cam contact and driving mechanisms. On the base is secured a pair of rectangular bars 40 and 41 (Figs. 10, 11a and 11b) from which is erected a pair of side frames 42 and 43 between which the card feeding, pneumatic analyzing, and stacking mechanisms are supported.

Extending across the space between the side frames are a number of supports for various parts of the mechanism. A brace 44 (Fig. 10) is fastened between the frames and forms the lower support of the card magazine M, one wall of which is a cross plate 45 that also extends between the side frames. Near the bottom of the frames a cross member or brace casting 46 is attached therebetween to support the stacker card receiving guides 47. Attached to the inside of the left side frame 42 (Fig. 25) is an angle piece 48 which is also secured to bar 41 and spaced from the side frame to bear the ends of short shafts 49 and 50.

Adjacent the right side frame 43 (Fig. 11b) is erected a standard 54 which is fastened to base B and formed with a vertical web upon which two of the intermediate drive gears are pivoted. Extending below base B is a bearing bracket 55 for carrying the card feed clutch shaft 56.

The driving connections

The operation of the card feed devices is controlled by a card feed clutch magnet CFCM (Fig. 10) which is energized at the proper times for listing and tabulating control, and deenergized during total taking cycles in the normal manner. When energized, the magnet operates a clutch lever 57 pivoted at 58 and formed with a hooked end 59 normally engaging a clutch driving arm 60 and a clutch pawl 61 pivoted at 62 thereon. Operation of lever 57 clockwise causes release of the pawl 61, so that a tooth thereon is dropped into a notch 63 in a constantly rotating disk 64 fastened to the main operating shaft 65 (Fig. 11b). This shaft is motor driven by connections (not shown) in the tabulator.

Arm 60 is fastened to the other feed shaft 56 which is in alignment and abutting relation with shaft 65 as shown in Fig. 11b. Fastened to shaft 56 on the side of bracket 55 opposite to the side on which arm 60 is secured to the end of the shaft is a driving gear 66 which operates a train of gearing leading to all card feeding and sensing devices.

In mesh with gear 66 is a large idler gear 70 (Fig. 10) pivoted in the base B. The train of gearing also includes two other idler gears 71 and 72 pivoted at 73 and 74, respectively, on the side of standard 54. These gears convey the driving force to a small gear 75 which is in mesh with gear 72 and fastened to a shaft 76 which is the cam shaft for the card feed operating pawls.

Shaft 76 extends across the card feed unit and through both side frames and on the left end outside frame 42 (Fig. 11a) is secured a pair of drive pinions 79 and 80. The smaller of the two pinions, pinion 79, is in mesh with a gear 81 secured to a shaft 82 which is the stacker drive shaft driven in a clockwise direction (Fig. 12).

The large drive pinion 80 furnishes the movement for a train of gearing leading to the picker operating cam and a clutch for shifting the reverse feed cams. In mesh with pinion 80 is an idler gear 84 pivoted at 85 on side frame 42 and in turn meshing with a second idler 86 pivoted at 87 on the frame.

Meshing with gear 86 is a clutch gear 88 loosely pivoted on a reduced end 89 of a fixed drum tube shaft 186 which projects outside the left side frame 42. Attached to gear 88 is a notched clutch disk 90 which serves to drive the picker selectively as explained hereinafter.

Also meshing with gear 86 is a wide axially shiftable gear 91 secured to a shaft 92 which carries a number of cams for reversing the pawl drive to the card feed drum. In Fig. 13 it is seen that this sliding shaft 92 is supported within a long bushing 93 fixed in frame 42. Gear 91 is formed with a cup-shaped cross section to permit movement toward the enlarged outer end of bushing 93.

The card picker

Cards are assembled and placed horizontally in the magazine M (Figs. 11a and 11b), wherein they are confined for accurate positioning by walls comprising the cross plate 45, a pair of side plates 96 and 97 fixed thereto, and a pair of tapering end guides 98 and 99 fastened on the brace bar 44. A pair of throat plates 100 and 101 are adjustably held on plate 45 and bar 44, respectively, and set to provide a narrow throat opening permitting the passage of only one card at a time out of the bottom of the magazine and over to the left (Fig. 10).

Into the top face of cross bar 44 is cut a pair of deep notches 103 and 104 (Figs. 11a and 11b), the sides of said notches being flanked by inserted dovetail guides 105 secured to bar 44 directly under the cards. Sliding within the guides is a pair of picker knife holders 106 which are fastened to operating slide blocks 107 (Fig. 10) by adjustment screws 108. Said blocks are slotted to receive pivots 109 and ends of operating links 110, the other ends of which are articulated at 114 on separate operating arms 111 fastened to an operating shaft 112. Fastened adjustably to the sloping face of each holder 106 is a picker blade 113 which projects slightly above the top of the block sufficiently to engage the edge of the bottom card C.

As shown in Figs. 10 and 12, the picker is in a partly operated position annd shaft 112 has been vibrated counterclockwise. The extent of full vibration is sufficient to carry the card to the left far enough so that the forward edge of it is pushed under grippers on the feed drum D. The operating mechanism for oscillating shaft 112 as an incident to each card feed operation is shown in Figs. 12 and 13.

Picker shaft 112 is seen to extend outside the left side frame 42 and there carry an operating arm 116 with a roller 117 riding on the periphery of a cam 118. A spring 119 tends to hold the arm in cooperation with the cam and restore the picker late in the cycle, when the elevated part of the cam moves away from the roller.

Picker operating cam 118 is operated through a clutch controlled by a reverse control magnet CRCM mounted on a bracket 115 fixed to frame 42. As long as ordinary or single field cards are being fed, magnet CRCM is reenergized near the end of each cycle, so that the clutch remains connected to feed cards successively. However, upon the detection of a multifield heading or cross footing card, the magnet is deenergized and the clutch connection is broken to suspend picking and issuance of any new cards while the multifield card is reread a selected number of times.

Assuming that magnet CRCM is energized for ordinary feeding, then the armature lever 121 pivoted at 122 will be drawn to the left and out of the path of a clutch pawl 123, which is spring urged into engagement with notched disk 90, said pawl being pivoted on the side of a face cam 124 having a hub 125 loosely pivoted on shaft 89. Pawl 123 is therefore retained in engagement with the notched disk 90 already mentioned as connected to the rotating card feed drive gear 88 loosely pivoted on shaft 89 and spaced from frame 42 by collar 120. By means of the clutch connections mentioned, gear 88 is connected to hub 125. To this hub is adjustably secured the picker drive cam 118.

On the inside face of cam 118 is riveted a pair of adjustment blocks 128 each carrying a set screw 129 pointed towards a centralized extension 130 on hub 125. The cam is pivotally seated on the end of shaft 89 and the angular position thereon with respect to the other clutch parts is governed by the complemental setting of the two screws 129. A pair of fastening screws 131 pass through arcuate slots in cam 118 and serves to clamp the cam to the hub 125, when a satisfactory setting has been made by the adjustment screws.

As the cam 118 revolves clockwise, a rise thereon causes an early counterclockwise movement of the picker shaft 112 and positive movement of a card to the left for initiation of feeding. After this, there is encountered an upper dwell area on the cam before a descent allows spring 119 to restore the parts with the roller 117 finally riding on a lower dwell area.

Should the magnet CRCM be deenergized in any cycle, it is a sign that a heading card indicium is sensed under the upper sensing unit U, and then the armature lever is allowed to swing to the right (Fig. 12) as drawn by a spring 133 against a stop 132, and there it will be in the path of an extension 134 on pawl 123. The pawl is thus rocked back counterclockwise and disengaged from disk 90 to stop the face cam 124 and picker cam 118 in the home position. Card feeding is suspended until magnet CRCM is again energized.

A rebound preventing lock is provided in the form of a pawl 135 pivoted on frame 42 and pointed into a notch 136 in the edge of the face cam 124. The pawl is pivoted on a stud 137 and is pressed into operation by a spring 138. Notch 136 is so located with respect to the disengaging position of clutch pawl 123 and the position of pawl 135 that as the face cam 124 arrives in the home position, the end of pawl 135 snaps into the notch behind the abrupt wall of the notch and thus prevents counterclockwise rebound of the disconnected clutch parts.

The card feed path

At this point in the description it is believed well to point out in a general way the course or path taken by a card after it is fed out of the magazine. In Fig. 10, it is noted that a card C is projected to the left out of the bottom of the magazine M by the picker. At that particular instant, the drum D is stationary or dwells briefly between the usual counterclockwise motions while the upper one of four sets of card grippers 141 is elevated with pointed bill-shaped heads 142 thereon raised above the periphery of the drum. Into this gripping space under heads 142 the front edge of card C is projected and then the grippers 141 are released to the action of springs which clamp the heads 142 over the card edge and affix the card to the drum as the drum resumes forward movement.

There are four such sets of grippers 141 spaced at 90° intervals around the drum D. Since the sensing units U and L are also spaced at the extremes of a 90° interval outside the drum, after a movement of 90° after picking up one card, the succeeding set of grippers is conditioned to pick up the next card. Thus, as the drum rotates, a card is picked up for every quarter revolution. This continuous advance of record cards in succession is interrupted only when the magazine is empty or when the picker is stopped for heading card reversal operation as already explained.

The card C which is first gripped and fixed on drum D near the mouth of the magazine M (Fig. 10) next passes under the upper pneumatic sensing unit U, and then one cycle later it passes under the lower sensing unit L. After so doing, the card is either further advanced in the counterclockwise direction or the direction of motion of the drum is reversed to reciprocate a heading card back and forth under the reading station L. In either case, the card is finally advanced further in the counterclockwise direction.

When the front edge of the card is just beyond the lowest point on the periphery of the drum D the grippers are depressed to release the card and it is then directed by a guide bale 144 into jaws formed by the flanges 145 of a pair of coaxial stacker drums S and the pivoted grippers 146 thereon.

Referring to Figs. 11a and 11b, it is noted that the pair of stacker wheels or drums S is fastened on the shaft 82 already mentioned as driven continuously in a clockwise direction, Fig. 10. Each wheel is provided with four pairs of grippers 146 pivoted thereon by screws 147 secured to the central web of the wheel, and the adjacent pairs of grippers are connected for simultaneous operation by a sleeve through which a screw 147 passes. The grippers are spaced at 90° intervals around the periphery of the stacker wheel and, as the cards are fed off the sensing drum D, there is always a double pair of grippers open on the two stacker wheels ready to receive the card and carry it into the file assembled between the stacker channel guides 47. The wheels turn through notches cut in the casting 46, and as they pass below the upper surface of the notched-out portion the lower edge of each record card contacts the base of the stacker file and is held there and withdrawn from beneath the grippers as the stacker wheel continues to rotate.

The grippers are formed with an inwardly projecting extension 148 which is provided to afford camming operation to open the grippers at the instant that the card is to be inserted for stacking. Gripper operation is carried on by means of a stationary roller 149 located in the path of the rotating extensions 148. Roller 149 is adjustably located in position by means of a pair of angle irons 150 and 151 (Fig. 11a), the former carrying the roller and the latter being secured to the inside of the left side frame 42. A pair of pin and slot connections 152 serve to vary the location of roller 149 with respect to the rotating grippers and extensions 148, so that the time of operation may be varied to insure smooth affixing of the record card to the stacker wheels.

In Fig. 10, it is seen that as the stacker wheel S rotates in a clockwise direction, the extensions 148 approach the left side of roller 149 and are cammed thereover to rock the grippers in a clockwise direction about the pivots 147 to lift the tips of the grippers 148 above the cooperating flange surface 148, so that an incoming card is free to be inserted under the end of the gripper. A coil spring (not shown) cooperates with the grippers to tend to move them toward the periphery of the stacker wheel. These springs act as soon as the fixed roller 149 is passed and clamp the card to the stacker wheels and carry it over to the right into the file inserted in front of the aligning weight 153.

*The card deflector*

In Fig. 18a, it is noted that between the magazine mouth and the head 142 of the sensing drum grippers there is placed a thin deflector 156 which extends across the area traversed by the card and said deflector has both ends shaped with bevel edges tending to direct the card from the magazine into the grippers. This deflector 156 is arranged to be rocked in a secondary position wherein the right edge is depressed to cover the mouth of the magazine, and the left edge is elevated to deflect an edge of the card approaching from the left, so that it tends to be confined to an area near the periphery of the drum. The reason for the provision of a deflector having more than one position is that a card which is assembled on the sensing drum, after the appearance of a heading card, is held thereon and carried back and forth under the upper sensing unit U at the same time that the heading card is carried back and forth under the lower sensing unit L. By so operating during heading card cycles, the machine does not lose any time but follows the last heading cycle with an effective card sensing cycle, due to the presence of a card directly behind the heading card.

When the card is carried back and forth under unit U, the rear or trailing edge of the card is loose and carried through an angle of 90° which positions it below the magazine. If nothing was placed in the way to prevent its free movement, the card edge would be likely to extend above the drum periphery far enough to be jammed against the underside of the magazine. It will now be explained how the deflector 156 is operated upon drum reversal actuation so as to deflect the trailing edge of a returning card away from the obstructions under the magazine.

Figure 23:
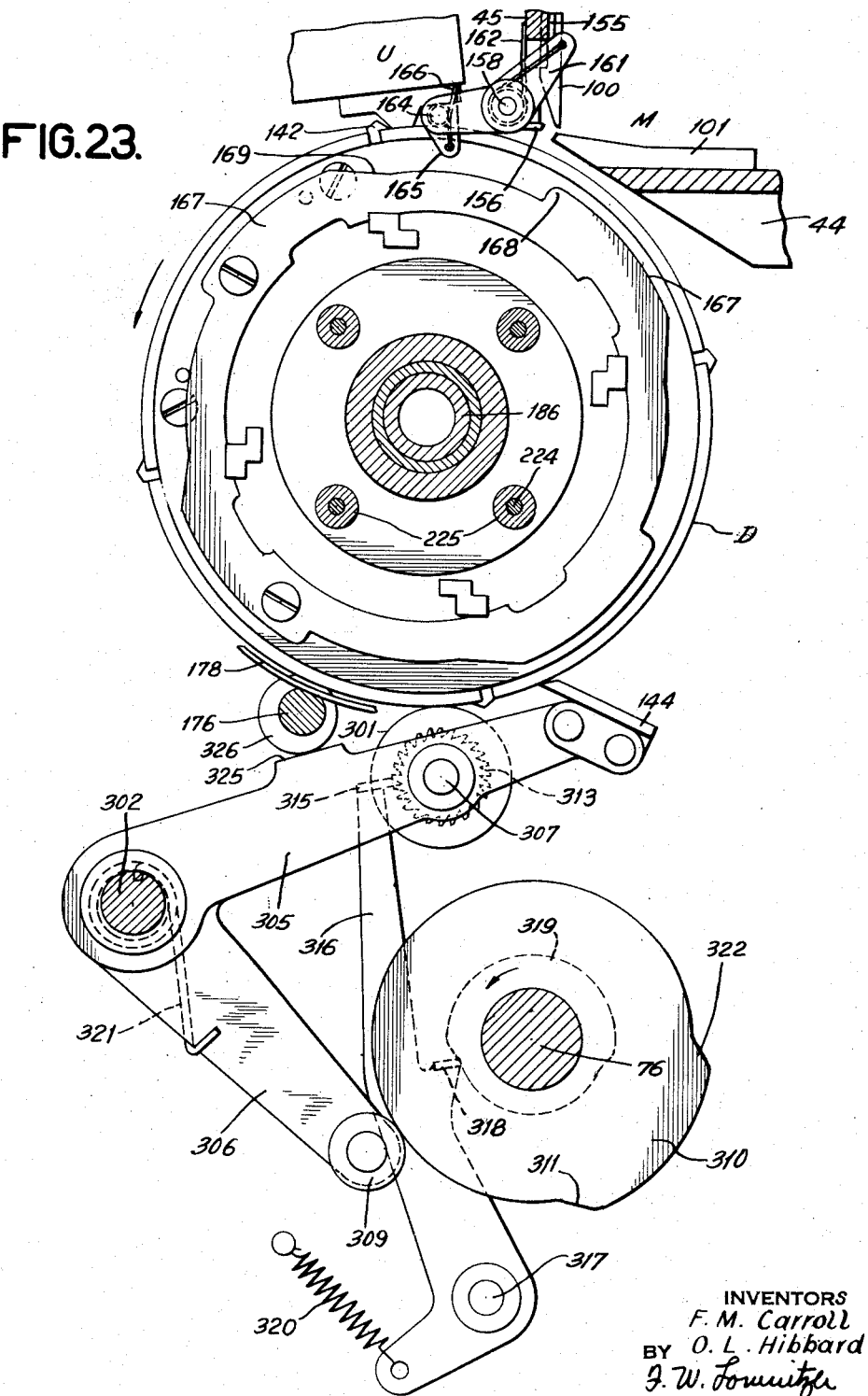
Fig. 23 is a detail elevation view showing the card disengaging means and deflector which is situated intermediate the card feed drum and the stacker for pulling the card off the feed drum.

The deflector blade 156 is riveted to a rectangular bar 157, the left end of which (Fig. 25) is formed as a cylindrical trunnion 158. The bar is pivoted in the two main side frames 42 and 43 by means of a pair of pins 159 and 160 pushed through the side frames and seated as pivots in circular openings cut in the ends of the bar. Attached to bar 157 (Figs. 23 and 25) near the left end is a bell crank 161 alongside of which is assembled a spring 162 pressing between the magazine frame 45 and the vertical arm of bell crank 161 and tending to rock the deflector blade in a counterclockwise direction (Fig. 23), but being stopped by contact of the vertical arm with a striking plate 155 fastened to the inside of frame 45.

The collar 163 holds the spring on the circular end 158 adjacent the bell crank 161. The horizontal arm of crank 161 extends to the left in Fig. 23 and is provided with the pivot point 164 upon which is articulated a flipper 165, said flipper being located in a vertical direction pointing downward and held in this position normally by means of a spring 166 wrapped around pivot 164. The lower end of flipper 165 is in the path of a cam plate 167 secured to the left side wall of the sensing drum D. Cam 167 is formed with a series of four abrupt shoulders 168 which normally abut the flipper 165 from the right and rock it clockwise without having any effect on the position of bell crank 161 and the connected deflector 156. However, when the drum is operated for reversal movement, one of four other cam faces 169 sloping in a direction opposite and more gradual than that of the angle of camming surface 168, approaches the flipper 165 from the left to cause it to be elevated and carrying along therewith the bell crank 161 which is then rocked in a clockwise direction to adjust the deflector plate 156 into a position blocking the magazine opening and tending to deflect the trailing card edge down against the periphery of the carrying drum D. The cam plate 167 is formed with a concentric outer surface long enough to hold the deflector operated while the trailing edge is in the vicinity of the magazine.

Upon return to forward motion of the drum D, the deflector is permitted to drop to the normal position wherein it guides the issuance of cards C out of the magazine and on to the drum.

*The card levers*

The machine is provided with a pair of card levers cooperating with the card sensing drum D to detect the appearance or absence of record cards at the sensing stations under units U and L. In Fig. 10, it is seen that a lever UCL is pivoted on a rod 171 and has a pointed end normally depressed in a groove cut in the periphery of the drum D outside the area of the record devoted to index point positions, but cooperating with one of the margins of the record. When a record is assembled on a sensing drum at the uppermost position under the first grippers to be encountered, lever UCL is raised and rocked in a counterclockwise direction, and the pair of cooperating contacts UCLC are opened.

Another card lever LCL is pivoted on a rod 172 and has a pointed end cooperating with the drum near the lower sensing unit L. This lever acts in the same fashion as lever UCL to detect the appearance of a record which has been advanced beyond the upper sensing station and appears beneath the lower sensing station. Associated with lower card lever LCL are two sets of contacts, the normally open contacts LCLC and the normally closed contacts LCLCa. Upon the appearance of the record at the lower sensing station, the positions of these contacts is reversed. The control exercised by the operation of the card lever contacts is pointed out hereinafter in consideration with the description of the wiring diagram.

The card guides

Although the front end of each record card assembled on the sensing drum D is held thereon by the grippers, the other portions of the card are free and would tend to spring outward and abut against various mechanisms near the periphery of the drum. To eliminate such card contact outside the drum area, a pair of arcuate card guides are provided to confine the card path to a narrow arcuate space concentric with the periphery of the drum. Two guides 177 and 178 are proportioned to cover the areas between the upper and lower sensing station, and the area between the lower sensing station and stacking control means respectively. Guide 177 is fixed to a pair of rods 173 and 174 extending across the space between the two side frames. The second guide 178 is mounted in a similar fashion between a pair of fixed rods 175 and 176 secured to the side frames.

The card carrying drum

Drum D is a hollow cylinder, the ends of which are closed by heavy annular rings 180 and 181 (Figs. 19 and 25), secured to flanges 182 and 183 just inside the ends of the drum. The two rings are seated on a long perforated tube 186 which extends through and is affixed to both side frames 42 and 43, the left end being solid and having an extending portion 89 beyond the outer surface of frame 42, and the right end extending beyond frame 43 to hold an elbow 187 (Fig. 11b) to which is assembled the hose or exhaust tube E (Fig. 1) to carry off the lint, dirt, etc., blown through the perforations 188 (Fig. 19) in the tube 186.

The tube 186 is held in position axially by means of a collar 189 held thereon by a set screw between frame 43 and a hub 190 on ring 181. The left end of tube 186 passes through a bushing 191 on frame 42. Formed on the left end of the tube is a bearing shoulder 120 out of which extends the shaft 89 already mentioned as the picker clutch shaft. However, movement of drum D is independent of the movement of clutch shaft 89. Tube 186 is held fixed and the drum rotates thereon by means of bearing rings 193 and 194 (Figs. 19 and 25) fixed to the inner openings of end pieces 180 and 181.

The periphery of the drum D is divided into four arcuate segments, i. e., four areas between the sets of grippers 141 (Fig. 10). In each of these areas, the drum is perforated with columns and rows of openings, each of which corresponds to an index point on the record card. Since the card C taken for purposes of illustration is the card shown in Fig. 5, alphabet data is represented by a twelve hole code. To correspond with the spacing of the card indicia representations, each of the four drum areas is perforated with eighty columns of holes 195 (Fig. 10) with twelve regularly spaced holes in each column. In other words, between sets of card grippers on drum D there are twelve holes 195 in an arcuate formation, and horizontally displaced across the drum are eighty such formations. These drum perforations are so placed with respect to the set of grippers 141 which precedes them in the counterclockwise direction that they match the location of all the card perforation positions. Therefore, while a card C is on the drum, underlying each of the card perforation positions is a drum opening to allow free passage of air under pressure through the card indicia perforations. On the other hand, all imperforate card index points cover all the other drum openings and prevent air from being blown through them.

The card gripper operating mechanism

It is already mentioned that the sensing drum D contains four sets of card grippers 141 which are equally spaced around the drum to grasp the cards C as they are issued successively out of the magazine M. Reference to the broken sectional view (Fig. 25) shows three of the five grippers arranged across the drum in each set. Each gripper is rectangular in formation and projects upward through a rectangular opening in the periphery of the drum, said five openings being slightly smaller than the heads 142 of the grippers. The lower part of each gripper 141 (Fig. 10) is formed with a foot 197 which acts as a pressing point for one end of a pressure spring 198, the other end of which contacts with the inside of the drum.

Figure 25:
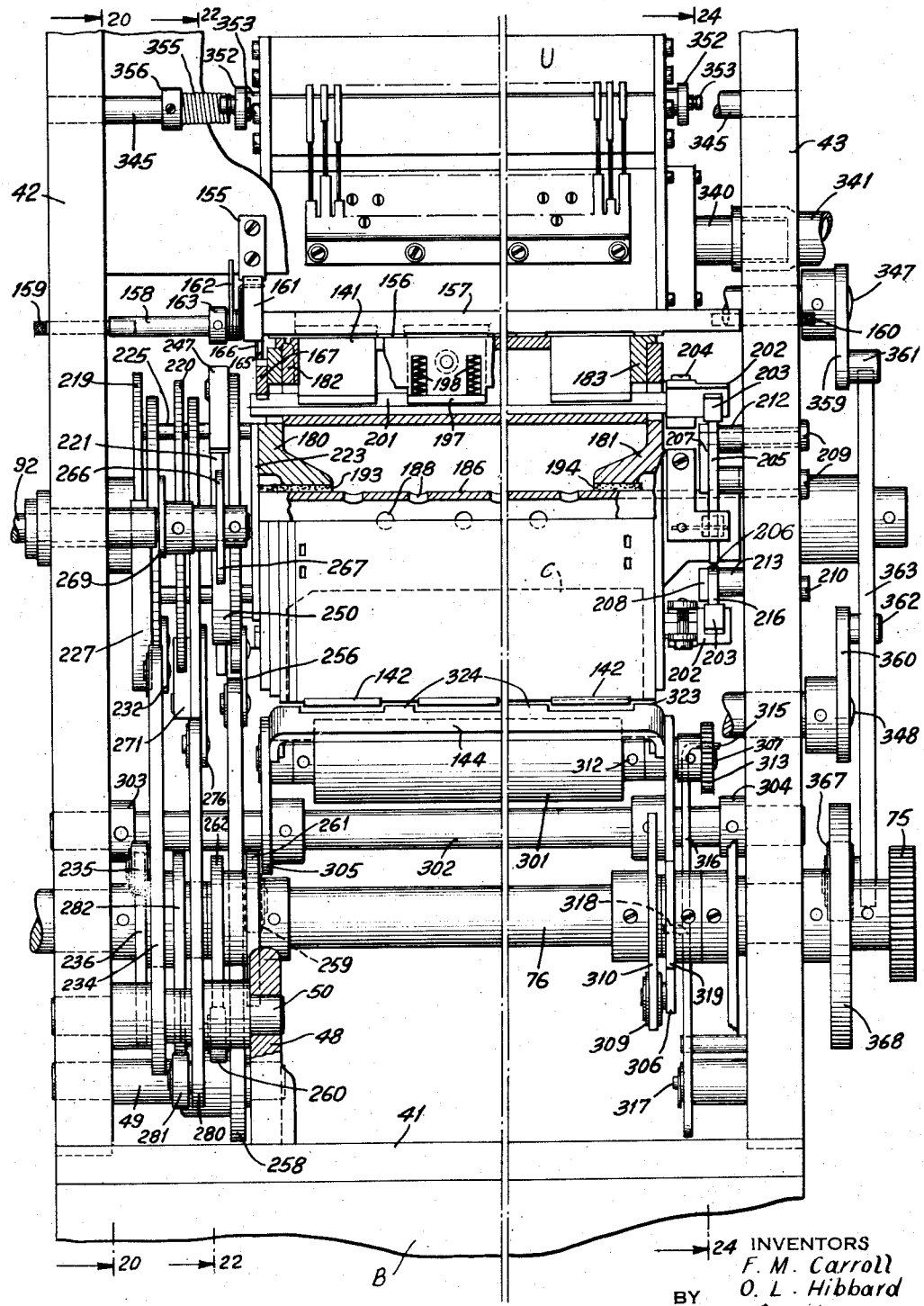
Fig. 25 is a front elevation view showing the card disengaging roller, the feed drum and the operating mechanisms associated therewith for lifting the pneumatic units away from the drum and for operating the grippers to release the card.

All five grippers of a set are supported within an L-shaped formation 200 extending across the inside of the drum D and providing sliding surfaces for guiding the reciprocating movements of the five grippers 141. Reference to Fig. 25 shows that a pair of springs 198 are provided to cooperate with each gripper, and these springs are confined in spaces equally distributed on both sides of the gripper. Extending across the entire drum and projecting through openings in the end rings 180 and 181 of the drum is an operating bar 201 which is seen in Fig. 10 to be shaped in the form of a Z with a lower extension underlying all five grippers 141 of one set. It is through operation of the bar and this extension that the grippers are lifted in unison to receive a record card out of the magazine. Bar 201 is also formed with an upper stopping projection which abuts against a shoulder on the angular formation 200. The bar is confined between the abutting lug of formation 200 and the sides of the grippers 141, but it is free for radial movement away from the center of the drum, and it is with such movement that the grippers are operated.

The four operating bars 201 are operated successively in two of the positions assumed by the sensing drum as it rotates in card feeding operation. The one gripper operating position is that provided for reception of cards as they come out of the magazine, and the other gripper operating position is that encountered after sensing is completed under the two sensing units and the card is about to be put in the stacker.

Figure 24:
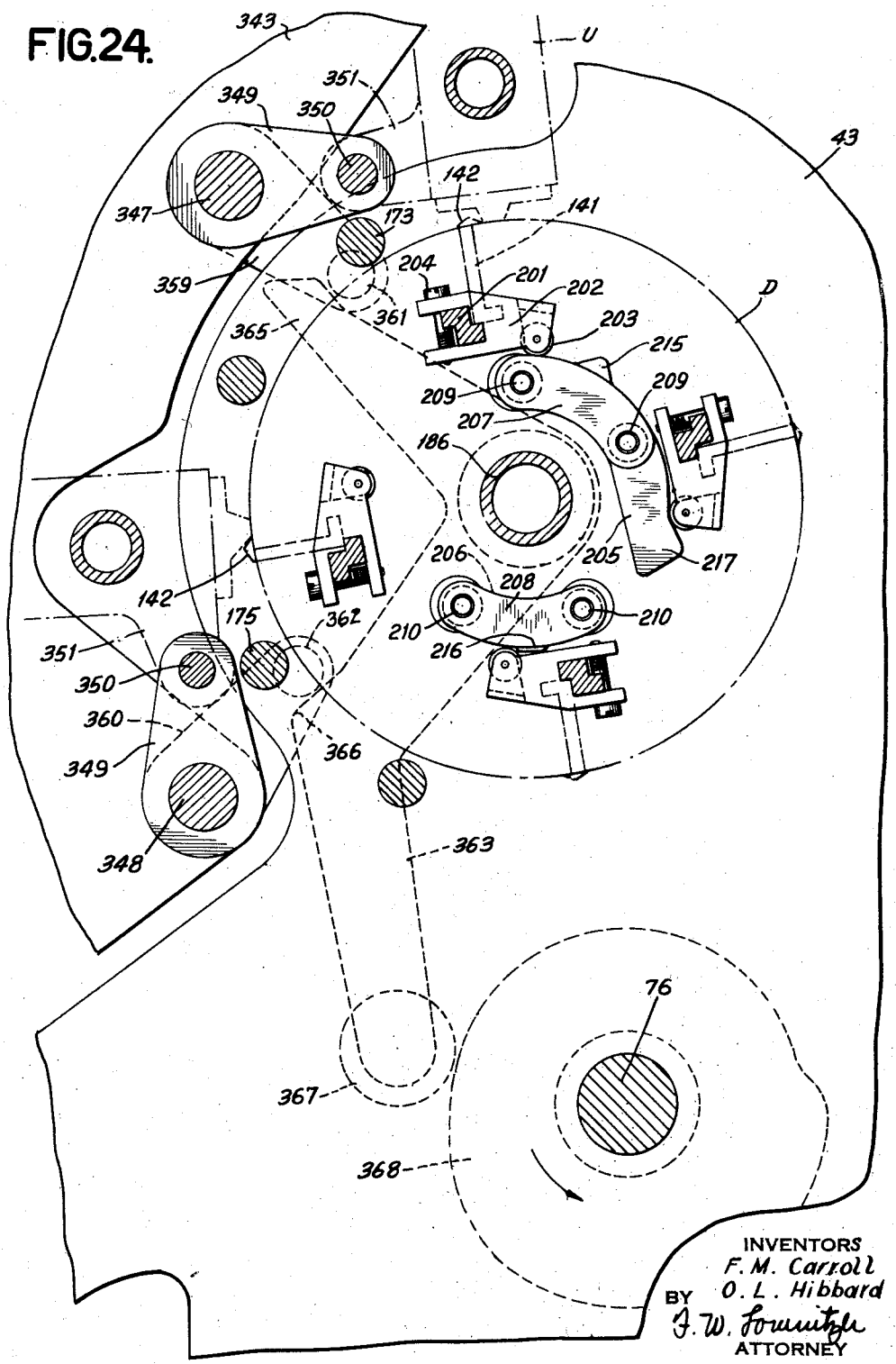
Fig. 24 is a sectional elevation view taken along line 24—24 of Fig. 19 and showing the means for lifting the pneumatic units and the cams for operating the card grippers on the drum.

Referring to Fig. 24, it is seen that all four bars 201 project out of the right side of the drum D and there each one has clamped thereon a holder 202 carrying a roller 203. A screw 204 is bridged across an opening in the holder through which the bar 201 is inserted before the holder is clamped thereon. The four holders 202 are assembled with the rollers 203 pointing inward toward the center of the drum. As the drum rotates, the rollers are brought into successive contact with a pair of cam plates 205 and 206 attached to the inside of the right side frame 43. The cam plates are held in position by a pair of double ended washers, a washer 207 being threaded to receive the ends of screws 209 and the washer 208 being threaded to receive the ends of screws 210. The cam plates are spaced away from the side frame 43 by means of collars 212 and 213 (Fig. 25).

Cam plate 205 has a cam formation 215 (Fig. 24) which serves to elevate the bar 201 which is passing near the upper part of the drum surface circuit of movement with the grippers about the drum center. This projection 215 serves to elevate the bar 201 and raise all five grippers 141 appearing near the mouth of the magazine. This positive movement of the grippers permits insertion of the card under the gripper heads 142. Further movement of the drum carries the roller 203 (Fig. 24) away from the cam projection 215 and allows closure of the grippers by springs 198 to hold the card on the drum. This card clamping position of the grippers is maintained until they reach the positions shown by the bottom set illustrated in Fig. 24. There it is seen that the roller is about to ride over a cam projection 216 formed on the bottom side of the cam plate 206. Actuation by this cam formation causes the grippers to be opened at the same time that another mechanism to be described hereinafter cooperates with the card to withdraw it toward the left away from the gripper station and prepare it for stacking.

Although bars 201 are lifted at only one side, the tipping angle of the bar is sufficient to raise all grippers 141, even the one at the opposite end of the bar and remote from the camming action. There is an excessive movement applied at the camming end to provide for more than the short rise necessary to receive the thickness of a card.

As the drum continues to rotate, the gripper operating roll 203 encounters a third cam formation 217 formed on the lower end of plate 205. This projection 217 is provided for a final opening movement of the grippers before they reach the position of reception for the card out of the magazine and is provided merely to ensure that all cards are discharged before an incoming record is clamped to the sensing drum.

*Card feed drum rotating mechanisms*

The card feed drum D is rotated and oscillated by means of pawls engaging notched disks or ratchet wheels attached thereto. Certain of the pawls operate to rotate the drum in the forward card feed direction as long as ordinary detail cards are presented. Other pawl mechanism is provided to reverse the direction of the drum movement and oscillate it a selected number of times for heading or cross footing card control to read several selected number of fields of data or repeatedly sense one field on each card. The reverse pawl mechanism is under control of the special heading digit perforations SP which is also by virtue of its value a cycle control perforation for selecting a predetermined number of drum reversal operations, the number of reversals needed depending on the number of fields of information to be recorded or added.

In Figs. 11a and 19, it is seen that attached to the left end of drum D is a set of three spaced ratchet disks or wheels 219, 220 and 221. Disk 220 is used for the reversal movement and the other two disks are used for initial and terminal forward feed movement.

Fastened to the annular end ring 180 of drum D (Fig. 19) is a circular plate 223 carrying four studs 224 (Fig. 20) equally spaced around the shaft tube end 186 and upon which the disks 219, 220 and 221 are fastened and keyed in the proper angular position. A number of spacers 225 are assembled on the studs 224 where they serve to separate the disks and hold them in correct longitudinal positions.

Figure 20:
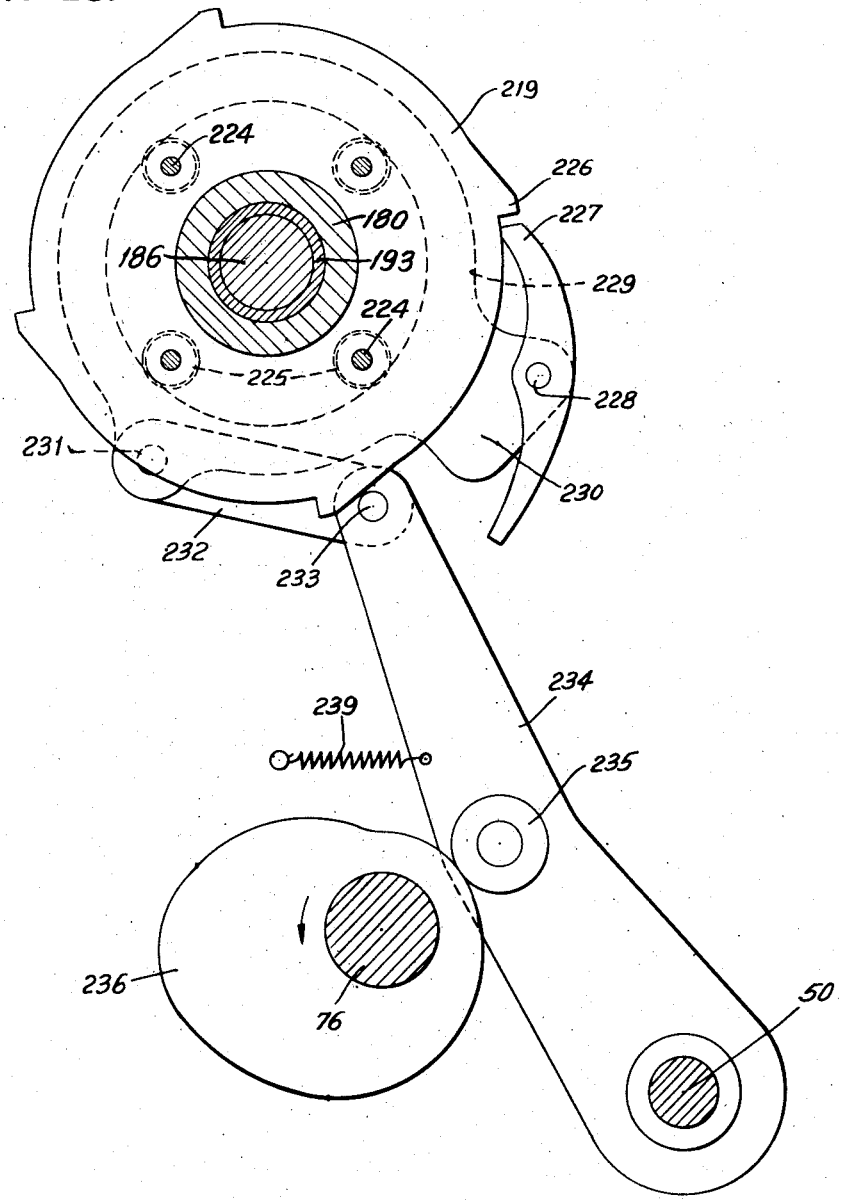
Fig. 20 is a detail elevation view taken along line 20—20 in Fig. 11a and showing the forward feed pawl and the operating mechanism therefor.

The main forward feed pawl mechanism is shown in Fig. 20. There it is seen that disk 219 is formed with four ratchet teeth or shoulders 226 which are acted upon by a spring urged pawl 227 pivoted at 228 on the side of an oscillating ring plate 229. There are two extensions on plate 229, an extension 230 for the pawl pivot 228 and an extension 231 which supports the pivot for one end of a link 232. Plate 229 is formed with a large central circular opening bearing on the guide rollers or spacers 225. The other end of link 232 is pivoted at 233 on the end of an operating arm 234 which is loosely pivoted on shaft 50. A roller 235 on arm 234 is in cooperation with a cam 236 that is fastened to shaft 76. A spring 239 is fastened to arm 234 and urges roller 235 into constant cooperation with cam 236.

From the foregoing it is apparent that as shaft 76 is rotated in a counterclockwise direction, arm 234 is first rocked in a clockwise direction, pulling link 232, plate 229 and pawl 227 counterclockwise to turn drum D in the card feeding direction. Then, at about 225° in the cycle of operation, cam 236 presents a descending face and arm 234 is allowed to reverse its direction and rock in a counterclockwise direction, whereby pawl 227 ratchets idly in a clockwise direction over a tooth on disk 219. One of two other pawls come into play at the crest of the forward sweep of pawl 227. As explained hereinafter, if the first of said other pawls is effective, the forward motion is continued, but if the second other pawl is called into operation the drum motion is reversed.

Figure 26:
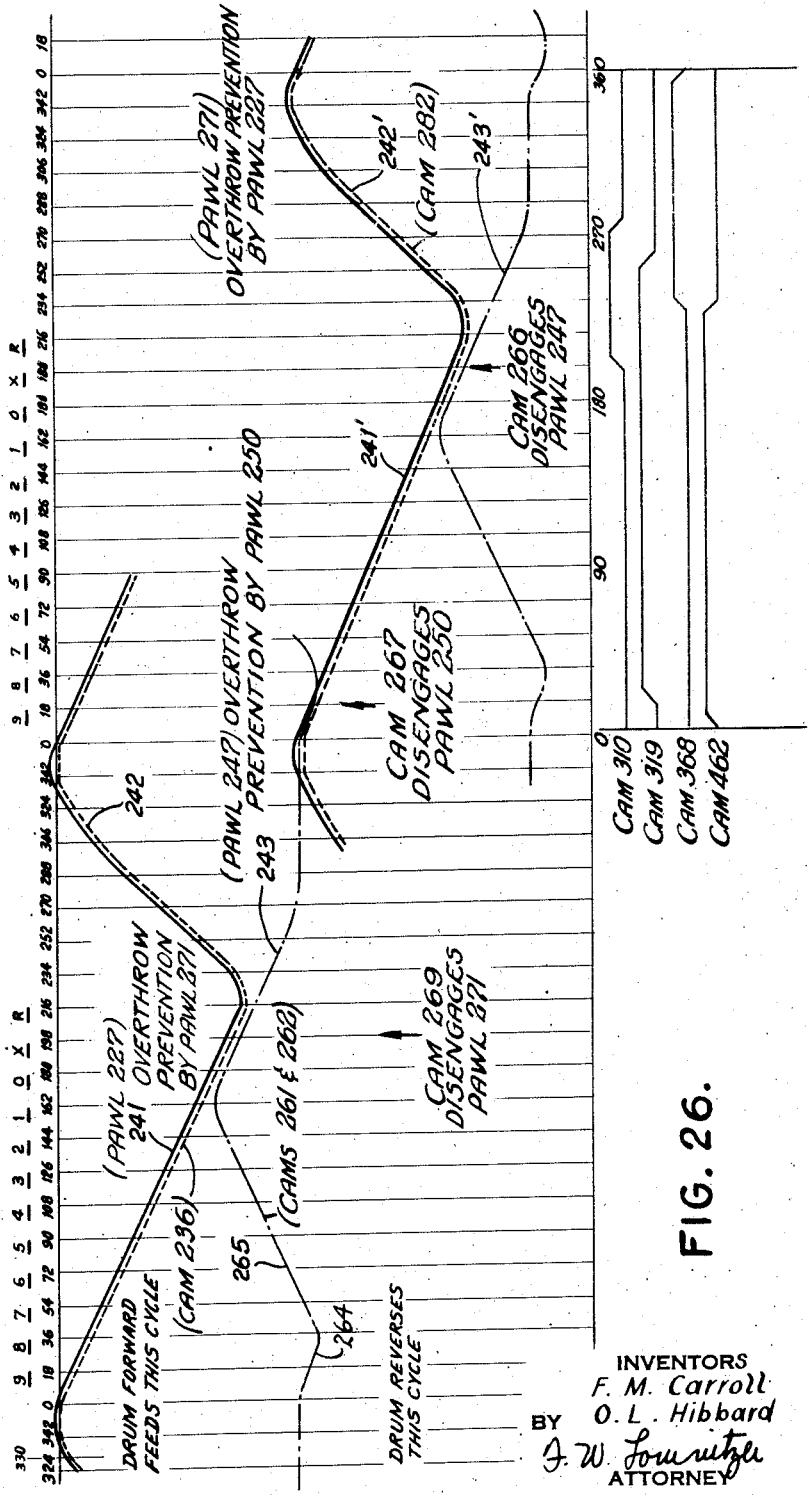
Fig. 26 is a timing chart showing the times of engagement and disengagement of the forward and reverse pawls during a plurality of cycles of revolution of the card feed drum.
Figure 27:
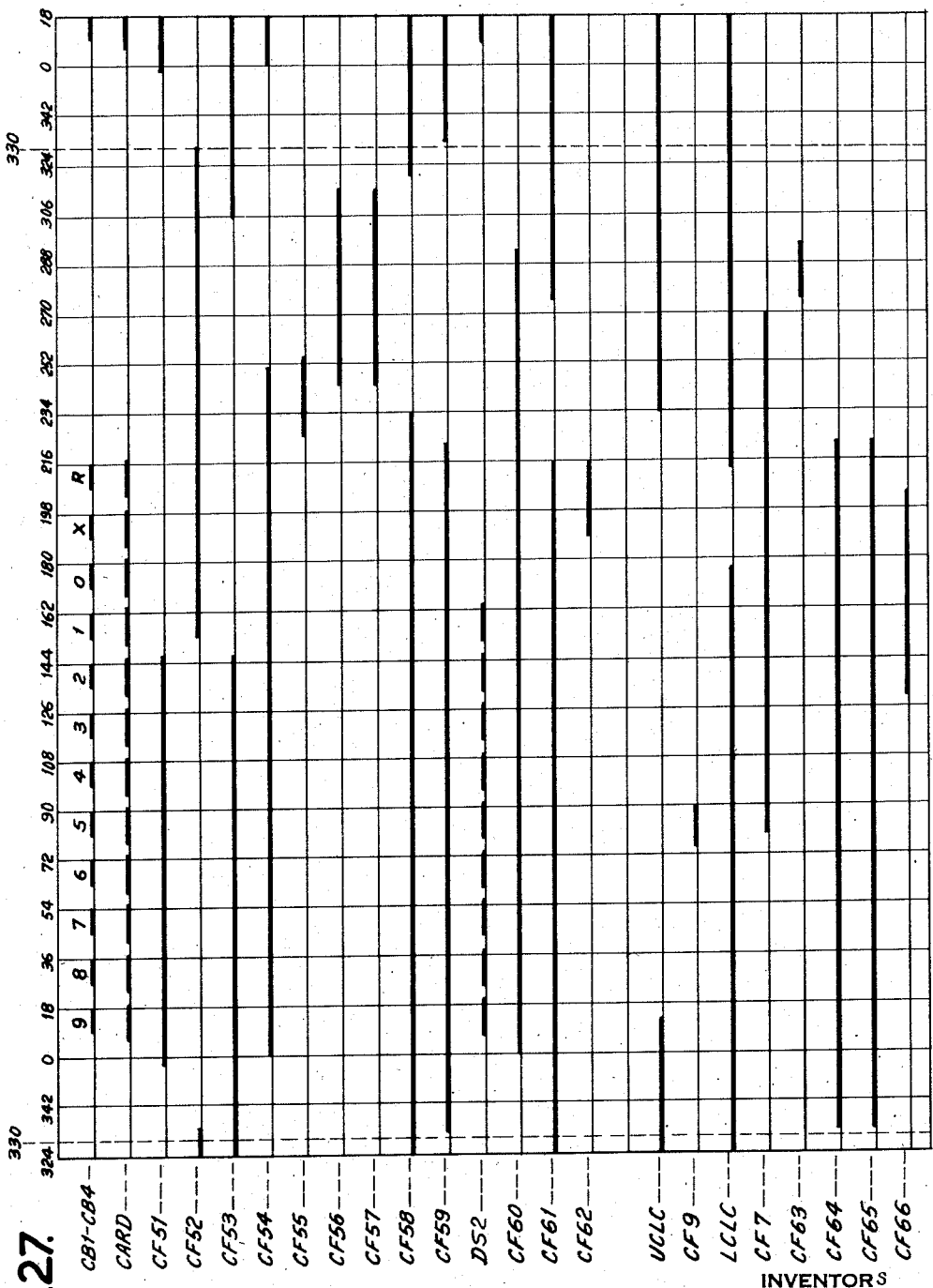
Fig. 27 is a timing diagram or cam chart showing the operating time of the electrical cam contacts.

In Fig. 26 is shown a diagrammatic picture of the action of cam 236 and pawl 227 in comparison with the actions of two other sets of cams and pawls for forward and reverse motion of drum D. Portion 241 of the curve shows the forward feed movement of cam 236, said feed being maintained uniformly from the start of the cycle to about 225°. At that point in the cycle, either of two other pawls are brought into play to continue or reverse the drum movement. However, in any event, pawl 227 is then disengaged and it is swept back to the home position by a motion illustrated as portion 242 on the curve.

Figure 22:
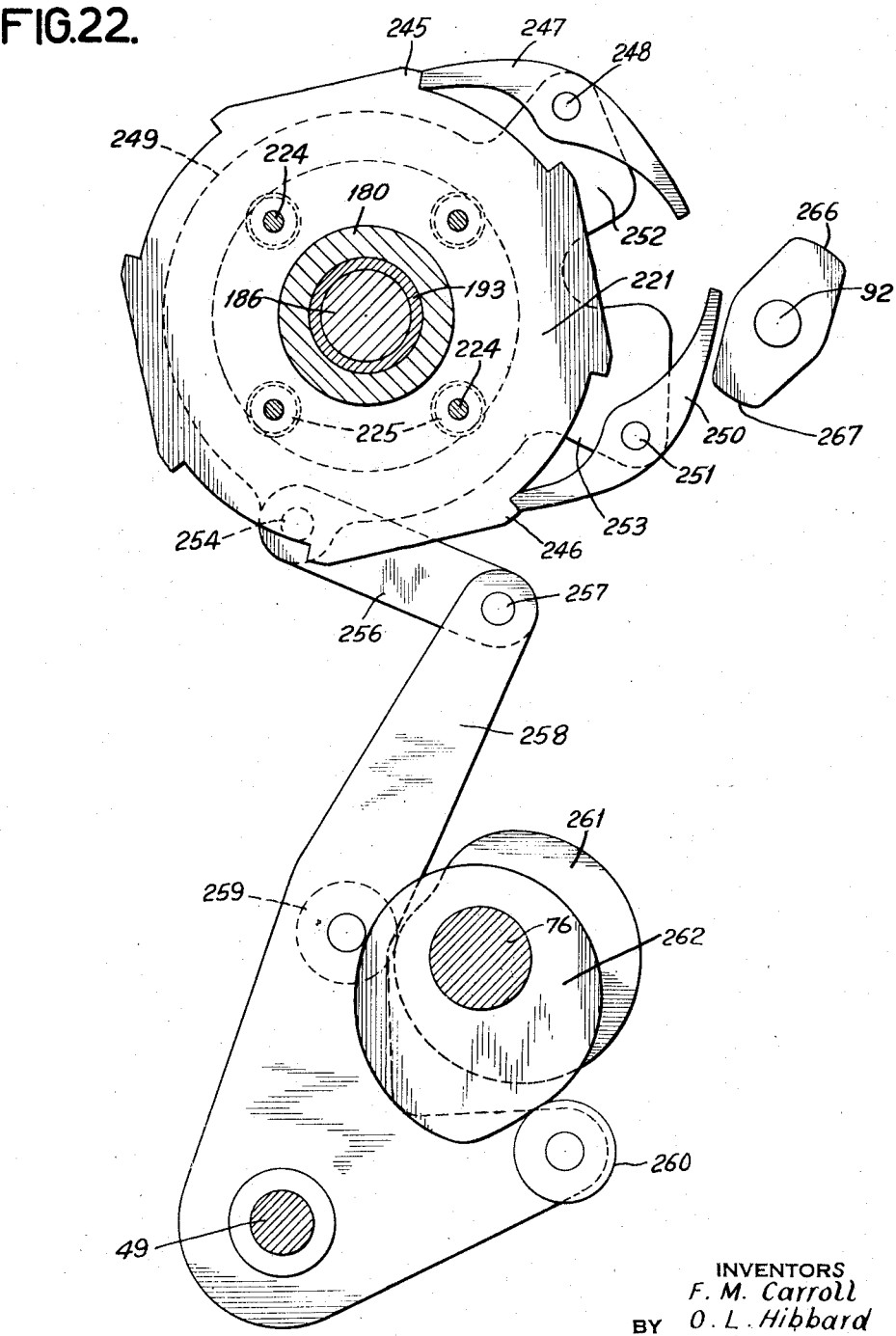
Fig. 22 is a detail elevation view taken along line 22—22 in Fig. 11a and showing the secondary forward feed pawl and the detent for holding the card feed drum in position.

Portion 243 of the curve is representative of the continuing forward feed drum movement which is produced by the pawl mechanism shown in Fig. 22, which is about to be described.

Disk 221, which is the secondary forward feed disk, is provided with four forward feed ratchet teeth 245 and four oppositely facing retaining or overthrow preventing teeth 246. Cooperating with teeth 245 is a spring urged pawl 247 pivoted at 248 on the side of an oscillating ring plate 249. Another spring urged pawl 250 is pivoted at 251 also on plate 249 and facing in the direction opposite to the direction of pawl 247 for the purpose of engaging with the retaining teeth 246. Plate 249 is guided for arcuate movement by certain of the spacers 225 which act as rollers in cooperation with the inner edge of the large circular opening in the plate. There are three extensions on plate 249, i. e. an extension 252 for the pivot 248, an extension 253 for the pivot 251 and a pivot extension 254 for one end of a link 256. The other end of link 256 is pivoted at 257 on the end of an operating lever 258 which is loosely pivoted on shaft 49. Lever 258 carries two rollers 259 and 260 which cooperate with main and return cams 261 and 262, respectively, both of which are fastened on drive shaft 76. Cams 261 and 262 are complementary and together communicate a positive back-and-forth rocking movement to lever 258.

As cams 261 and 262 are rotated in a counterclockwise direction, lever 258 is rocked a slight amount in a clockwise direction, then rocked a substantial amount in the opposite or counterclockwise direction for about one-half cycle, and finally brought back to the home position in a clockwise direction. These three motions are communicated through link 256 to the pawl-holding ring 249, but they are not all communicated to the drum-driving ratchet disk 221 because pawl 250 is disabled during ordinary forward feed cycles and pawl 247 is disabled on feed reversal cycles.

Further study of the three motions of the pawl carrier 249 may be made with reference to the chart in Fig. 26. There, in addition to the auxiliary feed motion 243 already mentioned, other curve portions 264 and 265 are concerned with the three motions of the pawl carrier of Fig. 22. The first slight motion 264 is made for the purpose of following along with the motion of the forward feed while the overthrow preventing pawl 250 is rocked out of action by a cam 267. The second motion 265 is provided as a cocking operation for the secondary forward feed pawl 247, i. e., it serves to bring that pawl back into engagement with a ratchet tooth and ready to take over the forward drive when the primary drive pawl 227 (Fig. 20) is disabled to permit either reversal or continuation of forward feed. The third motion portion 243 (Fig. 26) is the representation of the actual effective movement of the secondary drive as a continuation of the forward feed by secondary pawl 247 in taking up the feed where initial pawl 227 leaves off.

The actual mechanical cooperation attending the three motions just discussed may be studied further with reference to Fig. 22.

The slight depression in cam 261 and the related rise on cam 262 are productive of an initial clockwise movement of lever 258. This movement is imparted to the pawl carrying ring 249 to make it momentarily synchronized and parallel in movement with the ratchet disk 221 and the forward motion of the drum D. Thus, pawl 250 is moved ahead of tooth 246 and does not interfere with the forward feed. During this short interval, a cam 267 rotated clockwise by a shaft 92 engages the free end of pawl 250 and rocks it counterclockwise to disengage it from tooth 246. Then the pawl carrier 249 is free from the ratchet disk with respect to clockwise movement which is the second action to take place.

Due to the rise on the first half of cam 261 and the accompanying descent on cam 262, the second motion of lever 258 is a swing in the counterclockwise direction to carry the pawl holder clockwise and opposite to the forward motion of the drum and ratchet disk 221. This pawl cocking movement is of such an extent as to terminate with lower end of pawl 247 opposite a cam 266 on shaft 92 at the same time that the effective end of the pawl snaps behind a tooth 245. This is at a time just before the main forward feed pawl 227 is disengaged. It is at a time when a choice is made between a continued forward feed or a reversal feed. If no heading card is detected, a continuous forward feed is desired and then shaft 92 is moved longitudinally to shift cam 266 out of the plane of pawl 247 which then remains in effective position to engage a tooth 245. Should drum reversal action be selected by the appearance of a heading card, cam 266 remains in the plane of pawl 247 and in its rotation the cam strikes the lower end of the pawl to rock it clockwise and lift the upper end above tooth 245, so that the tooth can move under the pawl as the drum reversal action takes place.

Assuming that an ordinary continuous forward feed is to continue for the third motion 243 (Fig. 26), then cam 266 (Fig. 22) is ineffective, and pawl 247 is effective to continue the forward counterclockwise motion of drum D from the point about 220° in the cycle where pawl 227 stops its motion for the forward drive. As pawl 227 (Fig. 20) is retracted or cocked for the next cycle (motion 242, Fig. 26), pawl 247 (Fig. 22) acts on disk 221 to carry drum D forward counterclockwise (motion 243, Fig. 26) to finish the forward feed cycle.

The end of the forward movement is not attended with a spin or overthrow of the drum. A controlled drum position is assured because pawl 250 (Fig. 22) has been engaged with the forwardly facing tooth 246 all during the secondary forward feed. Since pawl 250 and all of its connections down to cams 261, 262 have a certain positively controlled position for all the operating points, drum D through teeth 246 is controlled to end all cycles at one of the four regularly spaced positions. It is in such a position where a tooth 226 (Fig. 20) appears directly in front of pawl 227 in readiness for further forward feed.

In the foregoing sections of the description, it is assumed with regard to Fig. 26 that the forward feed is continuous, i. e., the forward feed portion 241 is followed by the continuation 243, and that the retraction 242 of the feed pawl is not joined by a reversal of the feed drum movement. For purposes of explanation it will be assumed that on the second operating cycle the drum D is reversed in movement. In other words, the initial forward feed movement 241' is not followed by the continuing movement 243' but, instead, drum D is reversed along portion 242' to move back along with the retraction or cocking movement of the forward feed pawl. This reversal movement is caused by heading card controlled disablement of pawl 247 (Fig. 22) by cam 266 and at the same time a similar, normally effective cam 269 (Fig. 21) is ineffective so that the reversal pawl mechanism operates as about to be described.

Figure 21:
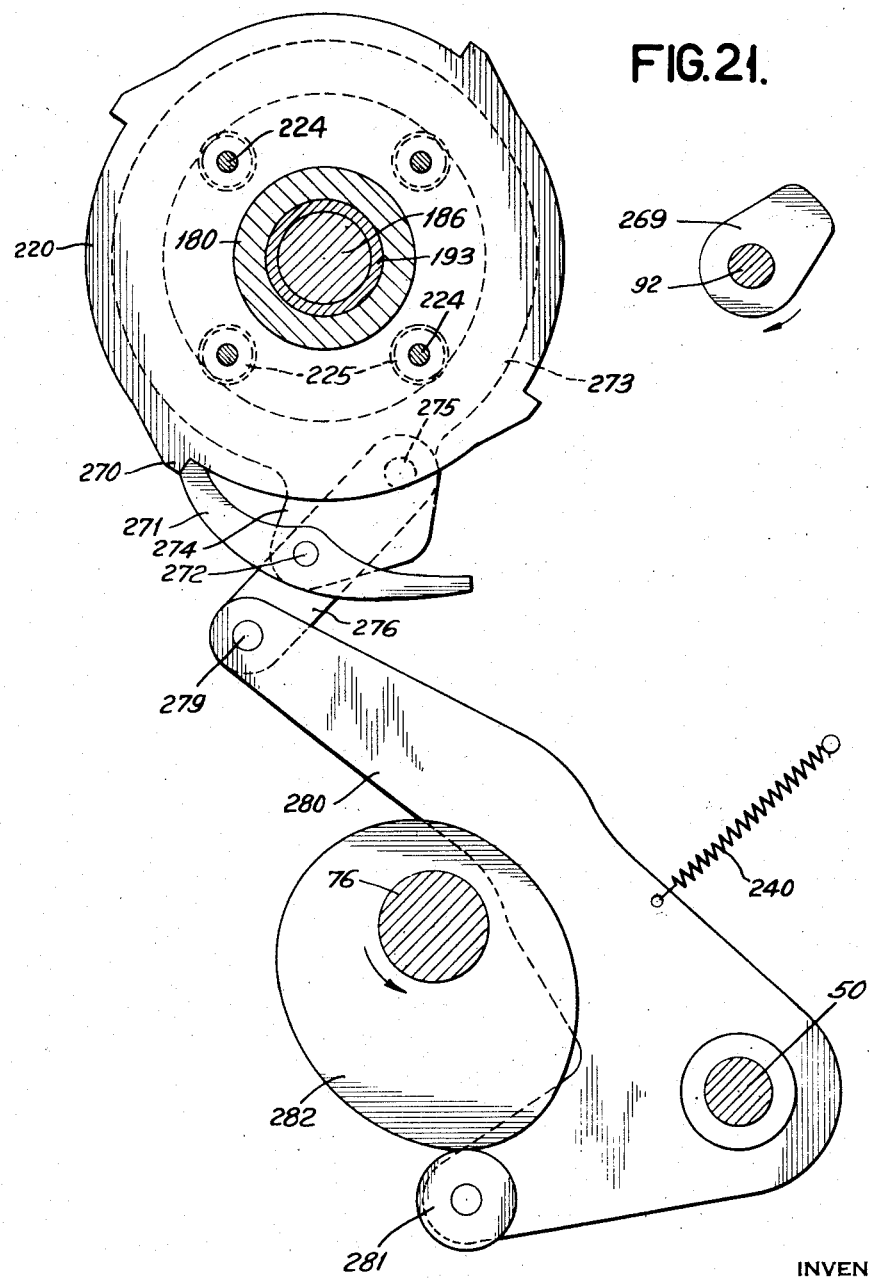
Fig. 21 is a detail elevation view taken along line 21—21 in Fig. 11a and showing the reverse feed pawl and the operating connections therefor.

The reversal feed mechanism of Fig. 21 comprises disk 220 which is fastened to drum D and formed with four ratchet teeth 270. Acting upon one of said teeth is a spring urged pawl 271 pivoted at 272 on the side of an oscillating ring plate 273. An extension 274 is formed on the outer edge of plate 273 to carry the pivot 272 and another pivot 275 for one end of an operating link 276. Plate 273 is circular in shape with a large central opening as a bearing resting on the guide rollers or spacers 225.

The lower end of link 276 is pivoted at 279 on the end of an operating lever 280 which is loosely pivoted on shaft 50. A roller 281 on lever 280 is in engagement with a cam 282 that is fastened to shaft 76. Spring 240 is attached to lever 280 and urges roller 281 into constant contact with the periphery of cam 282.

It is readily observed that as shaft 76 is rotated in a counterclockwise direction, lever 280 is first rocked in a clockwise direction pushing link 276 before it and turning ring plate 273 counterclockwise so that pawl 271 rides in the same direction as the forward feed pawl 227, which is then active. That first movement of pawl 271 is a cocking movement which puts the pawl in the position for a return drum-reversing sweep. At the end of the initial movement of pawl 271, the pawl stands opposite cam 269 whereby it is cammed out of action when ordinary detail cards feed in continuous forward feed cycles. However, for reversal cycles cam 269 remains out of the plane of pawl 271 and then the pawl remains in engagement with tooth 270 and becomes effective at the end of the forward sweep of pawl 227.

At the same time that the forward feed pawl 227 is reversed in direction, reverse pawl 271 is also changed in direction from the ineffective counterclockwise swing to the effective clockwise reversal drive motion. Cam 282 is so shaped that lever 280 is rocked counterclockwise in synchronism with the retraction or cocking movement of forward feed pawl 227. This is apparent on the chart of Fig. 26 where the feed motion portion 242' is seen to comprise parallel lines depicting the synchronized motions of pawls 227 and 271. Counterclockwise motion of lever 280 is transmitted by the pull of link 276 on ring plate 273, and pawl 271 is rocked clockwise, pushing disk 229 and the connected drum D in a clockwise direction which is the reverse of the usual forward feed movement. In this fashion, the card on the drum instead of continuing towards the stacker is brought back toward the magazine M for one-quarter turn of the drum, so that it can pass under the lower sensing unit L a second time. In accordance with the value of the special perforation in a heading card, the reversal action may be repeated more than once for several sensing operations to read all fields of data on the card.

It will be noted that overthrow of the drum is prevented on the reversal motion because, while pawl 271 is driving through tooth 270, pawl 227 is in the path of tooth 226 to retard the drum reversal movement and check it from going beyond the proper cycle end position.

There is a somewhat corresponding control by pawl 271 over the drum driving action of pawl 227. When pawl 227 is effective in the initial forward feed motion, pawl 271 prevents overthrow because it is in the path of tooth 270. At the end of the forward feed cycle, pawl 271 stands in the path of an oncoming tooth 270 and acts along with pawl 250 to define the home position of the drum.

It is apparent from the description of the actions of the four pawls 227, 247, 250 and 271 and the cooperating ratchet disks that the positions of the drum are completely controlled all the way in both directions. The one pawl, pawl 227, is seen to act invariably and independently of the cams on shaft 92. However, all the other three pawls are subject to the longitudinal setting and the rotative action of the cams on shaft 92 as influenced by heading or cross footing card detection. Therefore, it is thought well at this point to describe the control over and the operation of cam shaft 92.

*Feed pawl control cams*

It is already noted that cams 266, 267 and 269 (Figs. 21 and 22) are on shaft 92 and that they control the positions and effectiveness of the secondary forward, overthrow and reverse pawls for driving the card feed drum D. In Fig. 13 it is seen that the two cams 266 and 267 are on one hub 285 pinned to shaft 92. The other cam 269 is on a hub 286 also pinned to shaft 92. The cams are on the part of shaft 92 inside the frame 42 while another end of the shaft projects through the long bearing or sleeve 93 and carries the gear 91 (Fig. 12), which is in mesh with a driving gear train that keeps the shaft rotating continuously in a clockwise direction.

Hereinbefore, in connection with the description of the card picker mechanism, it is pointed out that a clutch pawl 123 is normally effective to drive the picker cam 118. This same clutch device is used to shift the shaft 92 carrying the control cams 266, 267 and 269. The disk 124 which carries the clutch pawl 123 is formed with an arcuate face cam segment 287 best shown in Fig. 13, where the parts are shown in a partly operated position. There it is seen that cam 287 cooperates with a roller 288 on a lever 289 which is formed with a yoke 290 pivoted on a pin 284 and embracing a bearing block 291 fastened to frame 42. Lever 289 swings in a horizontal plane and is pressed against cam 287 by a compression spring 292, one end of which is seated in a hole in frame 42 and the other end encircles a stud 293 on the side of the lever. An end of the lever is formed with a pair of prongs 294 which are fitted in a circular groove 295 cut in shaft 92 near the outer end.

As long as the clutch pawl 123 connects the cam disk 124 to the notched drive 90, cam 287 is rotated and is effective to operate the lever 289 to swing it counterclockwise, Fig. 13, to disable reversal and then late in the cycle under the urging of spring 292 the lever is allowed to swing clockwise to the home position. The lever remains in the home position for more than half of the cycle, after which the cam 287 engages roller 288 and rocks the lever counterclockwise to put the reverse disabling cam 269 into effective position, where it remains until near the end of the cycle.

When in the home position (i. e. with roller 288 riding on lower part of cam 287 and shaft 92 pushed outward), shaft 92 is positioned to put cam 267 (Figs. 22 and 25) in alignment with pawl 250, so that early in every cycle rotation of cam 267 causes pawl 250 to be rocked to free disk 221 for the forward drum movement.

For the regular forward feed cycle, cam 287 (Fig. 13) is effective at about 200° in the cycle to operate lever 289 and shift shaft 92. This serves to place cam 269 in the plane of the reverse feed pawl 271. In Fig. 25, it is seen that the shift of shaft 92 to the right has the effect of putting cam 269 in the plane of pawl 271 at the same time that cam 266 is moved out of the plane of secondary forward pawl 247. Thus, the dual purpose is accomplished of preventing a reversal action by rocking pawl 271 (Fig. 21) out of action by rotation of cam 269, and at the same time allowing the secondary forward feed pawl 247 (Fig. 22) to remain in action without interference by cam 266 so that the forward feed cycle is completed.

In all cases where a cam lifts a pawl to prevent drum driving action, the extent of time during which it is lifted is sufficient to allow another pawl to shift the toothed disk so that a tooth is advanced under the lifted pawl before it is released. In this way, pawl disablement is made effective without the need for prolonged cam action.

For the reverse feed cycle, a heading or cross footing card is detected electrically and as a consequence magnet CRCM (Fig. 12) is deenergized. Then spring 133 is effective to rock armature 121 counterclockwise, whereupon its lower end is in the path of the extension 134 on clutch pawl 123. At the end of the feed cycle during which the heading card is sensed, the clutch pawl 123 is disengaged by armature 121 and cam 287 is held in the home position as long as drum reversal operations are needed to read all the fields of the card. As already noted, when the cam 267 is in the home position (Fig. 13), lever 289 is rocked clockwise, and shaft 92 is pulled outward with the three cams thereon in the positions shown in Fig. 25.

Cam 267 is effective as usual to lift the control pawl 250 out of the way, early in the cycle. Cam 266 remains in the plane of pawl 247 so that at about 200° of the cycle it is effective to lift the secondary forward feed pawl out of action to permit the reversal action. Since cam 269 is held out of the plane of pawl 271, this reverse drive pawl (Fig. 21) becomes effective at about the same time that the pawl 247 is lifted and the same time that pawl 227 is retracted, with the result that pawl 271 drives the drum D for one-quarter turn in the clockwise direction which is the reverse of the forward feed direction.

At the beginning of the next cycle (either another reverse heading card cycle or a regular forward detail card cycle), forward feed pawl 227 (Fig. 20) is again effective for the first part of the cycle. It will be noted that in this first card reading portion of every cycle, pawl 227 is always effective to pass every card forward with a uniform motion under a sensing unit. Reversal action, if it is selected to take place, always takes place in the last part of the cycle, after the card analyzing portion of the cycle.

Frequent reference has been made to the shifting of shaft 92 axially, while at other points reference is made to the constant rotation of this cam shaft. The two conditions are possible because of the extra width of the driven gear 91 (Fig. 13) fastened to shaft 92. Whether the shaft is in the outwardly extended position or pushed inward, gear 91 remains in mesh with the driving gear 86.

In Fig. 10 the pivot 228 of pawl 227 is seen to hold the center of a coil spring 298 which presses between a pin 299 and the tail of the pawl to tend to keep it engaged at all times. The other three drum driving pawls are similarly equipped with springs to urge them into effective positions.

*The card disengaging devices*

As the drum D (Fig. 23) rotates counterclockwise to draw the card past the two sensing stations and beyond, the drum arrives at a position wherein the card is to be disengaged therefrom and passed into the stacker. After the card is completely analyzed, the front end of it (i. e., the end held between the drum and five gripper heads 142) appears at the bottom of the drum periphery. The card position of interest is the one near the guide bail or deflector 144.

Before the card can be swerved out of the path around the drum, it must be disengaged from the row of grippers. As already explained with reference to Fig. 24, card disengagement is partly taken care of by the action of cam 216 in depressing the row of grippers near the bottom of the drum. However, the gripper release action is not enough to free the card entirely from the drum D (Fig. 23) because the front end of the card still lies under the depressed gripper heads. Provision is made for retracting the free card so as to draw the front end of the card back of the gripper heads so that the card can move at a tangent to the drum. This retraction operation is performed by a locked friction roller 301 (Fig. 23) about to be described.

Referring to Fig. 25, it is seen that the friction roller 301 extends across the machine under the lower part of the periphery of drum D and is mounted inside the bail containing the guide deflector 144. The bail is pivoted on a shaft 302 extending through the two side frames 42 and 43 and held in position by collars 303 and 304. The bail, in addition to the cross bar 144, comprises an arm 305 and an operating lever 306 situated near the inside of the right side frame 43. Although the sides of the cross bar 144 are riveted to the arm 305 and top of lever 306 to form a stiff bail construction, the friction roller 301 is freely mounted therein on a shaft 307 extending through bearings secured to the side arms of the bail. Extending from the lower end of lever 306 of the bail is a follower roller 309 cooperating with a cam 310 fastened to the drive shaft 76.

It is noted that the roller 309 (Fig. 23) normally rides on the depressed surface of cam 310 and is thereby rocked in a counterclockwise direction to hold the friction roller 301 against the periphery of the card feed drum. Since roller 301 is normally free to turn, it does not disturb card C in the first part of the cycle. A rise 322 on cam 310 acts to rock lever 306 clockwise and separate roller 301 from the drum when the gripper heads 142 are about to pass the roller's point of contact, and the released card is to be free to go to the stacker. However late in every operating cycle a descending portion 311 on the cam allows lever 306 to rock in a counterclockwise direction to place the friction roller in contact with the card which is about to be disengaged from the drum. If the roller 301 were to be allowed to continue to rotate, it would not have the desired retracting effect on the card, and it is for this reason that the shaft 307 to which the friction roller 301 (Fig. 25) is attached by the pins 312 also carries a ratchet wheel 313 attached to one end of the shaft. Cooperating with the ratchet wheel 313 is a detent 315 for preventing the friction roller 301 from rotating while it is cooperating with the card for the purpose of disengaging the card and retracting it from under the gripper heads 142.

The detent 315 is formed as a head on a cam follower lever 316 (Fig. 23) pivoted on a stud 317 extending from the frame 43. Extending from lever 316 is an offset lug 318 extending across the periphery of a small cam 319 secured to shaft 76. A spring 320 is attached to the end of the lever 316 and tends to rock it in a clockwise direction to hold the detent portion 315 in engagement with ratchet wheel 313. Cam 319 is designed to permit the detent to assume the latching relation with the friction wheel during the last third of the cycle, but since cam 310 holds roller 301 down for part of that time, there is only a short interval during which the roller exercises a snubbing action against the card, which is the time required to disengage the card from under the gripper heads 142 and free it for direction into the stacker.

Cam 319 is formed with an elevated cam surface for rocking the detent counterclockwise to disengage it from the ratchet wheel so that, after the late part of each cycle, the roller 301 is released for rotation so that it may be free to allow the retracted card to travel along with the drum in the direction of the rotation of the drum, which is the direction the card is to travel in going toward the stacker.

The bail lever 306 is also maintained in contact with its operating cam 310 by means of a coil spring 321 wound around shaft 302 and caught against the side of the lever to rock it in the counterclockwise direction. As already noted, the bail rocks counterclockwise late in each cycle due to the formation 311 on cam 310. The operating position of the bail is maintained for more than half of the cycle of operation, after which a rise 322 on cam 310 rocks the bail back to the ineffective position for a shorter period.

It will be noted that late in each cycle of operation, when the friction roller 301 is brought up against the card which is to be disengaged, then at the same time the guide 144 also carried by the bail is brought up to narrow the clearance otherwise presented between the upper edge of guide 144 and the gripper edge 142. The pointed upper edge 323 (Fig. 25) of the guide deflector is brought up against the periphery of the drum. This is possible because the pointed end is provided with extending portions 324 which fit in the spaces between the five gripper heads 142 extending from the periphery of the drum. The idea of the pointed deflector end is to prevent the card from moving around with the drum and instead to be directed downward into the stacker.

The counterclockwise motion of the disengaging bail (Fig. 23) is regulated by means of an eccentric collar 326 which is adjustably secured to fixed guide rod 176 and overlying a platform 325 formed on arm 305 which is one side of the bail. Eccentric 326 is adjusted to stop the bail so that the effective position of the bail is not dependent on the remote depressed surface of cam 310, but is regulated near the contact points of friction roller 301 and guide 144. Thus, roller 301 may be stopped in this upward movement with just the right amount of pressure on the card, and the point 323 positioned to skim over the surface of the drum.

In Fig. 10 it is noted that after the card is disengaged from the grippers and roller 301 is made free to rotate, the front edge of the card is directed along the underside of guide 144 until it is fed under the stacker gripper 146.

Sensing unit supports

The sensing units U and L are mounted on a swinging frame which can be tipped back so that about one-half the periphery of drum D may be exposed for cleaning and inspection.

Both main side frames 42 and 43 are formed with an upwardly extending ear such as the ear 330 (Fig. 10) formed on frame 43. Facing ear 330 and held thereto by shaft 331 is an ear 332 on a rockable frame member 343 which is a right side frame for the sensing units. Frame 343 and the companion frame on the left side are of the same thickness as the main side frames 42 and 43. Since ear 330 is cut down to one-half the thickness of main frame 43 and since the opposing ear 332 is narrowed a corresponding amount, the rocking frame 343 is held by collars on shaft 331 to lie in the same plane as main frame 43. The other rockable frame is similarly mounted on main frame 42 to swing in the plane of the fixed frame.

When the frames are rocked to the home position wherein the sensing units are effective, a flat portion of each frame rests on a shelf such as the slanted shelf 333 formed near the top of frame 43. The sensing unit frames are locked in place by a pair of latches 335 pivoted at 336 on the outer faces of the frames. Each latch is formed with a hook which is spring urged to engage over a stud 337 extending from the main frame. A finger piece 338 is also provided whereby the latch may be released and the entire assembly swung back to the dotted position 343'. With the sensing units in the exposed position, access is also given to the surface of drum D, so that all parts related to the sensing operation can be inspected, cleaned and adjusted.

Reference to Figs. 10 and 25 shows that both pneumatic sensing units U and L are shaped generally as rectangular bars of about the same length as drum D and they are placed between the side frames to correspond with the axial position of the drum. Since both units U and L are similarly constructed and mounted in the rockable frame, description of either one applies to the other.

At the top of Fig. 25 it is seen that unit U is placed with a larger amount of space between its left side and frame 42 than there is between the right side and frame 43. This is related to the position of the drum and the cards thereon, each column of which must register with one of eighty air ports formed in the sensing unit. Attached to the right of unit U is a hollow hose fitting 340 for receiving the flexible hose 341 which conveys the air under pressure from a pump to the sensing unit.

The sensing units are suspended within the rockable frame 342, 343 by parallel links which can be operated to raise the units before the gripper heads 142 pass underneath them. Normally, the sensing units are lowered into contact with the card surface which is moving in an arcuate path. A virtual air seal is provided between the air port openings and the contacting card surface. However, while passing beyond the index points near the margin of the card at the bottom, and over to the edge of the next card where the grippers engage it, it is not necessary to preserve the seal because the sensing air pressure is not then applied and therefore the units may be lifted to provide clearance for the gripper heads.

Extending across the rockable frame (Fig. 10) is a pair of suspending shafts 345 and 346 and a pair of operating shafts 347 and 348 for controlling the lifting of the units U and L. Attached to shafts 347, 348 are pairs of arms 349 carrying rods 350 which are also encircled by ears 351 extending from the sensing units. Pivoted on the shafts 345, 346 are the ends of a pair of links 352 which at the other ends encircle shouldered studs 353 extending from the side walls of the sensing units. A coil spring 355 (Fig. 25) is wrapped around shaft 345 and confined by a collar 356 thereon. Spring 355 is wound to exert rotary force and is caught on the top of link 352 to urge it and unit U downward (Fig. 10) in a clockwise direction about shaft 345. A spring similar to spring 355 is assembled on shaft 346 to urge unit L against the drum.

With pairs of links 352 and arms 349 as the supporting means, each sensing unit is mounted for movement radially with respect to the center of drum D. Springs 355 tend to hold the units inward in constant contact with the card surface. Adjustably secured to shafts 350 are pairs of eccentric collars 357 in contact with the fixed support rods 173 and 175 near the inner ends of the two sensing units. These collars determine the exact inner positions of the units and the degree of closeness the units have with, or the required pressure upon, the card surface. By turning the eccentric collars 357 and fastening them in selected angular positions, the inner ends of the sensing units can be positioned as desired on or above the card to eliminate excessive air leakage. An air pressure of from 3 to 10 pounds may be used with 6# as a desirable value.

Although springs 355 tend to hold the sensing units in the effective card reading position, a positive disengaging means is provided to lift the units together for a portion of each cycle. Since the units are spaced exactly at a 90° interval circumferentially of drum D, which is also the interval from card to card thereon, an action for lifting one unit for clearance of the gripper heads may be taken simultaneously with the lifting of the other unit.

Shafts 347 and 348 (Fig. 25) extend outside the right side frame 43 and have fixed on their ends control arms 359 and 360, respectively. Arm 359 carries a roller 361 and arm 360 has a roller 362, said rollers cooperating with an operating lever 363 as shown in Fig. 24. Lever 363 is pivoted loosely on the central drum sleeve 186 and is formed with an extension 365 for operating roller 361 and a knee 366 for operating roller 362. On the lower end of lever 363 is a roller 367 cooperating with a cam 368 fastened to drive shaft 76.

After the card reading portion of each cycle, a rise on cam 368 strikes roller 367 and rocks lever 363 in a clockwise direction. Through the action of lever 363 on rollers 361 and 362, shafts 347, 348 are rocked counterclockwise and, through the connected arms 349, both sensing units U and L are rocked outward in a radial direction away from the surface of the cards on drum D. A concentric raised surface on cam 368 serves to hold the sensing units in the elevated position until the gripper heads 142 have passed under the inner ends of the units. The springs 355 serve to restore the units U and L to the inner effective positions and maintain pressure upon lever 363 to rock it in a counterclockwise direction to the home position as soon as permitted to do so by the descending portion of cam 368.

The pneumatic sensing units

Each of the sensing devices U and L may be considered as a unit, for it is removable for replacement and inspection. Units U and L are similar construction so that the description which follows applies to either structure. The purpose of the pneumatic unit is to direct separate jets of compressed air, one jet for each card column (80 in the disclosed embodiment) against the index point positions of a moving card. In all the imperforate positions of the card, the air is confined and ineffective. However, as soon as a data representing perforation appears under a jet, the air escapes therethrough to pull with a vacuum action on a piston in the stream of the air. Connected to the position are contact closing devices for sending an electrical impulse which is timed to correspond with the data value which is determined by the position of the perforation in the card column. In the case of alphabetic data, two perforations are placed in code positions in a single column to represent a letter, and two differentially timed impulses are initiated by the same pneumatic sensing controls.

Figs. 14–18 show various views of a pneumatic unit. A number of bars extend the full length of the unit and are assembled between side plates 369 and 370 which are formed with the supporting ears 351 and carry studs 353 for supporting links 352.

A set of four metal bars 371—374 are fastened between the end plates 369 and 370. These bars are accurately machined and fitted closely together with air tight joints because they are formed with tubes, cylinders and air chambers for carrying and confining air under pressure. The one central bar 372 is formed with a set of eighty grooves which, when the bars 372 and 373 are assembled face to face, are blocked off to provide eighty rectangular port openings 376 (Fig. 14a) corresponding in size and spacing to the arrangement of columns of data perforations on the card. There is a port 376 for each column of index points on the card, and the unit is located to match the ports with the card columns as they appear directly above the sets of openings 195 in the drum D carrying the card. The lower ends of bars 372 and 373 are beveled down to a smooth blunt end designed to ride on the surface of passing cards.

The top of each rectangular tube or port 376 (Fig. 14) is blocked off and sealed because the groove of which it is composed does not extend to the top of bar 372.

Leading off from each of the vertical tubes 376 is a horizontal cylindrical opening 377 with constricted holes between the two. There are forty such openings 377 in bar 372 and they are arranged in two rows and staggered in position along said rows. A similar number of cylindrical openings 377' are cut into bar 373 where they are also arranged staggered in two rows.

In each of the eighty openings 377, 377' is a piston comprising a disk-shaped piston head 379 and a long rigid piston rod 380 fastened thereto. Attached to the ends of the rods 380 are insulation buttons 381a, 381b, 381c and 381d, which are designated differently to distinguish the rows and tiers of pistons and the order in which they are arranged across the unit. It is apparent from the positions of buttons 381a—381d that not only are the pistons arranged in four rows but the rows are divided into two tiers wherein the pistons are reversed in position, so that the buttons 381a and 381c of the two top rows of pistons project at the right, and the buttons 381b and 381d of the two bottom rows of pistons project from the left of the unit. Rods 380 slide in holes in the bars to guide the pistons.

With the pistons arranged as shown, it is possible to make the working parts of substantial size and durable formation while leading to the port openings 376 which are necessarily of restricted size and close formation as determined by the card index point and column proportions.

Behind the upper tier of pistons is an air inlet chamber 383 and there is a similar chamber 384 behind the lower two rows of pistons. Chamber 383 is formed by cutting a wide groove almost the entire length of bar 371, one end being sealed and that is the end near the side plate 370 (Fig. 15). The other end of chamber 383 is not sealed, because plate 369 (Fig. 16) is formed with a rectangular opening 383' leading into the trapezium-shaped inlet hose fitting 340 which is clamped to plate 369. The other chamber 384 is formed in a similar fashion in bar 374 and coincides with a hole 384' in plate 369 to communicate with the inner opening of the air hose fitting 340.

In chamber 383 (Fig. 14) there extends a shouldered end of the piston assembly. This end abuts against the side wall of the chamber and acts as a limiting stop for the piston 379 which is spring urged toward the left to the home position as shown.

Piston 379 is not fitted closely in the cylinder 377 but instead has considerable clearance so that the air is allowed to flow from chamber 383 to cylinder 377 and build up equalizing pressure in front of the piston quite rapidly after the piston is actuated. In the normal condition of the parts, with piston 379 positioned as shown, air under substantially equal pressure is present in chamber 383, behind the piston in cylinder 377, in front of the piston, and all the way down tube 376 to the port obstructed by the surface of a card. Should there be a slight leak of pressure at the port due to an imperfect seal with the card surface, such a drop in pressure would not be sufficiently abrupt to cause piston actuation. However, when a data representing card perforation appears under port 376, there is a sudden release of the air under pressure through tube 376, the card and a drum opening 195.

The air in cylinder 377 and tube 376 in front of piston 379 is free to move while the air in chamber 383 behind the piston is restricted in movement by the presence of the piston. The result is that the air escaping through the card perforation causes a lowering of the pressure in front of the piston amounting to a vacuum or partial vacuum in the cylinder 377. For a moment this condition exists until the air behind the piston tries to fill the lower pressure area and in so doing moves the piston and the connected rod 380 toward the right.

As explained hereinafter, a contact establishing spring presses against the right end of the piston assembly, and it is this spring pressure which is overcome by the air under pressure. Movement of the piston to the right is of sufficient duration to establish contact before the air passing around the clearance between the piston and the cylinder wall reaches the lower end of tube 376 and abuts against the imperforate card surface following the perforation and tends to equalize the air pressure before and behind the piston. When such a point of equilibrium in pressure is about to be reached and before it is reached, the spring urging the piston assembly to the left becomes effective to restore the piston and at the same time break the contact which is established by movement toward the right.

It is necessary for the actuation of the piston and the resulting electrical contact to be extremely rapid, because there are instances when two perforations in a card column are found directly adjacent each other, and separate impulses must be created by successive actuation of the piston under control of the two perforations appearing one right after the other on the rotating drum under the pneumatic port. For this reason it is important that the size or area of the tube 376, the holes leading from the cylinder 377 into the tube 376 and the clearance between the piston 379 and the walls of cylinder 377 be so proportioned that the right amount of time is allowed to elapse between the actuation of the piston by the vacuum condition and the rapid resumption of pressure equilibrium which follows thereafter. It was found by experiment that the proportions between the area of the rectangular tube opening 376 and the clearance area around the piston 379 should be approximately as 3 is to 1. This proportion presupposes that there is sufficient opening between the cylinder and the tube to allow free escape of the air under pressure. The area of the piston head 379 is about 15 times the area of the port opening 376. The area of piston clearance is substantial so that, when multiplied by 12, it is about numerically equal to the average volume of the air port chamber between the piston and the card. It will be noted that the advantage lies not only in the rapid initiation of an impulse upon the appearance of a card perforation but also the rapid recovery of the impulse creating facilities, so that rapid operations may continue under high speed conditions.

Now that the operation of the piston has been explained with reference to the action of the air pressure thereon, it is believed well to point out how such actuation is converted into the initiation of electrical impulses which are timed by virtue of the positions of the related perforations in the card on the drum. Since the adding and printing devices of the machine are synchronized with the operation of the drum, the resulting impulses are effective to control accumulation of the amounts sensed on the record card and the recording of numerical and alphabetic data also analyzed thereon.

Extending across the top of the electrical sensing unit is a pair of square insulation bars 386 and 387 fastened between the side plates 369 and 370. These two bars are assembled at different levels, the upper one to cooperate with contacts controlled by the upper tier of pistons and the lower one to have association with the other half of the pistons found on the lower level. The bottom portion of each insulation bar is slotted at regular intervals in forty places to receive and hold a like number of L-shaped transmission plates 388. The vertical extensions of these plates 388 are not of similar length but are seen to have two different sizes, the short length extensions being interspersed with the longer extensions and the former provided for the upper row of pistons of each tier. In contact with the horizontal member of each L plate 388 is the pointed end 389 of a vertical terminal 390 projecting upward with plug openings at the upper surfaces of bars 386 and 387.

In Fig. 17 it is seen that these wiring terminals 390 are arranged in a staggered formation across the tops of the two insulation bars. They act as receivers for plug tips on wires leading from the control mechanism of the taubulator. Terminals 390 are formed hollow to receive the tips and establish contact therewith.

Extending downwardly from each terminal plate 388 is a leaf spring 391 which at its lower end fits into a notch cut vertically in the button 381a fastened to the end of the piston rod 380. Leaf spring 391 is tensioned to press the piston assembly toward the left into the normal position, wherein the left end of the assembly abuts against the left wall of chamber 283. The plates 388 formed with the long vertical extensions also carry similar leaf springs 391 in the shape of a bent wire which cooperates with the other row of buttons 381c fastened to the second row of pistons in the upper tier. The plates 388 projecting from the left bar 387 are similarly provided with leaf springs 391 cooperating with the buttons 381b and 381d on the lower tier of pistons.

Associated with the forty leaf springs 391 at the right is a common contact bar 392 fastened to plate 374 but separated therefrom by an insulation strip 393. This bar is formed with a series of upper and lower prongs 394 and 395 extending inwardly toward the sides of the leaf springs 391 but normally separated therefrom. Electrical contact is established between the leaf spring 391 and prong 394 whenever the piston 379 is shifted to the right by change of air pressure attending the detection of the presence of a card perforation. The impulse path flows through bar 392 out to prong 394 against the abutting leaf spring 391 up into the terminal plate 388 and through plug socket 390 to the control wiring.

In order to explain the arrangement of the pistons and connected contact springs more fully, certain of the terminals 390 (Fig. 17) are further designated 390a—390d to point out that the successive denominational or columnar orders of the sensing device alternate from side to side of the unit as well as being staggered in arrangement on each side. It is seen that the terminal 390a is on the right side while the next terminal (i. e. next with reference to longitudinal distribution), terminal 390b, is on the left side, and the other two terminals 390c and 390d also alternate from right to left. It is explained hereinbefore that the buttons 381a—381d also alternate from side to side as well as from tier to tier. Now the effect of such arrangement may be studied with reference to the electrical connections between spring wires or contact blades 391 and the prongs 394 and 395 on the common contact bars 392. The spaced and staggered buttons 381a and 381c (Fig. 18) in the upper tier are seen to extend from the right wall and operate wires to contact with prongs 394 and 395, respectively. Similarly, the spaced and staggered buttons 381b and 381d (Fig. 15) in the lower tier are found to extend from the left bar 371 and operate wires 391 to contact with the long and short prongs, respectively. From the foregoing it may be gathered that the electrical contact devices are made in sturdier proportions and with greater clearances due to the piston arrangement in staggered rows and alternating tiers.

*The pressure control valves*

It is shown in Fig. 1 that a pair of control valves is provided between the compressed air supply tank T and the upper and lower sensing units U and L. These valves cut off the compressed air at times when there are no cards at the sensing stations.

A more detailed showing of the valves and the operating mechanism therefor is given in Figs. 18a, 18b and 18c. Valve V1 is seen to cover the opening to the tube that leads from the main air pressure inlet 334 to the separate duct or tube 341 which is connected to the upper sensing unit U and conducts the air under pressure to the chambers 383 and 384 in the unit housing. The other valve V2 is seen to be positioned to close the valve opening of a cylinder which is the connector between the main air entry space 334 and the separate tube 344 that leads to the air chambers in the lower sensing unit L.

Valves V1 and V2 are seated in a casing 354 secured to the rockable frame 343. The stems of the valves extend below the casing 354 (Fig. 18a) and have formed thereon collars 358 against which press the ends of coil compression springs 364 tending to keep the valves closed.

The lower ends of the valve stems are poised above a pair of bell cranks 399 pivoted on studs 454 extending from a shelf 385 formed on a slide 375 attached with a screw and slot connection 382 to the main side frame 43. Slide 375 is articulated at 479 on the top of an operating arm 457 which is pivoted at 461 on the main frame and carrying a roller 458 cooperating with a cam 462 fixed to shaft 76.

Early in each cycle, cam 462 rocks arm 467 in a counterclockwise direction and the arm then pushes slide 375 to the left, Fig. 18a, so that the cranks 399 thereon press against the ends of the valve stems and lift valves V1 and V2. In Fig. 18c it is seen that the long arms of cranks 399 are normally directly under the stems of the valves and in position to operate them as timed by cam 462 to agree with the perforation positions on the cards, said valves being closed at times other than the index point sensing time.

Cranks 399 are used as interposers for disabling the valve lifting action and thereby cutting off the air pressure supply to one or both sensing units for one or more complete cycles. This control is exercised under control of card levers for detecting the absence of cards at the sensing stations and thereby closing contacts to energize magnets for rocking cranks 399 to prevent valve operation when cards are missing.

In Fig. 18c it is seen that, if a crank 399 is rocked about 30° in a counterclockwise direction, the long arm will be moved out of abutting relation with the end of the valve stem. Then, even though slide 375 reciprocates the cranks axially, the one which has been rocked fails to operate the related valve. The magnets for rocking the interposer cranks are about to be described.

Attached to frame 43 (Fig. 18b) is a bracket 464 carrying a pair of magnets VIM1 and VIM2, the former being controlled by the upper card lever UCL (Fig. 10) and the latter by the lower card lever LCL as explained hereinafter in describing the wiring diagram. Associated with the magnets (Fig. 18b) is a pair of armatures 465 pivoted at 474 on bracket 464. A horizontal armature lever extends to the left and is articulated with the flat end 475 of a call rod 477, the lower end of which is bent to project into a hole in the short arm of crank 399. Ends 475 are guided by a notched bracket 478 and the lower ends are confined by a retaining strip 456 which is forced into grooves of studs 454 and serves to hold the cranks 399 down on the pivots with just enough room between the bottom of strip 456 and the top faces of the cranks for the ends of wires 477 to move freely to operate the cranks.

When a magnet is energized due to the absence of a record at the related sensing station, armature lever 465 (Fig. 18b) is rocked clockwise and wire 477 is pulled upward to rock the crank 399 counterclockwise (Fig. 18c) and move the long arm thereof away from the end of the valve stem. Then, when the slide 375 is shifted upward, it is ineffective to cause lifting of the related valve with the result that no air under pressure is supplied to the sensing unit having no card on which to work.

Printing devices

Figure 7:
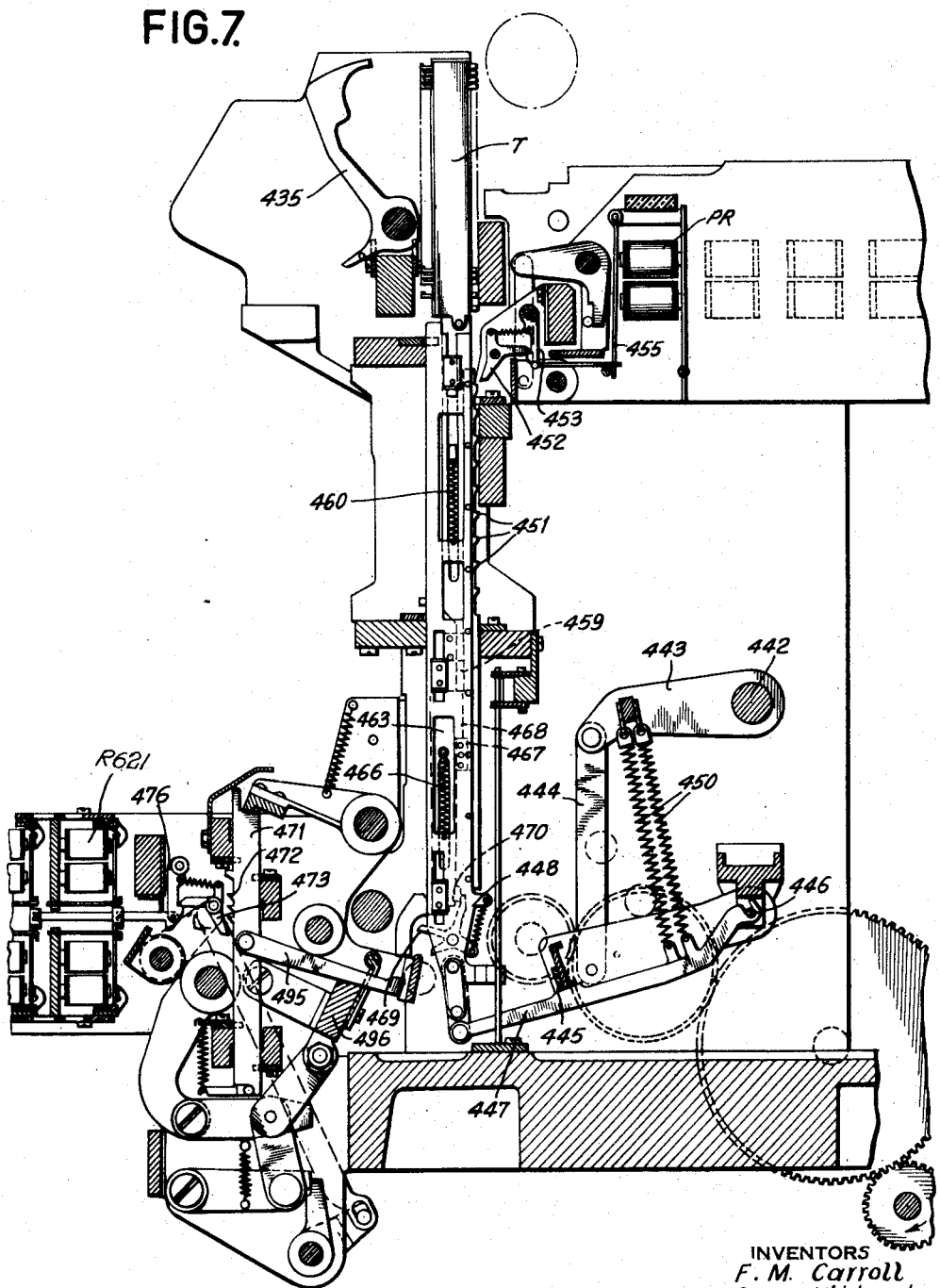
Fig. 7 is a side elevation view partly in section showing the alphabet printing mechanism and the zoning control for governing the location of the type bar in position to print a letter or numeral selected under control of the perforated record.

The alphabetic and numeric printing shown on the sheet SH of Fig. 4 is recorded by means of printing devices such as those disclosed in Patent 2,016,682. A brief description of these devices with reference to Fig. 7 is believed to suffice for the purpose of explaining herein the improvements in sensing and feeding cards having alphabetic data and recording lines of print therefrom.

Figure 5:
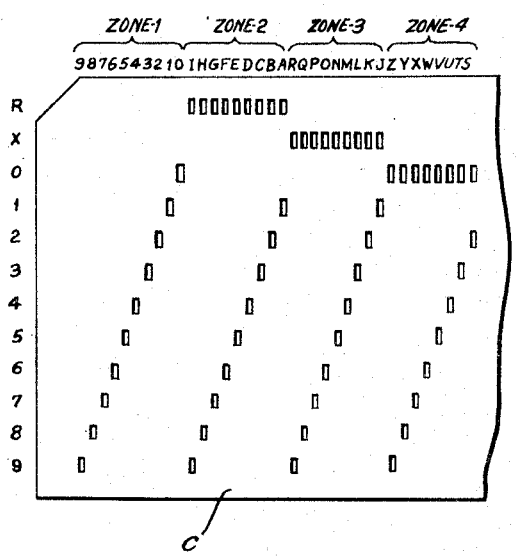
Fig. 5 shows a portion of a perforated record disclosing the arrangement of code perforations for numerical and alphabetic data representation.

The arrangement of the perforations on the record card will first be explained. Referring to Fig. 5, the record card C has the usual perforations for indicating numerical values as shown at the left end of the card. The alphabetical characters from A to I in the second zone are combinations of one of the numerical character perforations from 9 to 1 plus a perforation in the R index point position. The characters J to R in the third zone each comprise a perforation in one of the numerical positions 9 to 1 plus a perforation in the X index point position. The remaining letters of the alphabet in the fourth zone, namely, S to Z, each comprises a punched code combination including one of the perforations 9 to 2 plus a perforation in the 0 index point position.

Figure 6:
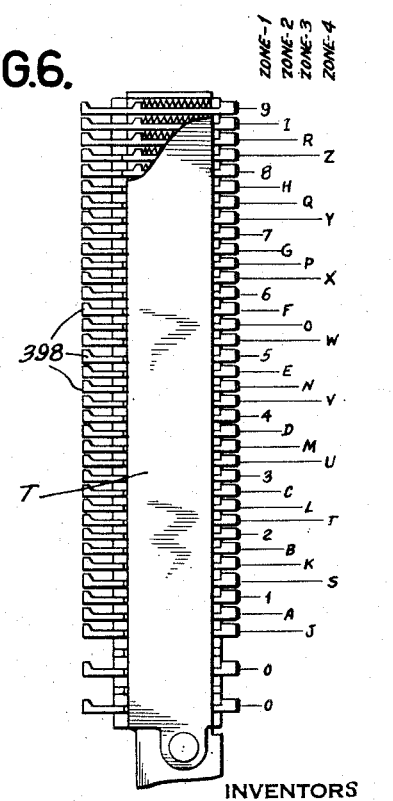
Fig. 6 is a detail view of an alphabet type bar showing the arrangement of digit and letter type thereon in accordance with the code arrangement shown in Fig. 5.

In Fig. 6 is shown the type head T which is provided with a plurality of type elements 398 upon which the digits and alphabetical characters are arranged as indicated. For the purposes of explanation, the various characters are arranged and labeled in accordance with the particular zone; thus, the digits are included in zone 1, the letters A to I in zone 2, J to R in zone 3, and S to Z in zone 4.

Reference to Fig. 5 will show that the letters I, R and Z each contain a perforation in the 9 index point position but have a different zone perforation O, X and R. Similarly, the letters H, Q and Y each contain the perforation 8 and a different zone perforation.

The type head is controlled to move past the printing position in synchronism with the movement of the card past the lower sensing station LB and as the 9 index point position traverses the lower air openings, one of the characters I, R or Z will be in printing position, depending upon the zone setting effected prior to the movement of the card past the lower station.

Between the main operating shaft of the machine and the printer there extends a train of gearing, the printer clutch, and cams for oscillating the type bar operating shaft 442 (Fig. 7). This shaft carries arms 443 which have depending link connections 444 with a bail 445 pivoted at 446. Also pivoted at 446 are type carrier actuating arms 447 which are connected at their free ends to the lower extremities of type carriers 448 through a link connection. Arms 447 are urged in a clockwise direction by springs 450 which are connected at their upper ends to a cross bar extending between arms 443. Thus, as the arms 443 and bail 445 are rocked in a clockwise direction through the action of the main operating mechanism, the springs 450 will rock the arms 447 in the same direction and will cause elevation of the type carriers 448 which are suitably mounted for vertical movement. Each carrier 448 is provided with a series of stops 451 which are representative of 9 to 0 in a descending order and which represent corresponding index point positions on the record card C. As the type bar 448 is moved upwardly, the stops 451 move past a stopping pawl 452 in succession. Pawl 452 is held in position by a latch 453 which has a link connection with an armature 455 of print magnet PR.

Energization of magnet PR will trip latch 453 to permit pawl 452 to rock into engagement with the type carrier under the influence of its spring and engage one of the stops 451 to interrupt upward movement of the type carrier. When a type bar is used to print numerical characters, it will, of course, be controlled by a column of the record card which contains but a single perforation in accordance with zone 1 of Fig. 5, and for such operation the type head T and the carrier 448 are maintained in the fixed relationship to each other as shown in Fig. 7. As the card is passing the lower sensing station, a circuit completed through the perforation will energize the magnet PR and will trip pawl 452 into engagement with the stop 451 corresponding to the location of the single perforation in the record card. This will result in the presentation of the corresponding digit type element at the printing line for recording by action of hammer 435.

Where alphabetical characters are to be printed, the type head T will be displaced upwardly one, two or three steps with respect to the type carrier 448, according to whether the character to be printed is contained in zone 2, zone 3 or zone 4, so that if when the print magnet PR is energized under control of a 9 perforation analyzed at the lower station LB, an R perforation had previously been analyzed at the upper station UB, the type head T will have been displaced upwardly one step thereby presenting the I type to the printing line rather than the 9 type. Similarly, if the perforation accompanying the 9 perforation had been in the X position, the type head T would have been displaced upwardly two steps to present the R type. In a similar manner, the zone perforation of 0 accompanying the 9 perforation would effect an upward movement of the type head T three steps to place the Z type in printing position.

The manner in which the type carrier 448 and head T are constructed to permit relative movement between the two will now be explained.

A spring 460 is provided between the type head T and the carrier 448 and serves to hold the head in flexible cooperation with the carrier. Slidably mounted on the carrier is a slider 463 to which is attached a spring 466 that pulls the slider down, so that an extension 468 thereon engages a block 467 on the carrier. Spring 460 urges the head T down so that its lower end 459 engages the uppper edge of slider 463 and therefore head T will be raised by upward adjustment of the slider.

A spring pressed latch 469 pivoted on the carrier 448 cooperates with steps 470 on slider 463 so that, as the slider is lifted, the latch will hold the parts in the displaced relationship. A vertically slidable comb 471 is provided with three stops 472 which are adapted to be moved upwardly past a stopping pawl 473 in synchronism with the passage of the zone perforations O, X and R past the upper sensing station UB. The zone magnet R621 differentially releases a latch 476 and allows pawl 473 to stop comb 471. The movement of comb 471 is transmitted to slider 463 through an arm 495 pivoted on the comb and fulcrumed on the top of bail bar 496. Thus, the three zoning movements are imparted to the type head T and any letter of the alphabet may be printed.

Sheet spacing and feeding devices

Record sheet SH (Fig. 4) is line spaced and ejected from form to form by means of automatic spacing devices such as those found disclosed in Patent 2,189,025. A short explanation of the action of the line spacing and long feed eject devices is thought sufficient for present purposes.

Figure 8:
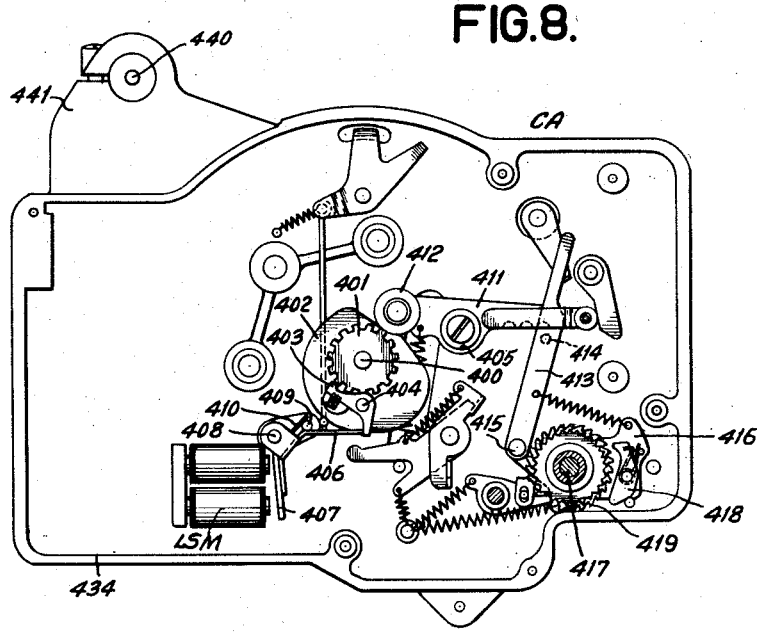
Fig. 8 is an elevation view showing the line spacing control mechanism of the automatic carriage.

The automatic platen rotating controls are held in a frame CA (Fig. 1) comprising a casing 434 (Fig. 8) with a bracket 441 which supports a motor shaft 440. Between motor shaft 440 and a line space drive shaft 400 is a train of gearing to keep the shaft rotating in a clockwise direction.

Shaft 400 carries a clutch plate 401 attached thereto. Adjacent the toothed plate 401 is a cam 402 loosely pivoted on shaft 400. This cam carries a clutching pawl 403 pivoted at 404. A compression spring mounted in a stud on cam 402 tends to engage pawl 403 with clutch plate 401, but an extending tail on the pawl is normally obstructed by the end of a lever 406 connected to the armature 407 of the line spacing magnet LSM. The lever 406 is pivoted on a stud 408 and is urged in a counterclockwise direction against stop pin 409 by a spring 410.

When the line spacing magnet LSM is energized, the lever 406 is rocked in a clockwise direction, releasing the clutch pawl 403 which then engages the clutch plate 401, thus connecting the cam 402 to the driving shaft 400. As the cam 402 rotates, it operates a lever 411 through a roller 412 on the lever in cooperation with the periphery of the cam. The lever 411 is pivoted on a stud 405 and is provided with an extending arm. A link 413 placed adjacent the lever 411 carries a pin 414 adapted to cooperate with the end of lever 411. The other end of link 413 is pivotally connected at 415 to a line spacing plate 416, loosely mounted on the platen feed shaft 417. The plate 416 carries a feed pawl 418 pivoted on the plate and adapted to cooperate with a ratchet gear 419 fixed to shaft 417 which has gear connections to platen P (Fig. 1) for rotating it to advance the sheet SH.

From the connections mentioned, it may be noted that as the cam 402 (Fig. 8) is rotated, the lever 411 is rocked in a clockwise direction pushing link 413 down and rocking the plate 416 so that pawl 418 advances the platen shaft 417 one or more steps in a counterclockwise direction.

On certain kinds of records, it is advisable to skip a space between the printed heading and the first printed items or amounts. The heading may be printed under control of one or more perforated record cards such as name and address cards. The last card of each heading group is punched with a special perforation to call in a skipping circuit to control the successive energizations of the line space magnet LSM to feed the record the required space. In the skipping circuit are contacts which are tripped by a settable cam when the desired space has been skipped.

In the present case it is desirable that space skipping be suspended attending the appearance of a heading card, because two or more lines may be printed therefrom. Such suspension is taken care of as set forth hereinafter in connection with the wiring diagram.

Long feed devices

Figure 9:
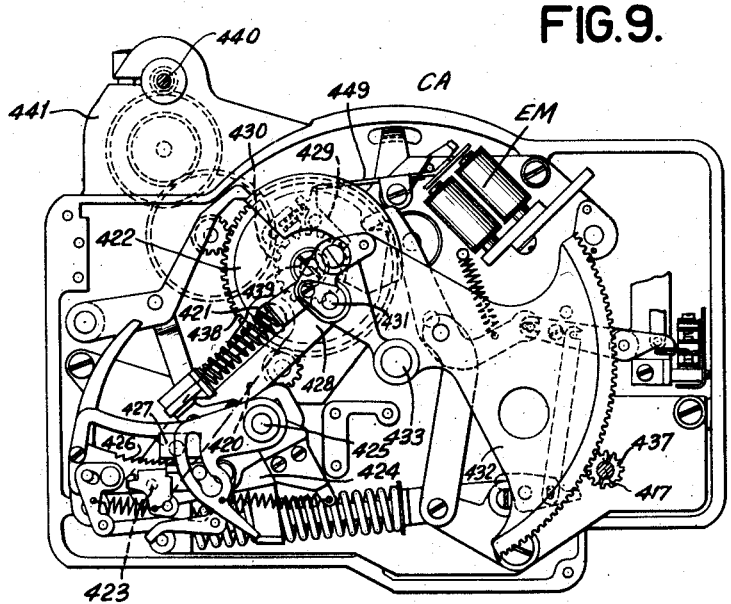
Fig. 9 is an elevation view showing the eject mechanism found in the automatic carriage.

When the sheet is to be spaced a distance greater than a few line spaces, ejection control devices are called into play for a long feed operation. The ejection driving connections include a clutch which may be connected at any time in the operation of the machine to cause a paper ejecting operation of the platen. The driving member of the clutch is the gear 438 (Fig. 9) driven by a gear train from the motor shaft 440, previously mentioned. Referring to Fig. 9, it is noted that gear 438 is pivoted on stud 439 in the frame and carries attached thereto a toothed clutch plate 430. Loosely pivoted on the same stud 439 is an ejecting cam plate 422. Pivoted on the side of cam 422 is a clutch pawl 429. The pawl is in alignment with clutch plate 430 but is normally held out of engagement therewith by a lever 449 abutting against an extending tail on the pawl. The lever is attached to an armature block associated with an ejecting control magnet EM. A compression spring on cam plate 422 presses against the pawl and tends to engage it with the clutch plate. When the magnet EM is energized, lever 449 is rocked in a clockwise direction, releasing pawl 429 and clutching the ejecting cam plate 422 to the driving gear 438.

Ejection is initiated by energization of magnet EM on the occurrence of a total, after a certain number of lines, or at the end of a form. In Fig. 9 the ejecting devices are shown in the normal position. There it is noted that a link 420 is articulated at 421 on the side of plate 422 and at the other end it is pivotally connected at 423 to the side of an ejecting frame 424 pivoted at 425 on the frame of the control unit. This rocking eject frame 424 is formed in the shape of an arc and carries a similarly shaped plate with a series of teeth 426 cut in the inner side of the arc. Cooperating with these teeth is a block 427 formed with a single tooth adapted to ratchet over the teeth 426 and engage any one of the teeth as a link 428 carrying the block 427 is drawn along the inner surface of the arc during line spacing operation. The block 427 is loosely pivoted on the link 428 by means of a pivot mounted on the link. When an ejection clutch connection comprising pawl 429 and clutch plate 430 is made effective by the energization of the magnet EM, the plate 422 is connected to turn in a clockwise direction and moves link 420 and frame 424 to the right with a gradually accelerated motion until the plate 422 has moved through an angle of 90° and then the motion is retarded until the link is practically at rest as the plate reaches a central position after 180° of motion.

Then the same type of motion is repeated as the plate goes through the final 180° in arriving back to the home position after a complete revolution.

Continuing now with outlining the connections of link 420 to the line spacing devices for the purpose of ejection, it is noted that in its motion to the right the link carries along the ejecting frame 424 by rocking it in a clockwise direction about the pivot 425. As this is done, the teeth 426 on the eject plate engage the block 427 on the end of link 428 and move this link to the right. The right end of link 428 is connected by a stud 431 to a sector 432 loosely pivoted on a shaft 433. The sector teeth are in mesh with a pinion 437 which is connected to the line spacing shaft 417, which as noted hereinbefore serves to space the platen. As line spacing takes place, sector 432 is rocked step by step in a clockwise direction. Then, upon initiation of ejection, the sector is given a sweeping clockwise motion to eject the sheet.

The wiring diagram

In Figs. 28A to 28I there is shown a rather complete wiring diagram of an alphabetic tabulator including the pneumatic and repetitive sensing devices of the present invention. The ordinary control circuits therein and the mechanisms controlled thereby are set forth in greater detail in the patents already mentioned and in Patents 2,079,418 and 2,172,067 and 2,199,547, and application Serial No. 609,854, filed August 9, 1945. Before describing the manner in which the heading card fields and cross footing card fields are sensed repeatedly, it is believed well to outline a few of the usual tabulator operations.

In such machines, the drive of the motor TM (Fig. 28A) is communicated through two clutches called in by magnets CFCM and PCM which are selectively operated for card feeding and printing operations. A number of PBC contacts (Fig. 28I) and CF cam contacts operate only when the card feed clutch is engaged. The PM contacts operate only when the printer clutch is engaged. Other CB contacts are operated all the time that the motor TM is actuated. A series of TS contacts are operated only when a total cycle is initiated.

Figure 28A:
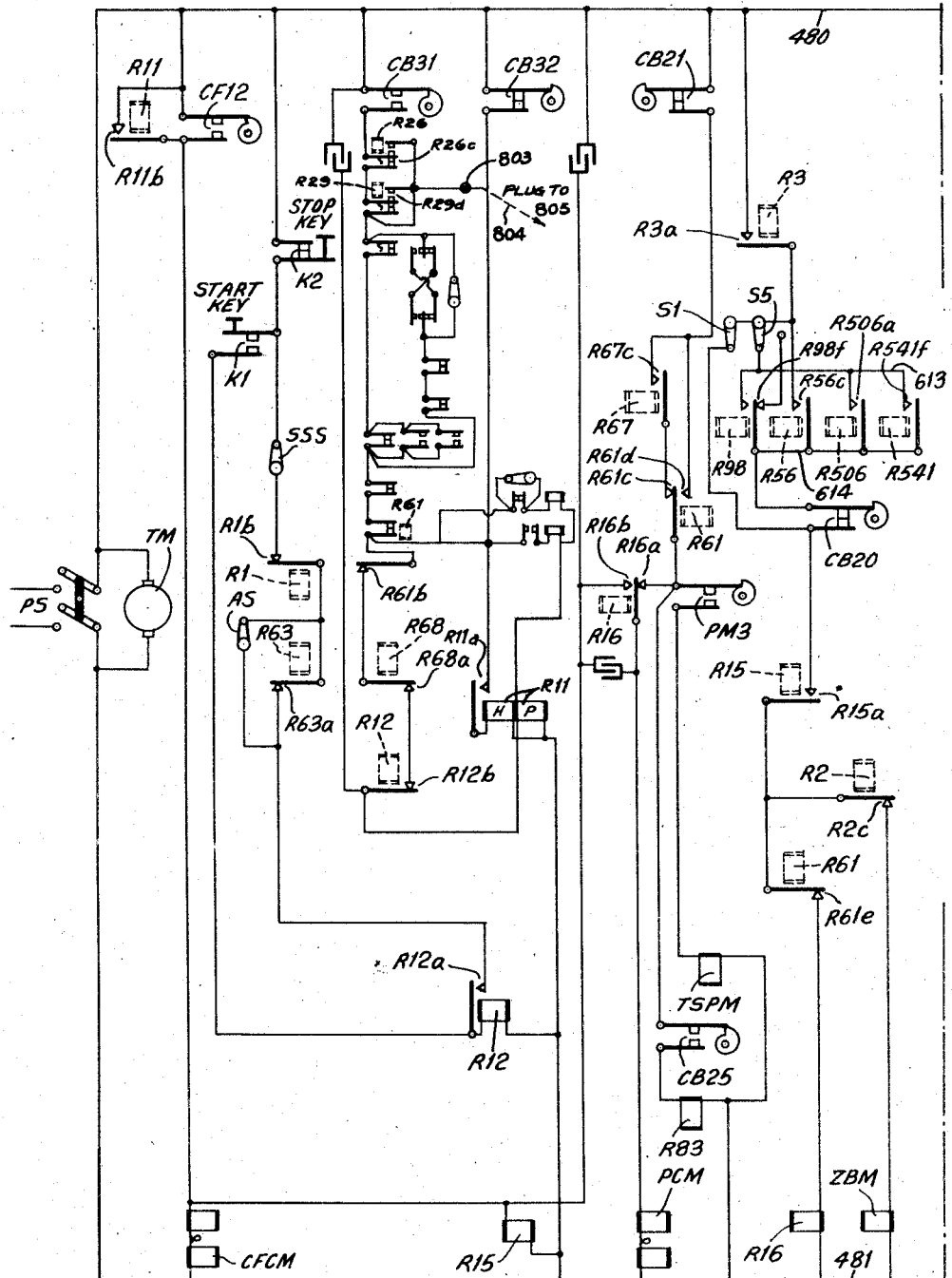
Figure 28B:
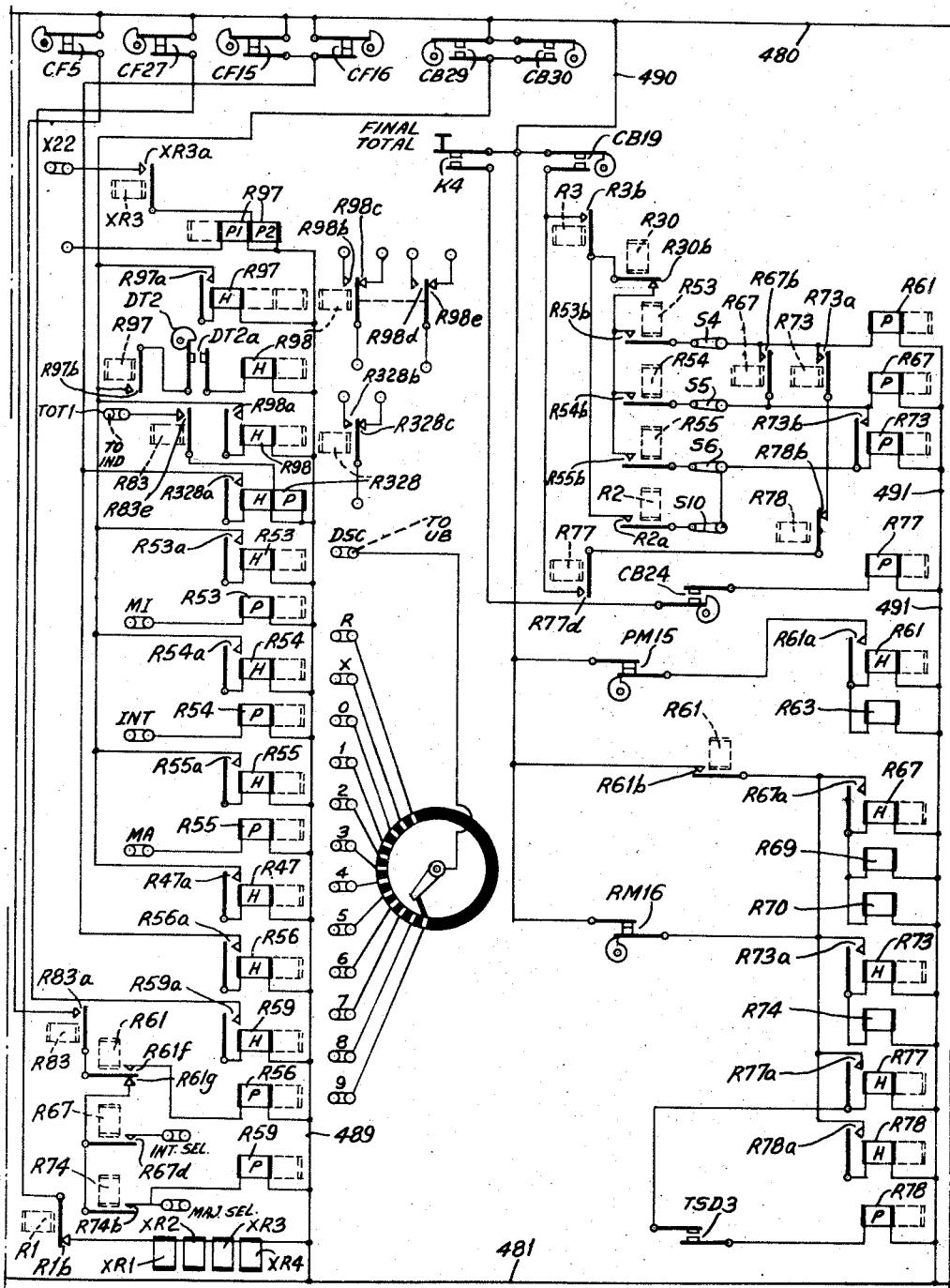

After cards are placed in the magazine, a feeding cycle is initiated by pressing the start key contacts K1 (Fig. 28A). Circuits are then established for relays R12 and R11, the latter serving to initiate card feeding by closing contacts R11b in series with the card feed clutch magnet CFCM. As already noted hereinbefore with reference to Fig. 10, magnet CFCM serves to connect clutch 61, 63 and drive the gear train and cam shafts to enable the clutch controlled by magnet CRCM to be effective for advancing the cards.

Figure 28C:
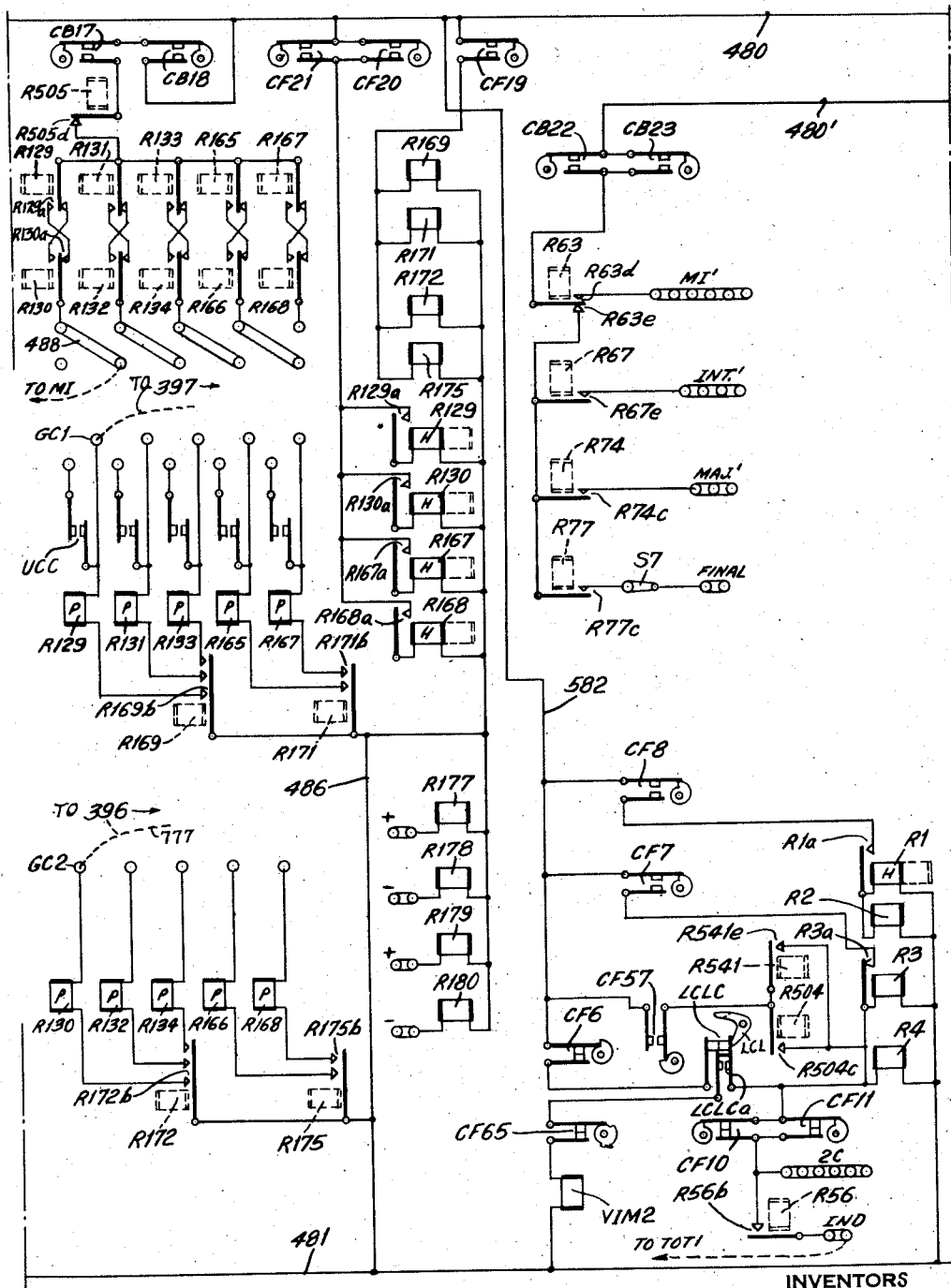

During the first card feed cycle, a cam contact CF9 (Fig. 28D) in series with the then closed upper card lever contacts UCLC closes to call in relay R1. Contacts R1b (Fig. 28A) are then operated to deenergize relay R12 to stop the card feed after one starting cycle. A second depression of the start key causes a succession of card feed cycles because, once a card is advanced far enough to operate the lever UCL (Fig. 28D), contacts UCLC are opened and cam contacts CF9 cannot energize relay R1 as long as cards continue to advance. Relay R2 is controlled along with relay R1 because it is connected in parallel therewith as shown in Fig. 28C.

Figure 28D:
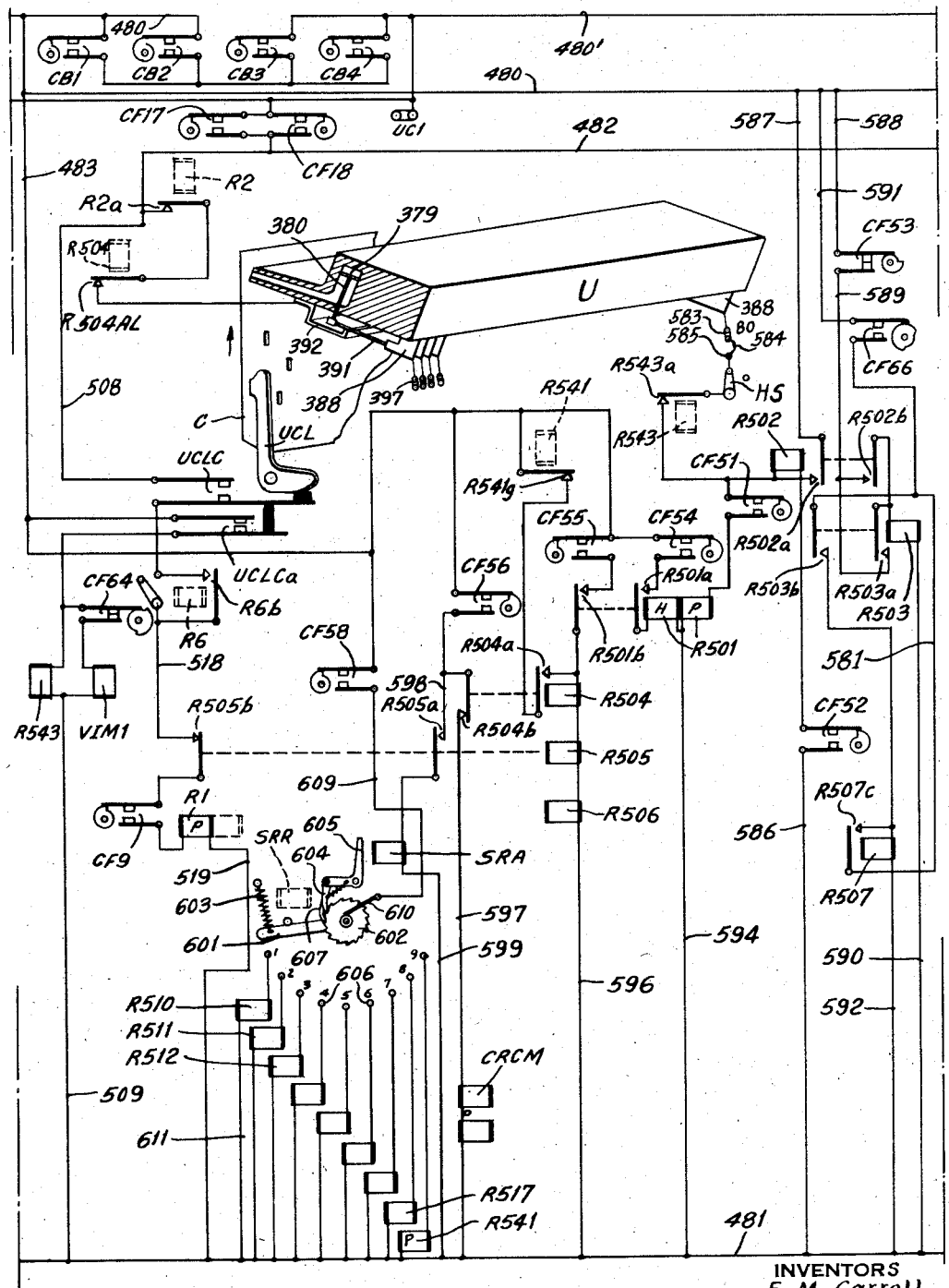

Near the end of the last cycle when the last card is past the upper sensing station UB, Fig. 28D, cam contacts CF9 close and energize relay R1 to open contacts R1b to deenergize relay R12 and stop the card feed mechanism. Other controls are exercised over card feed stoppage by means of relay contacts R505b which are operated upon reversal cycles as explained hereinafter.

The lower card lever relays R3 and R4 (Fig. 28C) are energized when the first card closes contacts LCLC as it passes beyond the upper station UB, and they remain energized until the last card passes beyond the lower sensing station LB. Other special reversal controls are exercised in connection with these relays by contacts R540c which are operated as explained hereinafter.

In a listing operation the card passes the sensing station LB in synchronism with the upward movement of the type bars. Magnets PR (Figs. 7 and 28I) operate the stop pawls to locate the type bars in positions corresponding to the data punched in the card, and at a predetermined time hammers are tripped to record the information on the bill form.

Therefore, listing operation requires energization of the card feed clutch magnets CFCM (Fig. 28A) and CRCM (Fig. 28D) to advance the cards, and energization of the printer clutch magnet PCM (Fig. 28A) for raising the type bars. A relay R15 is connected in parallel with clutch magnet CFCM to establish printer operating connections while cards are feeding. The printer clutch magnet PCM is called into operation under control of relays R15 and R16 when switch S1 is closed to energize relay R16 and close contacts R16b for listing operation.

Adjustment of the type bars is regulated by impulses carried to the print control magnets PR from the lower sensing station LB in pneumatic contact with a card C. A numeral printing control circuit involves line 480 (Fig. 28D), contact breakers CB1—4, timer contacts CF17 and CF18, wire 482 (Fig. 28H), lower card lever relay contacts R4a, wire 487, common contact bar 392, a wire spring 391 brought into contact with 392 when a card perforation is detected by pneumatic action of plunger 379, contact plate 388, plug socket 396, a plug wire to socket N1 of a numeral bank (Fig. 28I), normally closed contact TSa, magnet PR and line 481.

Alphabet printing is carried on in a similar way with the exception of preparation for zoning the longer type bar. A zone bail magnet ZBM (Fig. 28A) is energized and made effective on each printing cycle by the closure of switch S1 in series with the magnet and relay contacts R15a. The zone bail 496 (Fig. 7) is raised by a toggle mechanism which is made effective for zoning whenever magnet ZBM is energized. The other individual zone magnets ZM (Figs. 7 and 28E) control the extent of zoning of each type bar and they are energized at timed intervals by the R, X and O perforations (Fig. 5) in an alphabetic data card C. A simple example of a zoning circuit may be traced from line 480 (Fig. 28D), contact breakers CB1—4, timer contacts CF17 and CF18, wire 482, relay contacts R2a, relay contacts R504AL, common contact bar 392, wire spring 391, contact plate 388, a plug socket 397 in one of those orders devoted to alphabetic data, a plug wire to socket Z1 (Fig. 28I), magnet ZM, contacts CF25 closed only for the O, X and R index points and line 481. The zoning circuit just described is the one that is ordinarily effective on all alphabet printing cycles as the usual tabulator control. It is also used in the present instance for the zoning of one field heading cards and for the zoning of the first sensed heading field on a multiple field card. When handling such multifield heading or address cards, the first field is zoned from the sensing station UB as noted, but all other fields from the second on are zoned from the station LB successively as the card reversal feed operates to wipe the card back and forth under station LB. Switching of the zoning circuits from field to field under the station LB is described hereinafter with reference to successive heading card cycles.

When the zone magnet ZM is energized (Fig. 7), it serves to limit the extent of movement of bar 471 and thus prepares for zoning the type section T. The main alphabet bar stops 451 are caught by pawl 452 which is operated by magnet PR that is energized from station LB by a circuit similar to that traced for numeral printing control, the only difference being that the alphabet sensing columns are plugged to sockets AI (Fig. 28I), rather than sockets NI.

Although frequent reference is made throughout this specification to the advantages of repetitious printing from a single card for purposes such as addressing, there are other equally important advantages in repeated adding from fields of a single card for purposes such as cross footing. All relay switching operations shown as applied to printing are also pluggable for control over adding in one or more accumulators of the standard forms shown in the patents mentioned. It is sufficient to note the path taken through adding control magnets CR by impulses initiated when the pneumatic sensing devices close circuits upon the detection of numeral representing perforations in a card. A typical adding entry circuit is as follows: Line 480 (Fig. 28D), cam contacts CBI—4, cam contacts CF17—18, wire 482 (Fig. 28H), contacts R4a, wire 487, common bar 392, wire 391, plate 388, a plug socket 396, a plug wire such as wire 492, contacts R580a and R689a, plug socket 493, plug wire 494 to ADD (Fig. 28I), the left side of contact R177b closed by relay action under X hole control for adding, contacts PBC1 cam operated to close during card sensing time, total switch contacts TS5, magnet CR and line 481. Magnet CR then operates a clutch to engage adding gears at a time commensurate with the value of the sensed perforation. After the proper digit is added, the gears are mechanically disengaged.

Group control devices are provided for separately considering different classes or groups of cards as distinguished by different group number perforations for different groups. Consecutive cards are compared, one card being read at station UB while the preceding card is read at station LB. As long as the card readings are alike, the card feed devices continue to function. When it is sensed that the two group number readings are not alike, the feed stops, a total is printed, the accumulator is zeroized, the record sheet form is ejected to bring in a new form, and the machine automatically starts feeding the cards of the next group.

The comparing circuits are connected by plug wiring between pickup coils in certain sensing banks of the upper and lower stations UB, LB devoted to sensing group number perforations. An example of the comparing circuit is as follows: line 480 (Fig. 28D), cam contacts CBI—CB4, timer contacts CF17 and CF18, wire 482, contacts R2a, common bar 392, wire 391 operated pneumatically at a differential instant, plate 388, plug socket 397, a plug wire to socket GC1 (Fig. 28C), pickup coil R129, contacts R169b and wire 486 to line 481. As long as group numbers agree, a companion circuit to that already traced is set up at the same time through a pickup coil of a relay R130 as energized through a related sensing bank in station LB by the following circuit: line 480 (Fig. 28D), cam contacts CBI—CB4, timer contacts CF17 and CF18, wire 482 (Fig. 28H), relay contacts R4a, wire 487, common bar 392, displaced wire 391, plate 388, plug socket 396, a plug wire 777 connected to socket GC2 (Fig. 28C), relay coil R130, contacts R172b, wire 486 and line 481. Relays R129 and R130 have holding coils and contacts in series therewith for sustaining the comparing circuit connections.

Referring to the upper left corner of Fig. 28C, it is seen that the related pairs of comparing relays are associated with pairs of contacts so arranged that, when the related pairs such as relays R129 and R130 are energized at the same time, they prevent the closing of a circuit path. However, should one or the other be energized alone, showing that there is a disagreement in the group control perforations, then a circuit is established for initiating group control operation. Upon disagreement a circuit such as the following is closed: line 480, cam contacts CB17, CB18, relay contacts R505d opened on reversal cycles as explained hereinafter, the left contacts R129a, the right contacts R130a, plug socket 488, a plug wire to socket MI (Fig. 28B), the pickup coil of relay R53, wire 489 and line 481. The holding coil of relay R53 operates contacts R53b in series with a minor control pickup coil of a relay R61. The minor control circuit includes line 480, wire 490, cam contacts CB19, lower card lever relay contacts R3b, reversal heading suppression contacts R30b, relay contacts R53b, switch S4, the pickup coil of relay R61, wire 491 and line 481. A holding circuit includes line 480, wire 490, cam contacts PM15, relay contacts R61a, relays R61 and R63, wire 491 and line 481. The holding coil of relay R61 and associated coil R63 have a number of minor control contacts throughout the machine for controlling the suspension of card feeding and the initiation of total taking and printing in the usual way.

Figure 28E:
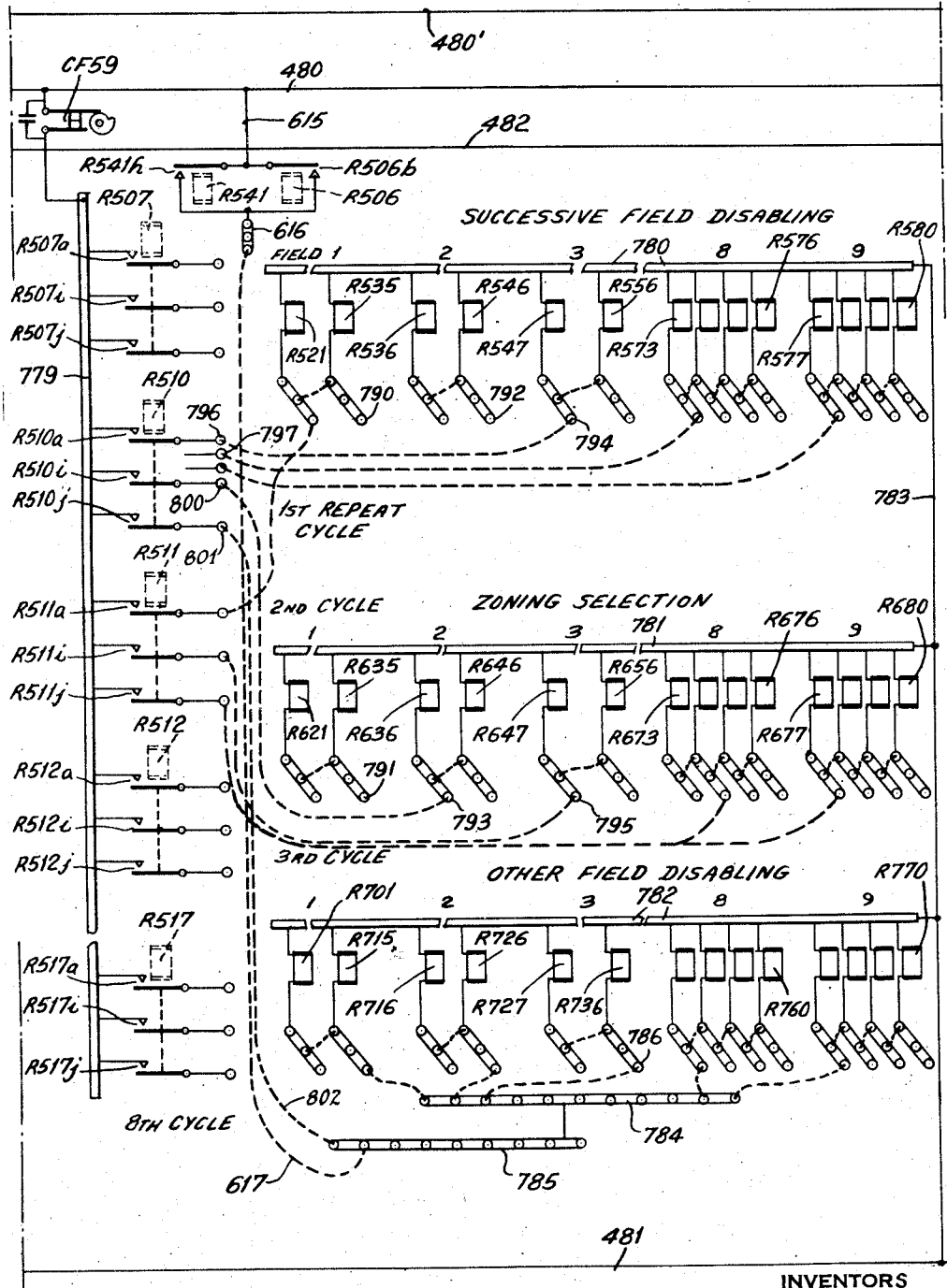
Figure 28F:
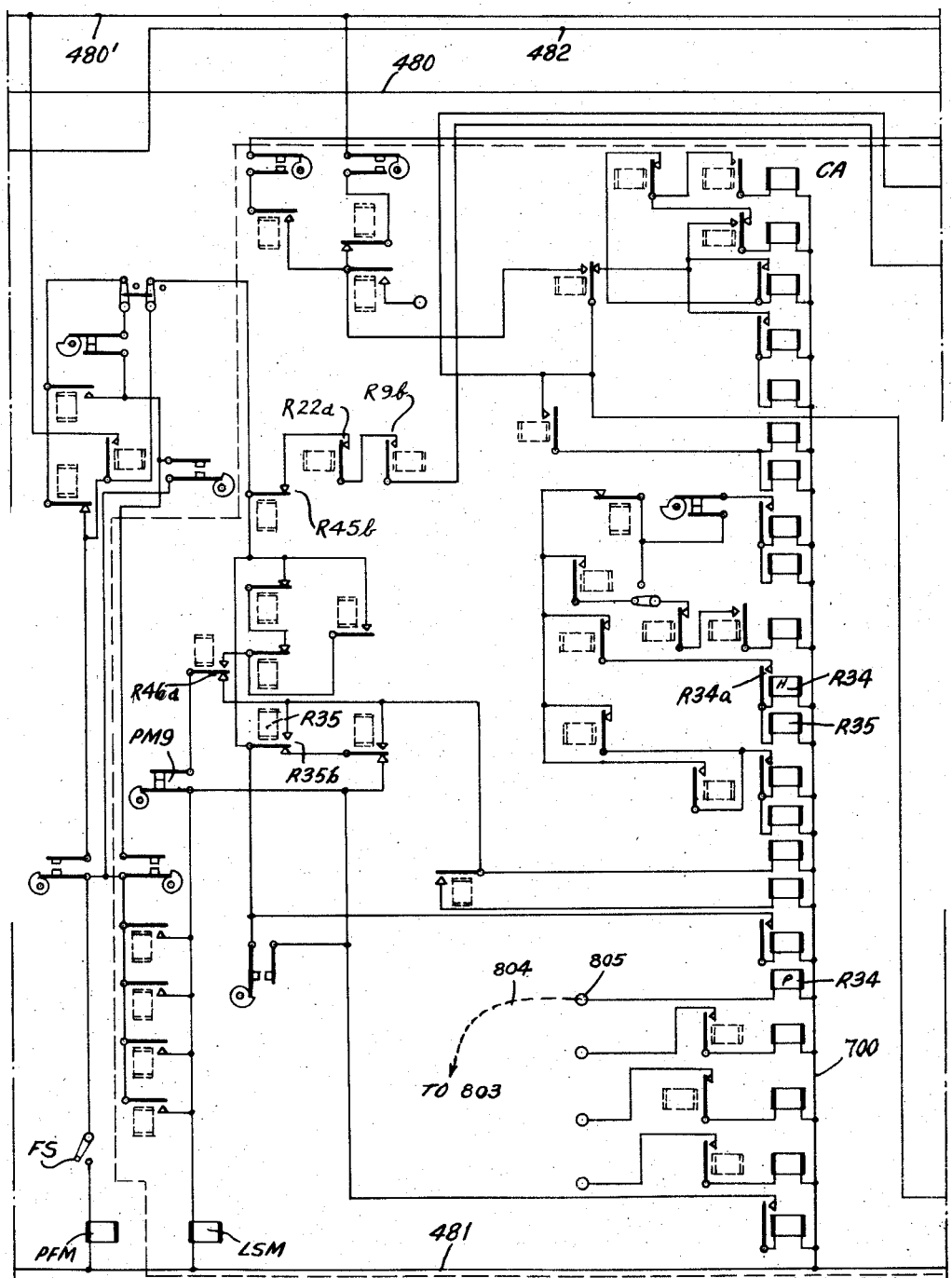

The foregoing description of the wiring deals in the main with the electrical devices usually found in tabulating machines. The following portions of the specification are devoted more to the novel repetitious card field sensing controls for reading address or cross footing cards, and the way these new controls are coordinated with the tabulator operations. Figs. 28D, 28E, and 28H show most of the novel electrical controls as associated with the new pneumatic analyzing units U and L.

Controls are provided to withhold the air under pressure until such time as record cards appear under the pneumatic sensing stations U and L. These air valving controls are affected by the card lever controls operated as shown in Fig. 10, wherein it is seen that the cards when moved on the drum D operate levers UCL and LCL to open contacts and thereby indicate their presence at the two-card sensing stations.

Referring to Fig. 28D, it is seen that the presence of a card under the upper sensing station causes the opening of the upper card lever contacts UCLCa and the breaking of a circuit which otherwise exercises air valving control and repetitious sensing control in the absence of record cards. The circuit established in the absence of cards is as follows: line 480, wire 483, contacts UCLCa closed in the absence of a card, cam contacts CF64 closed during the digit representing portion of the cycle, valving interposer magnet VIM1 effective to shift the interposer 399 (Fig. 18c), and leave valve V1 closed, and wire 509, (Fig. 28D) to line 481. Another magnet R543 is seen to be connected in parallel with magnet VIM1 and energized therewith upon the absence of a card and held energized independent of the opening of cam contacts CF64. Magnet VIM1 controls the supply of air under pressure to the entire upper pneumatic sensing unit U. As shown in Figs. 1 and 18a, the valve V1 controlled by this magnet is in the air line leading to the unit U. When energized, the magnet cuts off the air under pressure and instead permits air at ordinary room pressure to act on the pistons 379, so that they are ineffective to close contacts at a time when there are no cards moved in the air blocking positions under the ports. It will be apparent that at the intervals between cards and over the area of the card not devoted to the 12 index points, the air pressure will be cut off to avoid operation of the pneumatic unit.

The other magnet R543 (Fig. 28D) which is also operated under control of the upper card lever has contacts R543a in series with many of the controls for detecting and cross footing cards, so that these controls do not come into action until the first card is under the sensing unit U. In addition to the special controls exercised by the upper card lever UCL as already explained, the card lever contacts UCLC close to effect the usual operation of relays R1 and R2 for the control ordinarily found in the tabulator. This circuit includes line 480, cam contacts CB1—4 and CF17, CF18, wire 508, contacts UCLC, indication relay contacts R6b, wire 518, special relay contacts R505b, cam contacts CF9, the pickup coil of relay R1, and wire 519 to line 481. This circuit is broken by the opening of relay contacts R505b during repetitious sensing operation because at that time it is desired to suspend sensing control by the station U.

A somewhat similar set of controls is provided to regulate the supply of air under pressure to the other pneumatic sensing station L. These controls are placed under the direction of the lower card lever LCL (Fig. 28C shown as though a card is present) arranged to detect the presence of a card under the lower station and to close the pair of contacts LCLC and open other contacts LCLCa. Operation of contacts LCLC when closed by the card lever is used to effect the energization of the ordinary card lever relays R3 and R4 for the usual tabulator controls.

Another circuit is established for controlling the air pressure supply to the lower pneumatic unit L. This circuit is the one established by the absence of a card and closure of contacts LCLCa and said circuit follows a path from line 480 through wire 582, cam contacts CF7, relay contacts R3a, contacts LCLCa, cam contacts CF65, valve magnet VIM2, and line 481. This valve magnet is shown in Figs. 1 and 18a as associated with the valve present in the air line 344 running between the main supply head 334 and the pneumatic sensing unit L. Magnet VIM2 then serves to swing the interposer away from the end of the valve stem to keep the valve closed as already described.

As the heading or cross footing card passes under the station U (Fig. 28D), the special perforation SP (Fig. 2) therein in the 80th column is detected to determine whether the card is of the single field variety or of the multiple field kind such as an address card or a cross footing card. The difference is denoted by the representation of the special perforation in the 1 index point position for the single field card and a perforation in any of the other 2 to 9 index point positions for the plural field card. For convenience, the present showing is concerned with a representation of fields limited to the number 9, but it is apparent that plurality of columns could be provided for records having a number of fields requiring plural denominational representation and the same sort of controls used as shown therein. The distinction between the single and plural field cards is carried on by means of dual sensing circuits through the 80th column either one of which is made effective according to the magnitude of value of the special perforation.

Referring to Fig. 28D, it is seen that cam contacts CF52 are in series with a relay R502 and these contacts are closed for a short interval at the "1" time to detect single field cards. The other parallel branch of this circuit includes a relay R501 and cam contacts CF51 closed for the interval in each cycle comprising the 2 to 9 index points for detecting those cards having a plurality of fields.

Assuming first that a card is encountered bearing a single field, the circuit established is as follows: line 480, cam contacts CB1—4, wire 480', cam contacts CF17 and CF18, relay contacts R2a closed as long as cards are under the station U, common bar 392, bent wire 391, plate 388 in the 80th column, plug socket 583, plug wire 584, socket 585, switch HS, relay contacts R543a operated as long as a card is under unit U, relay R502, cam contacts CF52 closed during and after the "1" time, wire 586 and line 481. Relay R502 then acts to set up a holding circuit for itself and also another circuit for calling into operation a relay R503 for effecting adding and printing control during the following card cycle, while the single field heading card is under the station L.

The holding circuit for relay R502 may be followed from line 480, to wire 587, contacts R502a, relay R502, cam contacts CF52 and wire 586 to line 481. The other contacts R502b set up a circuit for relay R503 as follows: line 480, wire 588, cam contacts CF53 closed before contacts CF52 open and maintained closed during the early part of the following cycle, wire 589, contacts 502b, relay R503, and wire 590 to line 481. Relay R503 then operates contacts R503a to place a shunt around contacts R502b and establish a holding circuit to be independent of the length of energization of relay R502. Relay R503 also operates contacts R503b to call another relay R507 into operation for sustaining a single field control for a period of a cycle slightly longer than the period afforded by the closure of cam contacts CF53. The circuit for relay R507 includes line 480, wire 591, cam contacts CF66, relay contacts R503b, relay R507, and wire 592 to line 481. Relay R507 is held by the circuit: line 480, wire 591, cam contacts CF66, wire 581, holding contacts R507c, and wire 592 to line 481.

Relay R507 effects a number of controls which are required when a machine is set up for successive sensing operations attending the appearance of a plural field heading card. Although the energization of relay R507 is indicative of the appearance of a single field card, there are some controls to be effected to prevent the machine from acting as through this single field is the first of a plurality of fields on the same card. For example, in Fig. 28E, it is seen that relay R507 is associated with a series of contacts R507a to R507j, any one of which is plugable to call in one or more of a series of relays R521 to R580 for disabling printing and adding control in any of the banks. In other words, it is required that the printing of the single field on the single field card be prefaced by the disablement of other fields such as the first or name field on the ordinary three-line address card. Any of these contacts R507a to R507j could also be used for selecting the zoning of any field in conjunction with the operation of one or more relays R621 to R680 relating to any column or field of columns. Another function in the use of the relay contacts is the disablement of a complete section of the card outside the sphere of usual repetitious field area by the use of relays R701 to R770.

In Fig. 28H it is seen that relay R507 has other contacts R507k in series with circuit connections for operating connections to suspend operation of the group control devices. It is explained hereinafter how these connections are made to the automatic carriage to control the grouping and spacing of record sheet items in accordance with the number of repeated sensing and printing operations recorded on the sheet.

The foregoing sections of the description are concerned with the detection of a single field heading card. Now it will be assumed that a record is encountered which is perforated with any of the digits 2 to 9 in the 80th column, and the fields thereon are to be sensed successively while the card is reciprocated back and forth under the sensing station L a number of times selected by the special digit perforation.

Referring to Fig. 28D, it will be explained how the special digit perforation is first detected and then used to regulate the number of repeat cycles.

As explained hereinbefore, the cam contacts CF51 are closed for the cycle points 2 to 9 in series with a relay R501 for detecting plural field heading or cross footing cards. The circuit established upon the appearance of such a card is as follows: line 480, cam contacts CB1—4, wire 480′, cam contacts CF17, CF18, relay contacts R2a, common bar 392, wire 391 in the 80 column which is bent at any of the 2 to 9 index points by pneumatic action upon the appearance of a perforation in any one of those positions, plate 388 in the 80th column, plug socket 583, plug wire 584, plug socket 585, switch HS, relay contacts R543a, cam contacts CF51, the pickup coil of relay R501 and wire 594 to line 481. When the pickup coil of relay R501 is operated, it closes contacts R501a to establish a holding circuit through contacts CF54 for extending the time of energization independently of the card perforation. The holding circuit includes line 480, wire 483, cam contacts CF54, relay contacts R501a, the holding coil of relay R501 and wire 594 to line 481.

Relay R501 controls other contacts R501b for calling in a series of relays R504, R505 and R506 to be energized near the end of the special perforation detection cycle. The circuit for calling in these three relays includes line 480, wire 483, cam contacts CF55, relay contacts R501b, relays R504, R505, R506, wire 596 and line 481. Relay R504 then sets up a holding circuit for all three relays and this circuit is sustained for all cycles during which repeated sensing is performed. This holding circuit includes contacts R541g, which remain closed until the last of the selected number of cycles is completed. The holding circuit includes line 480, wire 483, relay contacts R541g, contacts R504a, relays R504, R505, R506 and wire 596 to line 481.

In addition to the holding circuit established by the action of relay R504 this relay also operates contacts R504b to open them in series with the clutch control magnet CRCM also described with reference to Figs. 12 and 13. In connection with Fig. 12 it was noted that as long as clutch magnet CRCM remains energized, cards are taken out of the magazine by the picker mechanism and advanced continuously to the feeding drum D. This energized magnet CRCM also maintained the cam 287 active to control the reverse pawl mechanism so that both of the continuous advance pawls remain effective while the reverse pawl was disabled. Now, upon the detection of a multiple field record card, action by relay R504 prevents energization of magnet CRCM. The mechanical controls are reversed so that the clutch is disconnected to prevent the feeding of cards out of the magazine while repeated sensing of the plural field card is taking place. At the same time, cam 269 (Fig. 21) is made ineffective so that the reverse pawl mechanism comes into play. The normally effective circuit, which is now disabled for repeated sensing, follows the path from line 480 (Fig. 28D) to wire 483, cam contacts CF56 which are closed momentarily near the end of each card feed cycle, contacts R504b, wire 597, clutch magnet CRCM and line 481.

The closure of cam contacts CF56 is used not only to energize clutch magnet CRCM during the ordinary sensing operations, but it is also used on plural field cycles to provide successive impulses for operating a stepping relay SRA to measure the number of repeated cycles being taken and also to provide a comparing means for detecting which of the cycles corresponds to the value of the special digit perforation in the 80th column. For example, if a 6 perforation is found in the 80th column of a heading or cross footing card, it is an indication that six printing or adding control cycles are to be performed in connection with that particular card, and the stepping relay is to be operated six times before a circuit connection is established which compares with the analysis of that same digit perforation under the lower sensing station L by a digit selector connected with the 80th sensing column in a manner described hereinafter. At this point, it is sufficient to note that cam contacts CF56 operate successively on each repeat cycle and cause successive energization of a stepping relay magnet SRA to call into operation successively digital representing relays R510 to R517 as the repeat cycles progress. The circuit for impulsing the stepping relay magnet involves line 480, wire 483, cam contacts CF56, wire 598, relay contacts R505a, magnet SRA, wire 599 and line 481.

A diagrammatic showing of the stepping relay is represented at the lower left hand corner of Fig. 28D. This condensed showing is believed sufficient because the construction of these relays is of common knowledge in the electrical arts. In the diagrammatic representation of the stepping relay it is seen that a contact arm 601 is attached to a ratchet wheel 602 and held in a normal position by a spring 603. Cooperating with the ratchet 602 is a pawl 604 on armature lever 605 which is operated by each energization of magnet SRA. Each operation of the relay causes the contact arm 601 to advance from one to another of the nine contact terminals 606 shown arranged in an arcuate formation terminating the connections from relays R510 to R517, the final "9" connection including a final cycle relay R541. A holding pawl 607 is provided to maintain the setting of arm 601 while pawl 604 vibrates to provide a new setting. When the relay is to be reset, another magnet SRR is energized to disengage pawls 604 and 607 to free the ratchet wheel 602 so that arm 601 may be drawn back to the inactive home position by spring 603. As the relays R510 etc. are selected, circuits are established therethrough for a length of time sufficient to control the sensing of the record card under the station L. Cam contacts CF58 provide these control circuit intervals and interruption of the circuit therethrough is alternated with the operation of cam contacts CF56 for advancing the stepping relay successively to a new setting. The circuit for making one after the other of relays R510, etc. effective is as follows: line 480, wire 483, cam contacts CF58, wire 609, brush 610, an insulated tube connected to arm 601, the first terminal 606, relay R510, and wire 611 to line 481. Similar circuits are established for relays R511, R512, etc. as the repeated sensing operations take place while the record card is oscillated under the station L.

Relays R505 and R506 operate to sustain a number of controls which would ordinarily be inoperative due to the failure of the record cards to advance progressively under the upper station U. These relays serve to disable or enable a number of circuits according to what their status usually is when cards continue to appear under the upper station. It is their function to control the tabulator during repeated sensing operations when no cards are advanced from the magazine, as though cards continued to advance.

Relays R504 and R505 serve to take over the controls usually exercised by the upper and lower card levers UCL and LCL, and the relays do so during such time as the successive heading or discard reversal cycles are taking place. A number of connections for continuously running parts depend on the deenergization of relays R1 and R2 for their maintenance. Relay R505b serves to do this by opening contacts R505b in series with the relay R1 pickup coil. Thus, the pickup of relays R1 and R2 by cam contacts CF9 for auto totaling is prevented until the last cycle if a heading card is the last card out of the magazine. At the same time, relay R504 opens contacts R504AL to disable all sensing circuits at station U while the heading card is reciprocated at station L.

Other contacts R504c (Fig. 28C) in conjunction with cam contacts CF57 provide a shunt around the lower card lever contacts LCLC. On ordinary continuous forward card feeding, cam contacts CF7 remain closed long enough to maintain energization of relays R3 and R4 during the intervals between cards. However, on reversal cycles the lower card lever LCLC is operated later and the sensing operations at station L must be sustained by closing the gap between the opening of contacts CF7 and the reclosing of contacts LCLC. This is done by sustained closure of contacts R504c for all reversal cycles and the intermittent closure of cam contacts CF57 for the critical interval of each reverse cycle.

During the card feed reversal cycles, it is desirable to suspend the operation of the group control devices. Accordingly, the relay R505 operates to open contacts R505d (Fig. 28C) in series with the comparing connections R129a, R130a, etc. and thereby prevent the establishment of group change circuits while a heading or cross footing card is reciprocating under station L.

Contacts R505c (Fig. 28H) are closed by relay R505 for all reversal cycles so that a heading suppression relay R30 (Fig. 28G) is connected to cam contacts CF62 for successive impulsing at the "X" time just as though separate heading cards were being advanced for each reversal cycle. In this way, relay R30 is enabled to open contacts R30b (Fig. 28B) and prevent automatic total taking which would otherwise immediately attend a change from heading to item cards and the picking up of minor, intermediate or major control relays R61, R67, or R73 in series with contacts R30b.

In addition to the controls exercised by relays R504 and R505 attending the reversal cycles (Fig. 28D), the other relay R506 is brought into action for exercising control during such time.

Referring to Fig. 28A, it is noted that this relay operates contacts R506a in series with the zoning bail control magnet ZBM. During all repeated heading card cycles, it is desired that the machine be conditioned for alphabet printing and, in order to do so, magnet ZBM must be energized for all card sensing operations. When the printing devices are set for tabulating control by the adjustment of switch S5 for X and no X distinction between printing cycles, then contacts R506a are effective as a shunt around the normally open class selection contacts R98f. The circuit used in preparation for zoning the alphabet type can be followed from line 480, through relay contacts R3a, switch S5, wire 613, contacts R506a, wire 614, cam contacts CB20, relay contacts R15a, R2c and magnet ZBM to line 481.

Relay R506 is effective for control to disable the sensing from any one or more of selected columns of perforations appearing under the station L. Circuit connections are provided which are called in by relay R506 and held energized throughout all the card reversal cycles and disabling relays for effecting control over one or more fields outside the heading, or cross footing fields may be connected thereto for sensing such fields during heading or cross footing cycles. Referring to Fig. 28E, it is seen that relay contacts R506b are connected between a wire 615 running to the line 480 and a common plug socket 616 to which any of the field disabling relays R701 to R770 may be connected by plug wires 617.

Before explaining how the sensing controls from station L are successively brought into action or disabled during heading or cross footing operations, it is believed well to point out how the number of successive cycles are limited in accordance with the special heading indicium or digit perforation SP appearing in the 80th column of the heading or cross footing record. It is explained hereinbefore (Fig. 28D) how such a perforation when appearing under the station U initiates the controls for reversal operations by energization of relays R501, R504, R505 and R506. As the special card is fed back and forth, the special perforation is sensed repeatedly at station U. These controls are exercised regardless of the value or magnitude of the special perforation. However, it is the magnitude of this special digit perforation which limits the number of repeated cycles. As illustrated, the special perforation may appear in any of the digit positions from 2 to 9 in the 80th column.

Referring to Fig. 28H, it is seen that a digit selector DS2 is connected to the 80th column position of the sensing unit L and is provided with commutator spots registering with the 2 to 9 digit positions. The rotating arm 618 of this digit selector DS2 is operated in synchronism with the movement of each card under station L and contacts with the commutator spots 9 to 2 in the order mentioned as the index positions 9 to 2 appear under the sensing opening of the pneumatic device.

Connected to the commutator spots 2 to 9 are relay contacts R510k to line R517k, respectively, corresponding with the relays R510—R517 found connected to the successive stepping relay terminals 606 (Fig. 28D). It is apparent that as the stepping relay is operated for successive repeated heading card cycles, the relays R510, R511, etc. become successively actuated and close contacts R510k, R511k (Fig. 28H) arranged successively in series with the commutator spots of digit selector DS2 to limit the number of cycles of heading card sensing. Although the special perforation SP is sensed under station L on each repeat cycle, the commutator DS2 is ineffective to carry an impulse until such a time as there is coincidence between the successive closure of one of the contacts R510k, R511k, etc. and sensing of the corresponding perforation through the connected commutator segment.

Taking an example wherein the heading card bears the special perforation in the "2" index position, then this card when passing under station U is effective to set up all the controls of relays R501, relay 504, etc. These relays close connections for advancing the stepping relay SRA one unit of movement during the same cycle in which the heading card passes under station U. The relay contact lever 601, when advanced for this first cycle, touches the terminal 606 connected with the first relay R510. It is only after the first cycle in which the heading card passes under the lower station L that the contacts CF56 are effective to cause a second stepping movement for putting the relay arm 601 in contact with the terminal leading to relay R511. It will be noted with reference to Fig. 28H that the contacts R510k of relay R510 are connected to the "2" segment of the digit selector DS2. Since this relay R510 is energized at the time that the heading card is passing under the station L for the first time, a circuit is established through the digit selector when the contact arm 618 reaches the "2" position in coincidence with the appearance of the "2" index point under the 80th column sensing station. A circuit is set up through contacts R510k for sustaining the reversal contact relays for one cycle beyond that in which the contact is established. This sustaining action is necessary because the cycle ending controls are always picked up one cycle before the necessary number is reached. In the example given wherein card feed reversal is to take place for two cycles, it is noted that the digit selector DS2 becomes effective on the first of said two cycles while the heading card is appearing initially under the lower pneumatic unit. Therefore, it is necessary to continue the control one cycle beyond such a time and this control is effected by the relays R540 and R541, the operation of which is about to be explained.

Assuming that the heading card is advancing under the station L and the special "2" perforation SP is at the sensing line, then the following circuit is established: line 480 (Fig. 28D), cam contacts CB1—4, wire 480', cam contacts CF17 and CF18, wire 482 (Fig. 28H), relay contacts R4a, wire 437, common bar 392, wire 391 in the 80th column activated by the pneumatic controls at "2," terminal plate 388, plug socket 682, switch HS2, wire 683, to the insulated arm 618 of digit selector DS2, contact brush 684 now at the "2" commutator spot, relay contacts R510k, wire 619, pickup coil of relay R540, wire 620 and line 481. A holding circuit for relay R540 is established through the holding coil of the relay and at the same time a circuit is established for relay R541 which is to be held effective for the next cycle of operation. The holding circuit includes line 480, cam contacts CF60 which are held closed during the passage of all index positions and beyond those points until near the end of the first reading cycle, relay contacts R540a, the holding coil of relay R540 and wire 620 to line 481.

At the end of this first reversal cycle and at about the same time that relay R541 is picked up by the closure of contacts R540b along with cam contacts CF61, the stepping relay SRA (Fig. 28D) is advanced by the second closure of cam contacts CF56, so that the contact lever 601 is advanced to the second terminal 606 and the second relay R511 is ready to be energized by the closure of cam contacts CF58 for the second control operation of the reversal relays. Of course, with the second operation of the stepping relay SRA, cam contacts CF56 also send a second impulse to the card reversal clutch magnet CRCM to again disable card feeding and enable the reversal feed pawl. All these operations for the second cycle are made possible by the sustaining action of the relay R541 and the pickup and holding circuits which are about to be traced.

It is already noted that during the first reversal control cycle, relay R540 is picked up and then held near the end of the cycle. As its holding coil is energized, other contacts R540b are closed in series with relay R541 to make this relay effective for the second cycle. The pickup circuit for relay R541 is as follows: line 480, wire 689, cam contacts CF61, cam contacts CF63 closed momentarily, relay contacts R540b, relay R541, wire 681 and line 481. Relay R541 then closes contacts R541a to set up a holding circuit through cam contacts CF61 which remain closed during all index point positions in the early part of the second cycle. The holding circuit includes line 480, cam contacts CF61, wire 686, contacts R541a, relay R541 and wire 681 to line 481. Quite a number of sustaining contacts operated by relay R541 are scattered throughout the tabulator controls for carrying the reversal controls beyond the timing provided by relays R504, R505 and R506 (Fig. 28D) as already mentioned. Then there are other relay contacts R541b and R541c shown in Fig. 28H directly operated by relay R541 which are in series with the cam contacts CF62 operated momentarily at the "X" time to cause a variety of controls which should attend the termination of the last reversal cycle.

Before describing the separate controls exercised by all of the contacts of relay R541, it may be noted that this relay is called into action in another way in addition to the actuation by relay R540 through the digit selector DS2. The relay R541 has a pickup coil which is found in Fig. 28D and wired in series with the last or "9" terminal 606. This pickup coil is provided in the last position of the stepping relay SRA in order to act as a safety device to terminate stepping relay action and continued reversal feed should there be a failure to sense a special perforation or failure of contact in the digit selector in any position. Along with the use of the digit selector DS2 and the nine different special heading perforations in Fig. 28H, it is noted that this pickup coil is associated with relay R541 to effect the same cessation of cycling operation as though the relay was operated by relay R540 by any of the contact closures R510k to R517k inclusive. When the stepping relay arm 601, Fig. 28D, is restored, pickup relay R541 is deenergized and the relay is made dependent on cam contacts CF61, Fig. 28H, which open to restore the relay.

Turning now to the sustaining action of the various contacts of relay R541, it may be noted initially that the lower card lever relays R3 and R4 (Fig. 28C) are effective during all the time that the heading card is being repeatedly sensed under the station L and that relay contacts R504c have been pointed out as the means for maintaining energization of relays R3 and R4 during the reversal action. Now it is evident that contacts R541e close in parallel therewith to insure that such control is carried on to the end of the last repeat sensing cycle.

Relay R541 also has associated therewith a pair of normally closed contacts R541g (Fig. 28D) that are found in series with the holding circuit for relays R504, R505 and R506. Upon energization of relay R541 at the next to the last reversal cycle, the holding circuit for relays R504, R505 and R506 is opened to deenergize these three relays, so that they are ready to be picked up, should a second heading or cross footing card follow directly after the one being considered at the time.

A fourth control is seen to be exercised by relay R541 by the closure of contacts R541h (Fig. 28E) arranged in parallel with the contacts R506b already mentioned. These contacts provide a sustaining action for the common disabling circuit through plug socket 616 which is available for disabling the sensing of one or all fields of perforated data outside those fields devoted to repeated sensing operations. Turning now to those circuits controlled by relay R541 for the purpose of receiving a single impulse incidental to the end of the last repeat sensing cycle, it is noted with reference to Fig. 28H that cam contacts CF62 are wired in series with the relay contacts R541b and R541c. The first of these circuits is used for operating the resetting magnet SRR of the stepping relay SRA and the circuit for the reset magnet SRR may be traced as follows: line 480, wire 689, cam contacts CF62, relay contacts R541b, magnet SRR and line 481.

Turning to Fig. 28D, it is seen that the reset magnet SRR is shown diagrammatically as associated with the ratchet pawls 604 and 607 which are attracted thereby to release the ratchet wheel 602. When this is done, the spring 603 pulls arm 601 in a counterclockwise direction back to the home position and removed from all the terminals 606. Since the restoring action takes place after the passage of all the digital index points, the momentary energization of the relays R510, etc. while arm 601 is wiping over the terminals 606, is ineffective to cause any circuit closures.

It is already noted with reference to Fig. 28H that the closure of contacts R505c and R507k and the activation of the circuit through plug socket 691 is effective to call into operation relay R30 for disabling group control functions during the consideration of single or multiple heading card cycles. This control is extended further by the closure of contacts R541c mounted in parallel with the two other control contacts already mentioned. The closure of the last mentioned contacts insures the disablement of group control functions for the entire final heading card cycle. A sample of the circuit which is established on all single and multiple heading card cycles is as follows: line 480, wire 689, cam contacts CF62, any of the three relay contacts R505c, R507k or R541c, plug socket 691, plug wire 693', plug socket 693 (Fig. 28G), through the X control contacts 696, the pickup coil of relay R30 and wire 697 to line 481. A holding circuit is established for relay R30 and this holding coil controls the contacts R30b (Fig. 28B) already mentioned as being in series with the group control relays.

At this point it is believed well to consider another carriage control function incidental to the detection of single and multiple field heading cards. It is desirable to start space skipping of the record sheet after the recording of the last heading line. The first heading card cycle serves to send a simulated X impulse through contacts R502c or R505d (Fig. 28H) to pick up relay R26 and prevent space skipping for one or more cycles as the case may be. The initial space skipping control circuit is as follows: line 480, wire 689, cam contacts CF62, relay contacts R505d or R502c, plug socket 692, plug wire 698 connected to socket 699 (Fig. 28G), X control contacts 696', relay R26 and wire 697 to line 481. Relay R26 then serves in two ways; to operate through its holding coil to close connections for calling in relays R28 and R29 (Fig. 28G), and to open lower contacts R26c (Fig. 28A) to suspend direction of a space skip impulse through plug socket 803. Such suspension is possible because it will be remembered that contacts R505d (Fig. 28H) are held closed during reversal cycles, and contacts R502c are closed for one cycle. The circuit for calling in relays R28 and R29 includes contacts R26g of holding coil R26 in series with contacts DT20 and the pickup coil of relay R28. Relay R28 not only calls in its holding coil but also the pickup coil and relay R29 through cam contacts CF29.

Figure 28G:
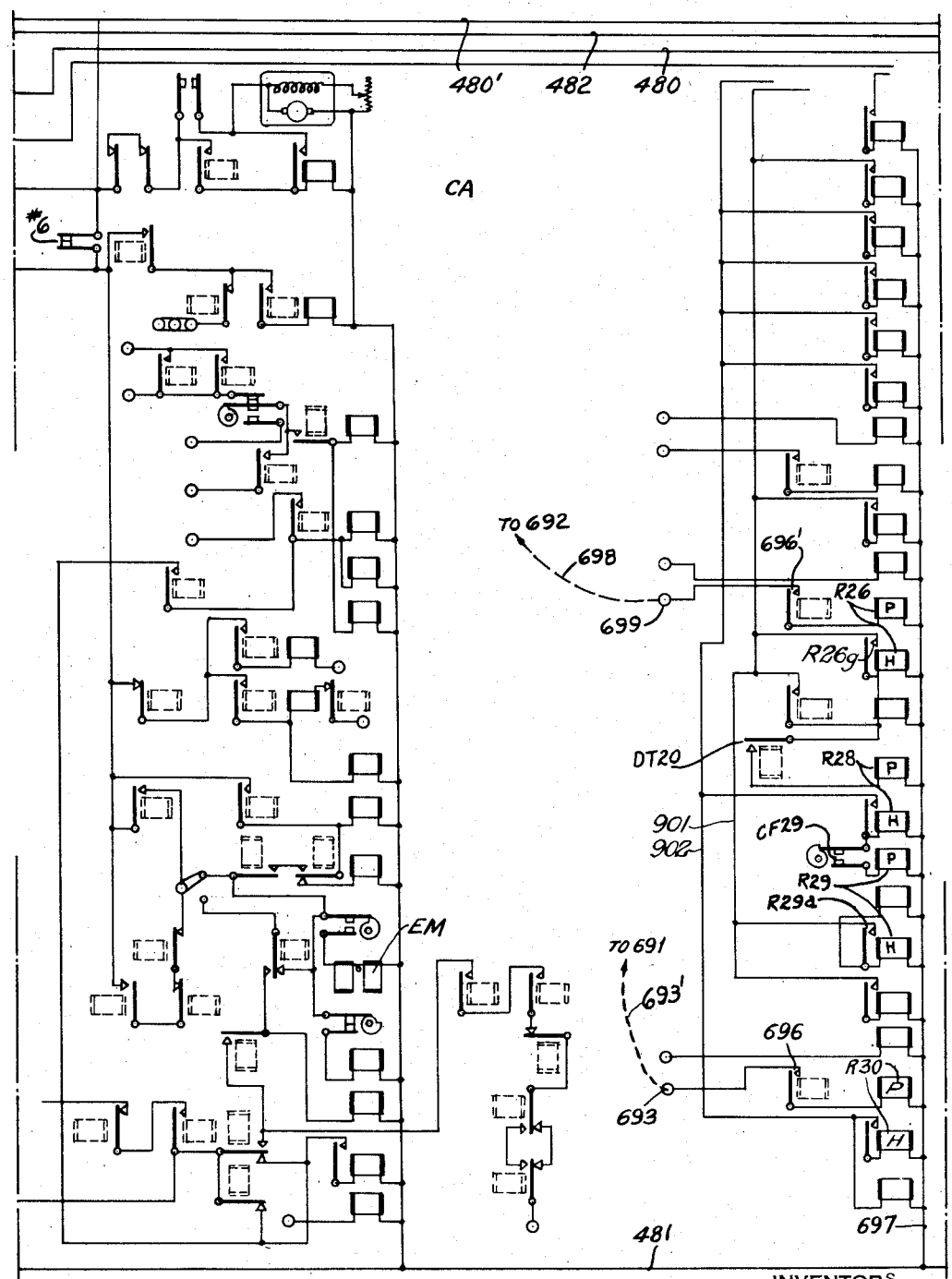
Figure 28H:
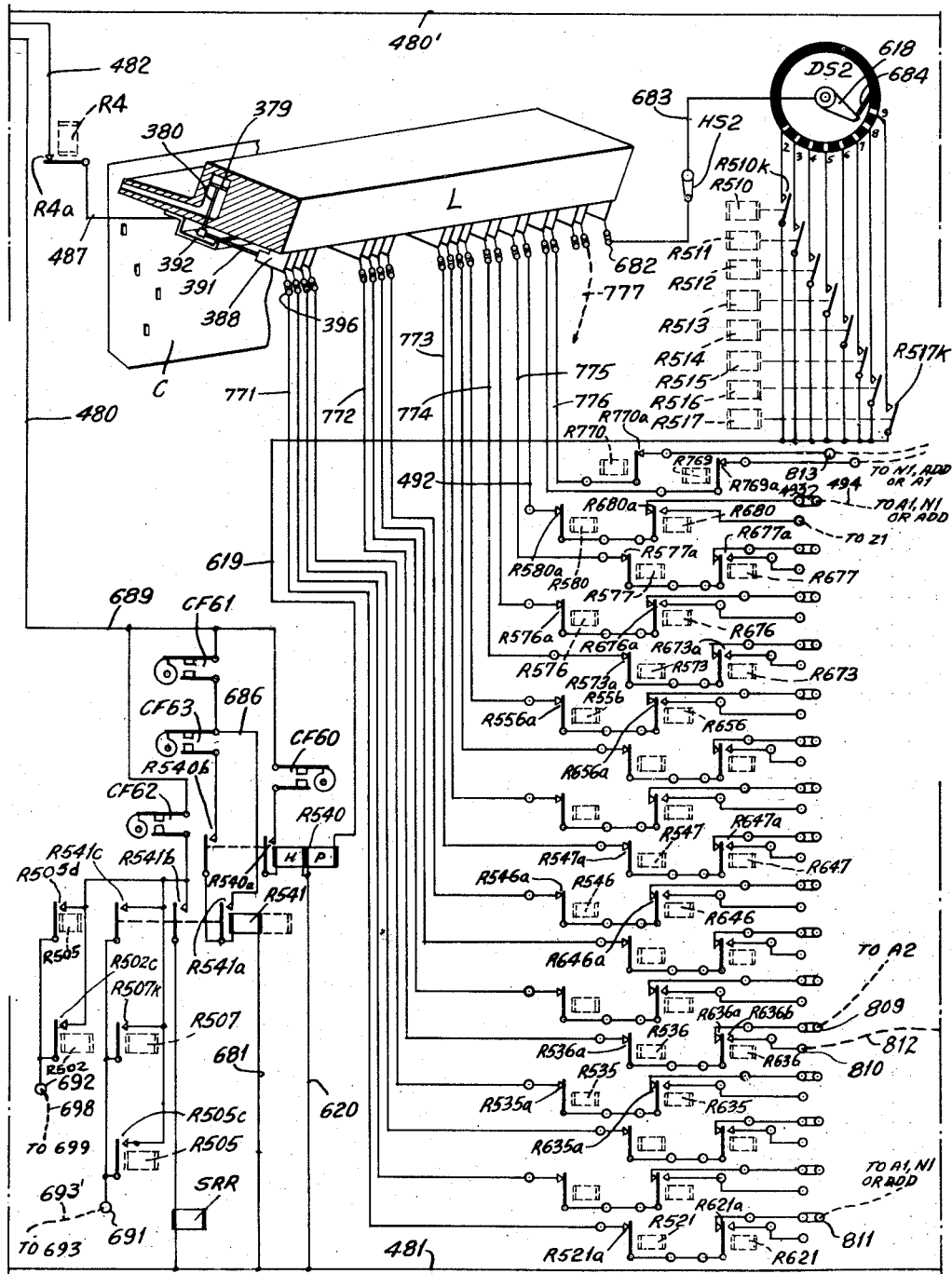

On the last heading card cycle, relay R26 will be deenergized but relay R29 will remain energized through its own supporting circuit shown in Fig. 28G. The circuit includes line 482, wire 901, contacts R29d, holding coil R29 and wire 697 to line 481. Now referring to the upper left of Fig. 28A it is seen that with lower contacts R26c closed and upper contacts R29d closed, a circuit is established to initiate space skipping. The circuit includes line 480, cam contacts CB31, relay contacts R26c and R29d, plug socket 803, plug wire 804 to socket 805 (Fig. 28F) the pickup coil of relay R34 and wire 709 to line 481. The holding coil of relay R34 is in parallel with a relay R35 which has contacts R35b in series with the line space magnet LSM. The spacing circuit includes line 481, magnet LSM, cam contacts PM9, contacts R46d, upper contacts R35b now closed, relay contacts R45b, R22d and R9b, carriage contacts #6 (Fig. 28G) and a wire to line 480'. Space skipping is continued for a number of line spacing operations which is limited by the setting of a cam in the automatic carriage for opening the #6 contacts to stop the spacing operation at a predetermined line in a manner fully explained in Patent 2,189,025.

Returning now to consideration of the cycle control mechanism, it is to be realized that although the example taken was with reference to repeated heading card reversal cycles for two operations limited by the successive energization of relays R510 and R511 (Fig. 28D) and relays R540 and R541 (Fig. 28H), the same sort of repeated operation is carried on for other numbers of repeat cycles as called for by the value of the special heading perforation in the 80th column. Whatever number of address, heading or cross footing fields appear on the special card, the special digit perforation calls in a corresponding number of successive operations of the relays R510, R511, etc. terminated differentially by the initiation of relay R541 to recondition the devices for either single item sensing or another set of special heading card reversal cycles.

At this point it is desired to point out the effects caused by the succesive energizations of relays R510, R511, etc. and the way the control exercised thereby is directed into different fields so that the impulses initiated by the record card under the pneumatic sensing units are directed or eliminated from control over the zoning, printing and adding magnets.

It is common expedient to make certain operations of a tabulator, such as printing and adding, optional and directive under control of "X" distributors which are relay switches operated under control of special X perforations put in certain cards for control purposes. In the present instance, similar relays are provided as shown at the right in Fig. 28E, but there they are used for printing and adding field or column enablement or disablement under control of successive field selection for repetitious sensing of a single card. Instead of exercising simple control for a single cycle by an X or no X relationship, these relays control for a plurality of cycles in all fields of the cards in a manner to be explained in connection with cycle selection.

In all instances where repeated heading card cycles are mentioned for printing control, it is to be understood that cross footing card consideration for adding control is also possible merely by proper plugging to accumulator devices, and it is to be understood also that where repetitive printing of different fields are mentioned, such fields may be the same; i. e., one field or column may be analyzed over and over again for repetitive listing or for multiplying of amounts by repeated entry in a single accumulator.

At the left side of Fig. 28E, it is noted that the cycle control relays R510, R511, etc., to R517 each control a bank of contacts, such as the bank including contacts R518a to R518j. As the relays R510, etc. are called into operation successively, as noted in connection with the stepping relay SRA, one after the other of these banks of contacts are closed to enable and disable different parts of the sensing mechanism connected to station L. Most of the control exercised is that of disabling unwanted fields while other single field connections remain undisturbed to conduct impulses from one card field into printing or adding control magnets. The one control that is exercised in a positive manner is that for selecting zoning of the alphabet type mechanism in that field which is the next to be used for printing. For example, in the choice of a double or repeat operation signified by the initial energization of relay R510, it is noted that connection is established between the relay contacts R510i and the plug socket 793 in the second field of zoning selection. In other words, as the first alphabet printing operation is taking place with relation to the first field, such as the name field, zoning operations are taking place with relation to the street field, so that upon the second printing operation the street name type bars will be already zoned. This zoning selection process is carried on successively from field to field as the other relays R511, etc. are called into operation for three or more repeat cycles. In accordance with this disposition, it is noted that a plug wire carries a circuit from the contact R511i to plug socket 795 of the third field of zoning control relays.

While considering zoning, it is well to mention that the first alphabet field to be printed is always zoned from the upper sensing station U. As the card passes this station, the first field of zoning magnets ZM (Fig. 28I) are energized directly. However, relays R321—R635 (Fig. 28E) are provided to be used if other cycles of zoning are desired. Usually, the first zoning is direct from station U and thereafter all other successive zoning operations from the second onward are carried on by means of a circuit such as the one about to be traced. A sample zoning control circuit includes line 480, cam contacts CF59, common conductor 779, relay contacts R510i, plug socket 800, a plug wire to socket 793, one or more relays such as R636, common conductor 781, and wire 783 to line 481. Reference to Fig. 28H shows that this zoning control relay R636 operates to reverse contacts connected to the sensing orders relating to the second field so that impulses from sensing device L are directed into the zoning control magnet ZM2 instead of going directly to the alphabet printing control magnet PR in line with socket A2 (Fig. 28I). The zoning circuit is carried from the second field of pneumatic sensing devices in the unit L (Fig. 28H) by means of a plug wire 772 connected to a normally closed contact R536a and a repeat control contact R636b as operated by relay R636. The circuit continues to plug socket 810 and then by means of the plug wire 812 to the second order of zoning magnets ZM (Fig. 28I) and through cam contacts CF25 to line 481. It is noted in connection with the shifted contact R636b (Fig. 28H) that the sensing circuit is normally directed to the left contacts R636a and into a plug socket 809 connected by a plug wire to socket A2 (Fig. 28I) and a print magnet PR representative of a second field such as a street field when printing addresses. The zoning control circuit just described is effected on the first heading card cycle of a number of repeat cycles, during the second of which the same card sensing orders will have the impulses directed into printing rather than zoning control magnets.

In describing the zoning circuit through the plug wire 772 (Fig. 28H), it was noted that the circuit passed through a normally closed disabling contact R536a controlled by relay R536. Referring to Fig. 28E, it is noted that this relay is in the second field of a tier of relays divided into nine fields, each having one or more of such relays for the purpose of disabling the sensing fields other than the one selected for the repeat heading control. It is noted that relay R536 and the connected plug socket 792 does not carry any plugging to the contacts of relay R510 for disabling connections while the first field is being recorded. In this second field it is desired to avoid disabling action because circuits are needed for the zoning control as noted in Fig. 28H. However, when recording from the first field as is evident from the absence of any plugging to sockets 790 and 791 (Fig. 28E), it is necessary to disable all other fields such as fields 3 to 9 inclusive, and this is done by means of circuits one of which follows the following path: line 480, cam contacts CF59, contact bar 779, relay contacts R510a, plug socket 796, plug wire to socket 794, relay R547 related to the third field of repeat recording control, common bar 780 and wire 783 to line 481. Relay R547 (Fig. 28H) then opens contacts R547a to prevent both zoning and printing control impulses from passing through the plug wires 773, extending to the third field of pneumatic sensing units, to which they are plugged at the sensing station L. In a similar fashion, all other fields (beyond the second which is then zoning) with repeat heading card information or cross footing information are disabled while the first field of information is being recorded.

It is noted that with respect to field #1 (Fig. 28E) that the relays such as relays R521 and R621 remain deenergized and so the contacts shown at the bottom of Fig. 28H remain closed to carry the impulses from the first field through the plug wire 771, to the socket 811. This socket will be plugged to the alphabet printing socket A1 when the cards being considered are heading cards and the data to be printed on this first cycle will be a name.

If the card being considered is a cross footing card, then plug socket 811 will be connected to the numeral printing bank socket N1 (Fig. 28I) and also to the adding control socket ADD for recording and adding the first in a series of items to be taken off a single cross footing card. In connection with the recording of the first field, it will be noted that the zoning magnet ZM1 related thereto has a plug wire extending to socket 397 (Fig. 28D) for initial zoning of the first alphabet field as the card passes under station U previous to the actual alphabet recording cycle when passing under station L.

It will be realized that, in addition to the plurality of fields allotted to the repeated card sensing controls, the card will bear other fields relating mainly to numerical data and numbering data, such as the group number field. The controls for these other fields are shown in the bottom tier of relays R701 to R770 on Fig. 28E. It is already explained how these relays can be operated as a unit for all repeated cycles through plugging to the common socket 616. However, there are times when selective operation is required in that the fields are to be disabled for one or more repeated cycles but enabled for one or more other cycles. In carrying out such control, plug connections may be established to any of the cyclic control contacts R510j to R517j for selective disablement of printing or printing and adding control in said other fields in any one or more of the repeat operations.

An example of such an outer field disabling control may be traced as follows: from line 480, through cam contacts CF59, common bar 779, relay contacts R510j, plug socket 801, plug wire 802, plug strip 785 which is connected to another strip 784 to which individual or grouped relays are plugged such as relay R770, and then through bar 782 and wire 783 to line 481. The control exercised by relay R770 is in connection with its associated contact R770a (Fig. 28H) connected by plug wire 776 to one of the sensing fields of unit L outside the range of the repeat sensing fields. When relay R770 is energized, the connections from the pneumatic sensing devices are broken and the plug connection 813 extending to any of the adding or printing control magnets is ineffective for the first address printing cycle. Of course, other plug connections may be made directly from the sockets 396 of the sensing unit L directly into printing or adding control magnets and thereby made independent of the repeat sensing controls.

At the upper left part of Fig. 28E, it is noted that a set of relay contacts R507a to R507j are provided similar to those of the cyclic controlled relays R510, etc. These contacts are operated by the relay R507 which, it will be remembered, is the one operated in connection with a heading card bearing a single field of information. These contacts are provided to take advantage of the flexibility afforded by the three tiers of control relays operated by the cyclic control contacts. Therefore, it is made possible in connection with single field recording to effect selective disablement of any of the fields of information on the single field card.

In a divisional application, Serial No. 5,134, filed on January 29, 1948, now Patent No. 2,510,552, there are set forth claims to pneumatic record sensing devices.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine controlled by a series of record cards, means for sensing data and control indicia on said record cards, means for feeding said record cards past said sensing means, means under control of said sensing means for automatically reversing the direction of feed of said feeding means one or more times, whereby said data indicia can be sensed more than once.

2. In a machine controlled by a series of record cards having data and control indicia thereon, means for sensing said indicia, means for feeding one record card at a time past said sensing means, means under control of said sensing means according to said control indicia of said one record card for automatically reversing the direction of operation of said feeding means a predetermined number of times when feeding said one record card, whereby said data indicia of said one record card are sensed a predetermined number of times.

3. In an accounting machine controlled by a statistical card having a plurality of fields of data indicia thereon, means for sensing said indicia, means for feeding said card past said sensing means, means for representing the number of fields of data indicia on said card, means under control of said representing means for reversing the direction of operation of said feeding means a predetermined number of times according to the number of said fields, and means under control of said reversing means for making effective successively portions of said sensing means cooperating with one after the other of said fields, whereby a plurality of data readings are taken from one card.

4. In a machine controlled by a record having a plurality of fields of data indicia thereon, means for sensing said indicia, means for feeding said record past said sensing means a plurality of times in successive uninterrupted cycles, means for representing the number of fields of indicia on said record, means under control of said representing means for controlling the number of said cycles according to the number of fields of data on said record, and means under control of the last mentioned means for making portions of said sensing means effective successively in cooperation with one after the other of said fields of data.

5. In a machine controlled by a record having a plurality of fields of data indicia and a special indicium thereon for cycle control, means for sensing said data indicia, means for feeding said record past said sensing means a plurality of times in successive uninterrupted cycles, means for sensing said special indicium, mean under control of said indicium sensing means for controlling the successive cycling of said feeding means, and means under control of said indicium sensing means for controlling said sensing means to sense said different fields in succession.

6. In a machine controlled by a record having a plurality of fields of data indicia thereon and special numeral representing indicium, the magnitude of said numeral corresponding to the number of said fields, means for sensing said data indicium, means for feeding said record past said sensing means a plurality of times in repeated cycles, means for sensing said special indicium, means under control of said indicium sensing means for controlling said feeding means to limit the number of said repeated cycles to correspond with the number of fields of data on said record, and means for controlling said data sensing means to sense said data indicia fields successively, whereby all of said fields are read off said record in succession.

7. In a machine controlled by a record having a plurality of fields of data indicia and a special digit indicium thereon, means for sensing said data indicia, means for feeding said record past said sensing means, means for reversing the direction of operation of said feeding means, means for sensing said digit indicium, means under control of said indicium sensing means for controlling the number of times said reversing means is to operate, and means under control of the last mentioned means for controlling said data sensing means to sense said fields of data indicia on said record successively.

8. In a machine controlled by records, certain of which carry a plurality of fields of data indicium and each distinguished from single field records by special indicium, means for sensing said data indicium, means for feeding said records in succession past said sensing means, said feeding means operating normally to advance one record for each feeding cycle, means for detecting said special indicium on records calling for a plurality of sensing cycles, means under control of said indicium sensing means for halting the advance of successive records, means under control of said indicium sensing means for feeding each related plural field record past said sensing means a plurality of times in successive uninterrupted cycles, means under control of said indicium sensing means for controlling said feeding means to limit the number of said successive cycles for each plural field record, means effective at the end of said repeated cycling for disabling said halting means to allow resumption of successive record feeding, and means operable during repeated cycling for controlling said data sensing means to sense a succession of the plural fields of a record.

9. In a machine controlled by a record having a plurality of fields of address data indicia thereon, means for sensing said indicia, numeral and alphabet printing devices operated under control of said sensing means, means for feeding said record past said sensing means, means for reversing the direction of operation of said feeding means a predetermined number of times according to the number of fields of address data on said record to redirect said record past said sensing means a plurality of times, means for controlling said sensing means successively to sense one after another of said fields of address data indicia, whereby the name, street, city, etc. lines of an address are recorded in a succession of continuous operating cycles under control of a single record.

10. In a machine controlled by a cross footing record having a plurality of fields of item indicia thereon, a single sensing station with means for sensing said indicia, accumulator control devices operated under control of said sensing means, means for feeding said record past said sensing station a plurality of times in successive uninterrupted cycles according to the number of item fields thereon, means for controlling said sensing means to sense one after the other of said item fields whereby a plurality of items are accumulated from a single record in a single series of sensing cycles.

11. In a machine controlled by a record having a plurality of related fields of data indicia thereon, and other associated fields of data indicia, means for sensing one of said fields of related data indicia, means for feeding said record past said sensing means, means for reversing the direction of operation of said feeding means a predetermined number of times according to the number of said related fields, means under control of said reversing means for controlling said sensing means successively to sense one after the other of said related fields, devices for sensing said other fields separately, means under control of said reversing means for disabling the sensing devices of any of said other fields in any of said successive cycles, and accounting devices controlled by said sensing means and devices whereby a plurality of data readings are taken from one record.

12. In a machine controlled by a cross footing record having an amount field of indicia and a special cycle control indicium representing a predetermined number, means for sensing said amount indicia, accumulator control devices operated under control of said sensing means, means for feeding said record past said sensing means, means under control of said special indicium for reversing the direction of operation of said feeding means a predetermined number of times according to the number of times that it is desired to add said amount.

13. In a machine controlled by a record having a field of data indicia and a special cycle control indicium representing a predetermined number thereon, means for sensing said data indicia, printing devices under control of said sensing means, means for feeding said record past said sensing means, means for sensing said special indicium, means under control of the last mentioned sensing means for reversing the direction of operation of said feeding means a predetermined number of times according to the number of times which it is desired to repeat the printing of said sensed data.

14. In a machine controlled by a record having a plurality of fields of alphabet data representing indicia and a special cycle control indicium thereon, means for sensing said data indicia, devices under control of said sensing means including zoning devices for printing alphabetically, means for sensing said special indicium, means under control of said indicium sensing means for feeding said record past said data sensing means a plurality of times in a predetermined number of successive cycles, means for rendering effective different portions of said data sensing means and connected alphabet printing means successively in order to sense one after the other of said data fields, and means for connecting said zoning devices to portions of said sensing means related to said sensed data fields successively one cycle in advance of the printing control connection, whereby the second field controls zoning while the first field controls printing, the third field controls zoning while the second field controls printing, etc.

15. In a device for feeding records successively past an operating station, a record holder, pawl devices for advancing said record holder and each record forwardly past said operating station, other pawl devices for carrying said holder and the record in a reverse direction to be returned behind said operating station for repeated control thereby, said pawl devices being constructed to retain control over the position of each record inasmuch as the one pawl device engages the record holder before the other pawl device releases the record holder.

16. The combination set forth in claim 15 including overthrow preventing devices cooperating with both of said pawl devices to confine the record movements to the movements imparted by the pawl devices.

17. The combination set forth in claim 15, wherein the records bear data indicia covering a portion of the record, and means for effecting transfer of feeding control from one pawl device to the other directly after the passage of the data representing portion of the record under the sensing device.

18. The combination set forth in claim 15, wherein each record bears numeral representing indicia for controlling the number of times that the record bearing the indicia is to be presented at said operating station, devices for sensing said numeral indicia, and means under control of said sensing devices for controlling the number of times that the reversing pawl devices are operated alternately with the operation of said forwardly advancing pawl devices in cooperation with a single record.

19. In a machine for advancing control records past an operating control station, a magazine holding a plurality of records, a record holder, means for advancing said records successively out of said magazine and on to said holder, means for operating said holder to move the record with respect to the control station, said holder operating means including a series of pawl devices, two of said pawl devices serving to advance the holder in two successive forward movements, the second of which is ineffective upon the engagement of a third reversal pawl device for moving said holder back, and means for selecting engagement of said third pawl device and disengagement of said second pawl device, whereby the record on the holder is presented repeatedly opposite said control station.

20. The combination set forth in claim 19, wherein each of the three sets of operating pawls includes overthrow preventing pawls for restricting the movement of said record holder to uniform movement with respect to said operating station.

21. The combination set forth in claim 19, further characterized by the fact that each record bears digit indicia representative of the number of times that the record is to be presented at the operating control station, means for sensing said digit indicia, and means under control of said sensing means for controlling the pawl selecting means to determine the number of times that there is interchange of forward and reverse pawl devices in cooperation with the record holder.

22. In a machine for advancing records successively past an operating station, a record feeding drum, means for placing said records successively on said drum, a number of ratchet wheels attached to said drum, a forwardly operating pawl engaging one of said wheels, means for operating said pawl to drive said drum for an initial forward movement with respect to said operating station, a second forward feeding pawl cooperating with another of said ratchet wheels at an intermediate point in record movement past said station, means for operating said second pawl for imparting to said drum a secondary forward feed movement with respect to said operating station, a reverse feeding pawl engageable with one of said wheels, and means for operating said reversal pawl for moving said drum in a reverse direction to carry it back through a distance equal to the initial forward movement, and means for engaging either the secondary forward pawl or the reversal pawl in cooperation with a related wheel at the intermediate point of movement of said drum.

23. The combination set forth in claim 22 including overthrow preventing pawls engageable on both forward and reverse movements to restrict the rotation of the drum to the actual pawl movement.

24. The combination set forth in claim 22 further characterized by the fact that each record bears a number indicium to limit the number of times that said reverse pawl devices are to be effective in connection with that record, means for sensing said indicium, and means under control of said sensing means for controlling the number of times that the reversal pawl is engaged with the corresponding wheel in alternation with the engagement of the initial forward feed pawl, whereby said drum is oscillated with a record passing under said operating station a plurality of times.

25. The combination set forth in claim 22, wherein each record bears a digit indicium for controlling the number of repeat cycles, a magazine holding the records, a picker mechanism for advancing the records from the magazine to the feeding drum, means for sensing said indicium, and a common means under control of said sensing means for controlling said engaging means for shifting said control pawls to engage the reversal pawl and disengage said second forward feed pawl a predetermined number of times and at the same itme disabling said picker mechanism to suspend record advancement during reversal cycles.

26. In a machine for advancing records successively past an operating station, certain of said records bearing a digit indicium for controlling the number of cycles in which the record is to be fed past said operating station, a magazine holding said records, a record feeding drum, a picker mechanism for advancing the records from the magazine to the feeding drum, means for holding the records on the drum, a number of ratchet wheels attached to said drum, a forwardly operating pawl engaging one of said wheels, means for operating said pawl to drive said drum for an initial forward movement with respect to said operating station, a second forward feeding pawl for cooperating with another of said ratchet wheels at an intermediate point in the cycle of movement past said station, means for operating said second pawl for imparting to said drum a secondary forward feed movement with respect to said operating station, a reverse feeding pawl engageable with one of said wheels, means for operating said reversal pawl for moving said drum in a reverse direction to carry it back through a distance equal to the initial forward feed movement, means for engaging either the secondary forward feed pawl or the reverse pawl in cooperation with a related wheel at the intermediate point of movement of said drum, means for sensing said digit indicium, and a common means under control of said sensing means for controlling said engaging means for shifting said control pawls to engage the reversal pawl and disengage said second forward feed pawl a predetermined number of times and for disabling said picker mechanism to suspend record advancement during reversal cycles, said common means including a clutch operated by a relay under control of said sensing means, cam devices, said clutch controlling said cam devices which are normally effective to operate said picker device and to engage said secondary forward feed pawl in preference to said reversal pawl.

27. In a machine for printing on a record sheet under control of records bearing a plurality of fields of data indicia and special numeral indicium corresponding to the number of fields of data, means for sensing said data indicia, means for feeding said records past said sensing means, printing devices operated under control of said sensing means for recording on said record sheet, line spacing devices cooperating with said record sheet, means for operating said spacing devices for long feeding operations of the sheet, means for sensing said special numeral indicium, means under control of said last mentioned means for operating said record feeding means to advance a record past said sensing means a plurality of times in successive cycles, and means under control of said indicium sensing means for suspending operation of the long feeding control means of said line spacing means until the last repeat sensing cycle is completed.

28. In a machine controlled by records bearing a plurality of fields of data indicia and a digit indicium for selecting repeated record sensing cycles, a pair of sensing stations, means for feeding each record through said stations in succession, means at said first sensing station for detecting the presence of said special indicium, reversal means under control of said detecing means and cooperating with said feeding means for initiating a series of repeat cycles by controlling the operation of said feeding means to reverse the direction of the record while passing under said second sensing station, a stepping relay operated successively to advance in synchronism with the repeated reversal cycles, means under control of said stepping relay for denoting the number of said repeated cycles, means for sensing the passage of the said digit indicium under said second sensing station, a digit selector operated in synchronism with the movement of the record under said second sensing station, means connecting the last mentioned sensing means to said digit selector to make it active in a particular cycle corresponding to the digit value, individual connections from said digit selector operated by said stepping relay control means in succession to compare the setting of said relay with each successive digital reading, and means under joint control of the digit selector and stepping relay for controlling said feeding means and said reversal means for terminating the reverse feeding cycle control upon agreement of the number of cycles with the value of the digit sensed.

29. In a machine for sensing a perforated record at a plurality of positions, a perforated drum, means for placing records successively on said drum, a plurality of pneumatic sensing units cooperating with each record on said drum, separate air lines connected to each of said sensing means, air shut-off valves in each of said lines, a common juncture of said air lines, and an air pump for supplying air under pressure to said common juncture.

30. In a device for feeding records containing data representing indicia and a special indicium representative of the number of cycles which the particular record is to be considered, means for sensing said data indicia, a magazine holding a plurality of said records, a picker mechanism for advancing said records successively out of said magazine, means for feeding each advanced record into cooperation with said sensing means, means for sensing said special indicium, means under control of the last mentioned means for controlling said feeding means to reciprocate each record a number of times under said data sensing means in accordance with the value of the special indicium, and means under control of said indicium sensing means for disabling said picker mechanism a number of cycles in accordance with the value of said special indicium.

31. In a machine controlled by records each bearing data represnting indicia in a plurality of fields and a special digit indicium representing the number of control cycles to be exercised therewith, means for sensing said data indicia, means for sensing said special digit indicium, means under control of the last mentioned means for advancing the records successively or intermittently and including means for placing the same record into cooperation with said data sensing means a plurality of times in accordance with the value of the special digit indicium, means for detecting the appearance of a record in cooperation with said data sensing devices, means under control of said detecting means for sustaining machine functioning depending upon the appearance of successive records, and means under control of said special indicium sensing means for maintaining the control of said detecting means during said repeat operating cycles when the same card is moved repeatedly into and out of the control area of said data sensing devices, whereby the machine continues to function during repeat sensing operations in the absence of successively advanced records.

32. The invention set forth in claim 31 with means under control of said special indicium sensing means for maintaining repeat control to the end of the last cycle, and means under control of the last mentioned means for maintaining the control of said detecting means to sustain machine operation for the last repeat cycle.

33. The invention set forth in claim 31 characterized by the provision of a plurality of record data sensing devices, said record feeding devices cooperating therewith to advance a record from one to the other of said sensing devices and to repeatedly present a record to one of said sensing devices, a plurality of record detecting means each associated with one of said sensing devices to maintain machine operations dependent on successive record appearance at all devices, and means under control of said special digit indicium sensing means for maintaining the operation of all of said detecting means during the repeat cycle operations when records do not appear successively at all devices.

34. In an accounting machine controlled by records each bearing indicia representative of group numbers and item data, and a special digit indicium controlling the number of times each record is to be repeatedly sensed, a magazine holding a plurality of said records, means for sensing said record data, means for advancing said records successively out of the said magazine and into cooperation with said sensing means, group control devices for comparing the number indicia on successive records, means for feeding each record past said sensing devices, means for sensing said special indicium, means under control of the indicium sensing means for controlling said feeding means to place the related record repeatedly in the same position to be sensed in cooperation with the data sensing means a series of times in accordance with the value of the special digit indicium, and means under control of said special indicium sensing means for disabling said group control devices during the series of cycles in which repeated sensing of a single record takes place.

35. In a machine controlled by a record bearing a special digit indicium and data representing indicia which are to be repeatedly sensed a number of times corresponding to the value of said digit, a data sensing means, means for feeding a record into cooperation with said sensing means, means for sensing said special digit indicium, means under control of the last mentioned means to control said feeding means for repeatedly presenting the record at said sensing means for repeated sensing, a stepping relay switch, means under control of said special digit indicium sensing means for advancing said relay switch step by step as said repeat cycles take place, and means cooperating with said special digit indicium sensing means and said stepping relay switch to influence said feeding means for limiting the number of said repeat cycles.

36. The invention set forth in claim 35, wherein said limiting means includes relay contacts set by said switch, and a commutator operated in synchronism with the movement of the record under said special digit indicium sensing means and connected between said sensing means and said relay contacts to detect the value of said digit indicium and compare said value with the number of repeat cycles until there is correspondence.

37. The invention set forth in claim 35 with maintaining means wherein said limiting means exercises control over said maintaining means for maintaining control over the repeat cycling means to the end of the last repeat cycle, and means under control of said maintaining means for resetting said stepping relay switch.

38. The invention set forth in claim 35, further characterized by the fact that said records include interspersed item records lacking said special indicium, printing devices under control of said data sensing means for recording on a record sheet, means for advancing said record sheet for line spacing and long feeding, means for operating said long feeding means upon the appearance of the last of a series of heading records denoted by the said special indicium, and means under control of said special indicium sensing means and said cycle limiting means for suspending the operation of said long feeding operating means until the end of the last repeat sensing cycle is completed.

39. In a machine controlled by records perforated with data representing indicia, a record holder, means for advancing the records on to said holder, clamping devices on said holder for affixing records thereon, pneumatic sensing devices with air ports pressed into cooperation with a record on said holder to detect the perforations therein, means for supplying air under pressure to said sensing devices, means for moving said holder to advance the clamping device and record under and past said sensing devices, air valves for said sensing devices, and means for lifting said sensing devices and operating said valves to shut off said air supply during the passage of said clamping devices under the sensing devices.

40. The invention set forth in claim 39, wherein a second lifting means is provided to cooperate with the clamping means for lifting it at two points in the motion of said holder, first to receive the record and second to discharge a record after sensing has taken place.

41. The invention set forth in claim 39, characterized by the fact that said record holder includes a hollow drum perforated at all positions coincident with the indicia positions of records thereon and provided with a plurality of said clamping devices for holding records thereon, and proportioned to handle a plurality of records so that, while one record is released to a stacker, a second record is being sensed by said sensing devices and a third record is being received from the record advancing means.

42. A machine controlled by records perforated with data representing indicia, a record holder, means for affixing said records on said holder in succession, said holder being perforated to coincide with the indicia positions of said record, said holder also provided with a common air exhaust chamber leading away from all of said perforations, pneumatic sensing devices cooperating with the record on said holder to detect said indicia, means for supplying air under pressure to said sensing devices, means for moving said holder to advance the record thereon under and past said sensing devices, accounting control means, and means under control of said sensing devices for controlling said accounting control means according to the record indicia sensed.

43. The invention set forth in claim 42, wherein the card holder is a hollow drum the periphery of which is perforated with a plurality of sets of rows and columns of perforations corresponding to the indicium positions of a plurality of records, a stationary perforated tube upon which said drum is mounted for rotation and an exhaust means leading out of said tube.

44. The invention set forth in claim 42, further characterized by the provision of extending clamping means for holding the records on said holder, means cooperating with said moving means for reversing the direction of movement of the holder to present the record thereon a plurality of times to said pneumatic sensing devices, means synchronized with the movement of said holder to lift said sensing devices, and other means synchronized with the movement of said holder to operate said air supply means to shut off the pressure supply thereof during each passage of said extending clamping means.

45. In a machine controlled by records bearing single and multiple fields of data indicia, a magazine for said records, means for issuing said records successively out of said magazine, sensing devices for sensing said indicia, means for feeding said records past said sensing devices once or a plurality of times in succession, means for distinguishing between single and multiple field records, means under control of said distinguishing means for controlling said feeding means to reverse the direction of feed of the record when a multiple field bearing record is detected, and means under control of said distinguishing means for disabling said issuing means while a multiple field record is being sensed repeatedly by said sensing devices.

46. In a machine controlled by a record having a plurality of fields of data indicia thereon, means for sensing said indicia, means for feeding said record past said sensing means a plurality of times in successive cycles, means for determining the number of fields of data on said record, and means under control of said determining means for controlling the number of said cycles of feeding according to the number of fields of data on said record.

47. In a machine controlled by a record having data indicia and a special cycle control indicium, means for sensing said data indicia, means for feeding said record past said sensing means a plurality of times in successive cycles, means for sensing said special indicium, and means under control of said indicium sensing means for controlling said feeding means to limit the number of said successive cycles according to the value of the indicium.

48. In a machine for sensing data on a perforated record, pneumatic sensing means, means for feeding said record past said sensing means, air supply means for said sensing means, a valve in said air supply means for controlling the performance of sensing, means for detecting the appearance of a record at said sensing means, means for operating said valve, said operating means operating invariably on every record feeding cycle, an interposer for said operating means, a control magnet for said interposer, means under control of said detecting means to energize said magnet when no card is at said sensing station, whereby the interposer is withdrawn from the operating means to leave the valve closed and prevent pneumatic sensing operation.

49. In a device controlled by records, certain of which bear special digit representations, an accounting control mechanism, means for controlling said mechanism to be operable forwardly and in reverse in carrying a record back and forth over a station for operating on said record, said station forming part of said mechanism, a cycle control means cooperating with said controlling means for controlling the number of times said mechanism is to be reversed in connection with a single record, means in said operating station for sensing said special digit representations, means under control of said sensing means to operate said controlling means for reversal operation, and means under control of said sensing means to control said cycle control means to determine the number of reversals.

FRED M. CARROLL.
OSCAR L. HIBBARD.

REFERENCES CITED

The following references are of record in the file of this patent:

UNITED STATES PATENTS

| Number | Name | Date |
|---|---|---|
| 526,129 | Hollerith | Sept. 18, 1894 |
| 1,156,957 | White | Oct. 19, 1915 |
| 1,361,791 | Carroll et al. | Dec. 7, 1920 |
| 1,818,473 | Goldberg | Aug. 11, 1931 |
| 1,826,992 | Carroll | Oct. 13, 1931 |
| 1,859,435 | De Forest | May 24, 1932 |
| 2,027,033 | Ford | Jan. 7, 1936 |
| 2,059,797 | Kirkegaard | Nov. 3, 1936 |
| 2,063,486 | Carroll | Dec. 8, 1936 |
| 2,093,529 | Tauschek | Sept. 21, 1937 |
| 2,131,919 | Mills et al. | Oct. 4, 1938 |
| 2,175,608 | Lawrence et al. | Oct. 10, 1939 |
| 2,240,667 | Paris | May 6, 1941 |
| 2,307,617 | Braun | Jan. 5, 1943 |
| 2,310,445 | Lang | Feb. 9, 1943 |
| 2,324,438 | Thomas et al. | July 13, 1943 |
| 2,364,556 | Somers | Dec. 5, 1944 |
| 2,415,279 | Daly et al. | Feb. 4, 1947 |